(12) United States Patent
Pederson et al.

(10) Patent No.: US 8,188,878 B2
(45) Date of Patent: *May 29, 2012

(54) LED LIGHT COMMUNICATION SYSTEM

(75) Inventors: John C. Pederson, St. Cloud, MN (US);
Paul R. Brown, St. Cloud, MN (US);
Timothy J. Vogt, Elk River, MN (US);
James LeClaire, Saint Paul Park, MN (US); James Zimmerman, St. Cloud, MN (US); Brent Mikkelsen, Fall Creek, WI (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 754 days.

This patent is subject to a terminal disclaimer.

(21) Appl. No.: 12/126,529

(22) Filed: May 23, 2008

(65) Prior Publication Data

US 2008/0310850 A1 Dec. 18, 2008

Related U.S. Application Data

(60) Continuation-in-part of application No. 10/646,853, filed on Aug. 22, 2003, now Pat. No. 7,439,847, and a continuation-in-part of application No. 12/032,908, filed on Feb. 18, 2008, now abandoned, which is a continuation of application No. 11/433,979, filed on May 15, 2006, now abandoned, which is a continuation of application No. 11/102,989, filed on Apr. 11, 2005, now Pat. No. 7,046,160, which is a division of application No. 09/993,040, filed on Nov. 14, 2001, now Pat. No. 6,879,263.

(60) Provisional application No. 60/931,611, filed on May 24, 2007, provisional application No. 60/405,592, filed on Aug. 23, 2002, provisional application No. 60/405,379, filed on Aug. 23, 2002, provisional application No. 60/248,894, filed on Nov. 15, 2000.

(51) Int. Cl.
*G08B 5/22* (2006.01)
(52) U.S. Cl. ............... 340/815.45; 398/118; 398/172
(58) Field of Classification Search ............ 340/815.45, 340/691.1, 691.4, 691.8, 901, 902, 907, 908, 340/945, 961, 981, 983–985; 398/118, 128, 398/130, 135, 140, 172; 362/800; 345/55, 345/82

See application file for complete search history.

(56) References Cited

U.S. PATENT DOCUMENTS 700,678 A 5/1902 Downie
(Continued)

FOREIGN PATENT DOCUMENTS

EP 0468822 1/1992
(Continued)

OTHER PUBLICATIONS

Komine T. et al., "Integrated System of White LED Visible-Light Communication and Power-Line Communication," 20020915; 20020915-20020918, vol. 4, Sep. 15, 2002, pp. 1762-1766.

*Primary Examiner* — Thomas Mullen
(74) *Attorney, Agent, or Firm* — Vidas, Arrett & Steinkraus, P.A.

(57) ABSTRACT

An LED light and communication system includes at least one optical transceiver, the optical transceiver including a light support and a processor. The light support has a plurality of light emitting diodes and at least one photodetector attached thereto, the light emitting diodes receiving power from a power source. The processor is in communication with the light emitting diodes and the at least one photodetector, the processor capable of illuminating the light emitting diodes to simultaneously create at least one first light signal, and at least one second light signal, the first light signal being observable to the unaided eyes of an individual and the second light signal not being observable to the unaided eyes of the individual. The second light signal includes at least one data packet. The at least one data packet comprises global positioning system (GPS) location information.

14 Claims, 31 Drawing Sheets

U.S. PATENT DOCUMENTS

| | | | |
|---|---|---|---|
| 2,082,279 A | 6/1937 | Fore | |
| 3,469,686 A | 10/1972 | Gutsche et al. | |
| 3,701,043 A | 10/1972 | Zuleeg et al. | |
| 3,705,316 A | 12/1972 | Burrous et al. | |
| 3,863,075 A | 1/1975 | Ironmonger et al. | |
| 3,867,718 A | 2/1975 | Moe | |
| 3,889,147 A | 6/1975 | Groves | |
| 3,911,430 A | 10/1975 | Jankowski et al. | |
| 4,149,111 A | 4/1979 | Coates, Jr. | |
| 4,243,985 A | 1/1981 | Quayle | |
| 4,254,453 A | 3/1981 | Mouyard et al. | |
| 4,271,408 A | 6/1981 | Teshima et al. | |
| 4,298,806 A | 11/1981 | Herold | |
| 4,301,461 A | 11/1981 | Asano | |
| 4,319,306 A | 3/1982 | Stanuch | |
| 4,336,580 A | 6/1982 | Mouyard et al. | |
| 4,342,944 A | 8/1982 | SpringThorpe | |
| 4,390,931 A | 6/1983 | Gorick et al. | |
| 4,445,132 A | 4/1984 | Ichikawa et al. | |
| 4,556,862 A | 12/1985 | Meinershagen | |
| 4,595,904 A | 6/1986 | Gosswiller et al. | |
| 4,615,131 A | 10/1986 | Wakatake | |
| 4,630,180 A | 12/1986 | Muraki et al. | |
| 4,630,183 A | 12/1986 | Fujita | |
| 4,633,280 A | 12/1986 | Takasu | |
| 4,654,629 A | 3/1987 | Bezos et al. | |
| 4,703,219 A | 10/1987 | Mesquida | |
| 4,716,296 A | 12/1987 | Bussiere et al. | |
| 4,720,835 A | 1/1988 | Akiba et al. | |
| 4,742,432 A | 5/1988 | Thillays et al. | |
| 4,799,135 A | 1/1989 | Inukai et al. | |
| 4,821,118 A | 4/1989 | Lafreniere | |
| 4,868,719 A | 9/1989 | Kouchi et al. | |
| 4,918,497 A | 4/1990 | Edmond | |
| 4,928,084 A | 5/1990 | Reiser | |
| 4,929,866 A | 5/1990 | Murata et al. | |
| 4,935,665 A | 6/1990 | Murata | |
| 4,954,822 A | 9/1990 | Borenstein | |
| 4,965,644 A | 10/1990 | Kawabata et al. | |
| 4,966,862 A | 10/1990 | Edmond | |
| 4,975,814 A | 12/1990 | Schairer | |
| 4,990,970 A | 2/1991 | Fuller | |
| 5,000,569 A | 3/1991 | Nylund | |
| 5,027,168 A | 6/1991 | Edmond | |
| 5,035,055 A | 7/1991 | McCullough | |
| 5,041,947 A | 8/1991 | Yuen et al. | |
| 5,045,767 A | 9/1991 | Wakatake | |
| 5,050,055 A | 9/1991 | Lindsay et al. | |
| 5,057,828 A | 10/1991 | Rousseau | |
| 5,067,788 A | 11/1991 | Jannson et al. | |
| 5,091,828 A | 2/1992 | Jincks et al. | |
| D324,921 S | 3/1992 | Stanuch et al. | |
| 5,093,768 A | 3/1992 | Ohe | |
| 5,097,397 A | 3/1992 | Stanuch et al. | |
| 5,097,612 A | 3/1992 | Williams | |
| 5,101,326 A | 3/1992 | Roney | |
| 5,122,943 A | 6/1992 | Pugh | |
| 5,136,287 A | 8/1992 | Borenstein | |
| 5,159,486 A | 10/1992 | Webb | |
| 5,172,113 A * | 12/1992 | Hamer | 340/907 |
| 5,182,647 A | 1/1993 | Chang | |
| 5,187,547 A | 2/1993 | Ninna et al. | |
| 5,193,201 A * | 3/1993 | Tymes | 398/172 |
| 5,198,746 A | 3/1993 | Gyugyi et al. | |
| 5,198,756 A | 3/1993 | Jenkins et al. | |
| 5,220,235 A | 6/1993 | Wakimizu et al. | |
| 5,224,773 A | 7/1993 | Arimura | |
| 5,233,204 A | 8/1993 | Fletcher et al. | |
| 5,235,498 A | 8/1993 | Van Dulmen et al. | |
| 5,283,425 A | 2/1994 | Imamura | |
| 5,296,840 A | 3/1994 | Gieffers | |
| 5,298,738 A | 3/1994 | Gebert et al. | |
| 5,302,965 A | 4/1994 | Belcher et al. | |
| 5,313,187 A | 5/1994 | Choi et al. | |
| 5,321,593 A | 6/1994 | Moates | |
| 5,357,123 A | 10/1994 | Sugawara | |
| 5,357,409 A | 10/1994 | Glatt | |
| 5,359,255 A | 10/1994 | Kawai et al. | |
| 5,359,669 A | 10/1994 | Shanley et al. | |
| 5,361,190 A | 11/1994 | Roberts et al. | |
| 5,362,971 A | 11/1994 | McMahon et al. | |
| 5,403,916 A | 4/1995 | Watanabe et al. | |
| 5,406,095 A | 4/1995 | Koyama et al. | |
| 5,410,453 A | 4/1995 | Ruskouski | |
| 5,419,065 A | 5/1995 | Lin | |
| 5,420,444 A | 5/1995 | Sawase et al. | |
| 5,422,623 A | 6/1995 | Bader et al. | |
| 5,426,417 A | 6/1995 | Stanuch | |
| 5,436,809 A | 7/1995 | Brassier et al. | |
| 5,450,301 A | 9/1995 | Waltz et al. | |
| 5,453,729 A | 9/1995 | Chu | |
| 5,471,371 A | 11/1995 | Koppolu et al. | |
| 5,475,241 A | 12/1995 | Harrah et al. | |
| 5,482,896 A | 1/1996 | Tang | |
| 5,490,048 A | 2/1996 | Brassier et al. | |
| 5,490,049 A | 2/1996 | Montalan et al. | |
| 5,491,350 A | 2/1996 | Unno et al. | |
| 5,498,883 A | 3/1996 | Lebby et al. | |
| 5,514,627 A | 5/1996 | Lowery et al. | |
| 5,516,727 A | 5/1996 | Broom | |
| 5,519,720 A | 5/1996 | Hirano et al. | |
| 5,526,237 A | 6/1996 | Davenport et al. | |
| 5,528,474 A | 6/1996 | Roney et al. | |
| 5,546,496 A | 8/1996 | Kimoto et al. | |
| 5,552,780 A * | 9/1996 | Knockeart | 340/991 |
| 5,567,036 A | 10/1996 | Theobald et al. | |
| 5,568,406 A | 10/1996 | Gerber | |
| 5,569,939 A | 10/1996 | Choi | |
| 5,575,459 A | 11/1996 | Anderson | |
| 5,580,156 A | 12/1996 | Suzuki et al. | |
| 5,585,783 A | 12/1996 | Hall | |
| 5,635,981 A | 6/1997 | Ribacoff | |
| 5,696,500 A | 12/1997 | Diem | |
| 5,734,343 A | 3/1998 | Urbish et al. | |
| 5,805,209 A | 9/1998 | Yuge et al. | |
| 5,809,161 A | 9/1998 | Auty et al. | |
| 5,948,038 A | 9/1999 | Daly et al. | |
| 6,035,053 A | 3/2000 | Yoshioka et al. | |
| 6,067,018 A | 5/2000 | Skelton et al. | |
| 6,091,025 A | 7/2000 | Cotter et al. | |
| 6,094,148 A * | 7/2000 | Henry et al. | 340/902 |
| 6,126,087 A | 10/2000 | Hedger et al. | |
| 6,166,496 A * | 12/2000 | Lys et al. | 315/316 |
| 6,249,340 B1 | 6/2001 | Jung et al. | |
| 6,268,788 B1 | 7/2001 | Gray | |
| 6,271,814 B1 * | 8/2001 | Kaoh | 340/815.45 |
| 6,271,913 B1 | 8/2001 | Jung et al. | |
| 6,369,849 B1 | 4/2002 | Rzyski | |
| 6,400,828 B2 | 6/2002 | Covell et al. | |
| 6,548,967 B1 | 4/2003 | Dowling et al. | |
| 6,600,899 B1 | 7/2003 | Radomsky et al. | |
| 6,683,590 B1 | 1/2004 | Pang et al. | |
| 6,690,294 B1 | 2/2004 | Zierden | |
| 6,819,677 B1 | 11/2004 | Nouzovsky et al. | |
| 7,023,469 B1 | 4/2006 | Olson | |
| 7,102,665 B1 | 9/2006 | Chandler et al. | |
| 7,103,614 B1 | 9/2006 | Kucik | |
| 7,183,895 B2 | 2/2007 | Bazakos et al. | |
| 7,230,884 B2 | 6/2007 | Shemesh | |
| 7,439,847 B2 | 10/2008 | Pederson | |
| 7,557,521 B2 | 7/2009 | Lys | |
| 7,583,901 B2 | 9/2009 | Nakagawa et al. | |
| 2003/0118216 A1 | 6/2003 | Goldberg | |
| 2003/0169164 A1 | 9/2003 | Lau | |
| 2003/0185340 A1 | 10/2003 | Frantz | |
| 2003/0222587 A1 | 12/2003 | Dowling, Jr. et al. | |
| 2004/0044709 A1 | 3/2004 | Cabrera et al. | |
| 2004/0151344 A1 | 8/2004 | Farmer et al. | |
| 2004/0208599 A1 | 10/2004 | Swartz et al. | |
| 2005/0111700 A1 | 5/2005 | O'Boyle et al. | |
| 2006/0149813 A1 | 7/2006 | Janik | |
| 2006/0213731 A1 | 9/2006 | Lesesky et al. | |
| 2007/0110446 A1 | 5/2007 | Hong et al. | |
| 2007/0145915 A1 | 6/2007 | Roberge et al. | |
| 2007/0160373 A1 | 7/2007 | Biegelsen et al. | |
| 2008/0154101 A1 | 6/2008 | Jain et al. | |
| 2008/0227463 A1 | 9/2008 | Hizume et al. | |

FOREIGN PATENT DOCUMENTS

| | | |
|---|---|---|
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 1564914 | 8/2005 |
| FR | 2658024 | 8/1991 |
| FR | 2680861 | 3/1993 |
| FR | 2707222 | 1/1995 |
| GB | 1241369 | 8/1971 |
| GB | 2069257 | 8/1981 |
| GB | 2111270 | 6/1983 |
| GB | 2139340 | 11/1984 |
| GB | 2175428 | 11/1986 |
| GB | 2240650 | 8/1991 |
| GB | 2272791 | 5/1994 |
| GB | 2292450 | 2/1996 |
| GB | 2311401 | 9/1997 |
| GB | 2323618 | 9/1998 |
| JP | 60143150 | 7/1985 |
| JP | 6333403 | 12/1994 |
| JP | 8002341 | 1/1996 |
| WO | 99/49435 | 9/1999 |
| WO | 99/49446 | 9/1999 |
| WO | 02/25842 | 3/2002 |
| WO | 02/073836 | 9/2002 |

\* cited by examiner

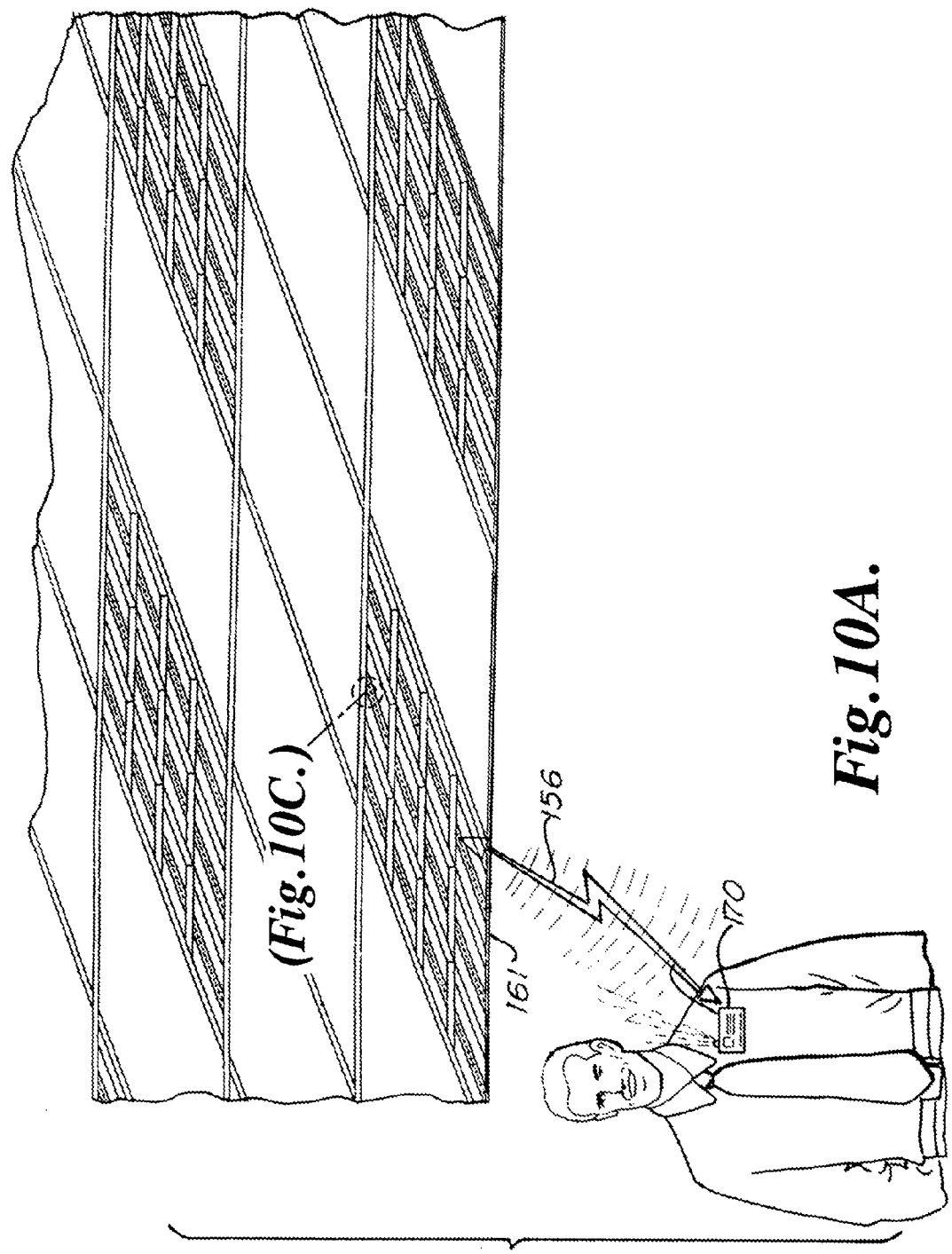

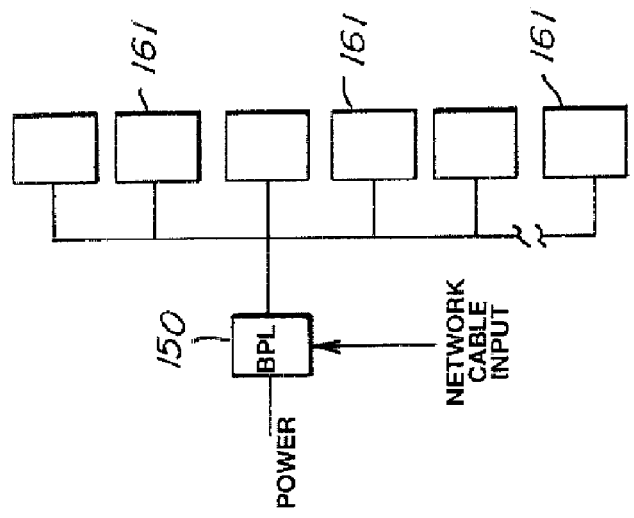
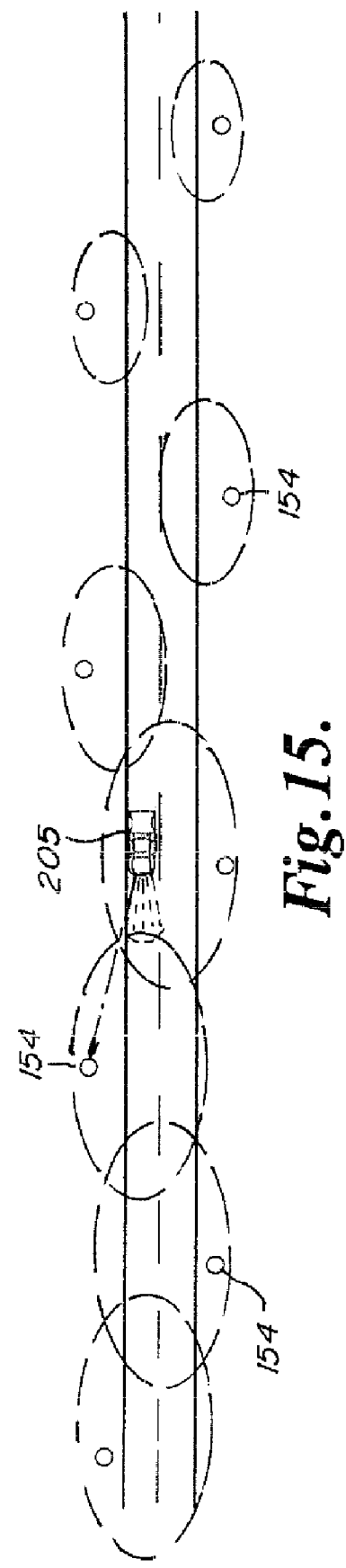
Fig.12.
Fig.15.

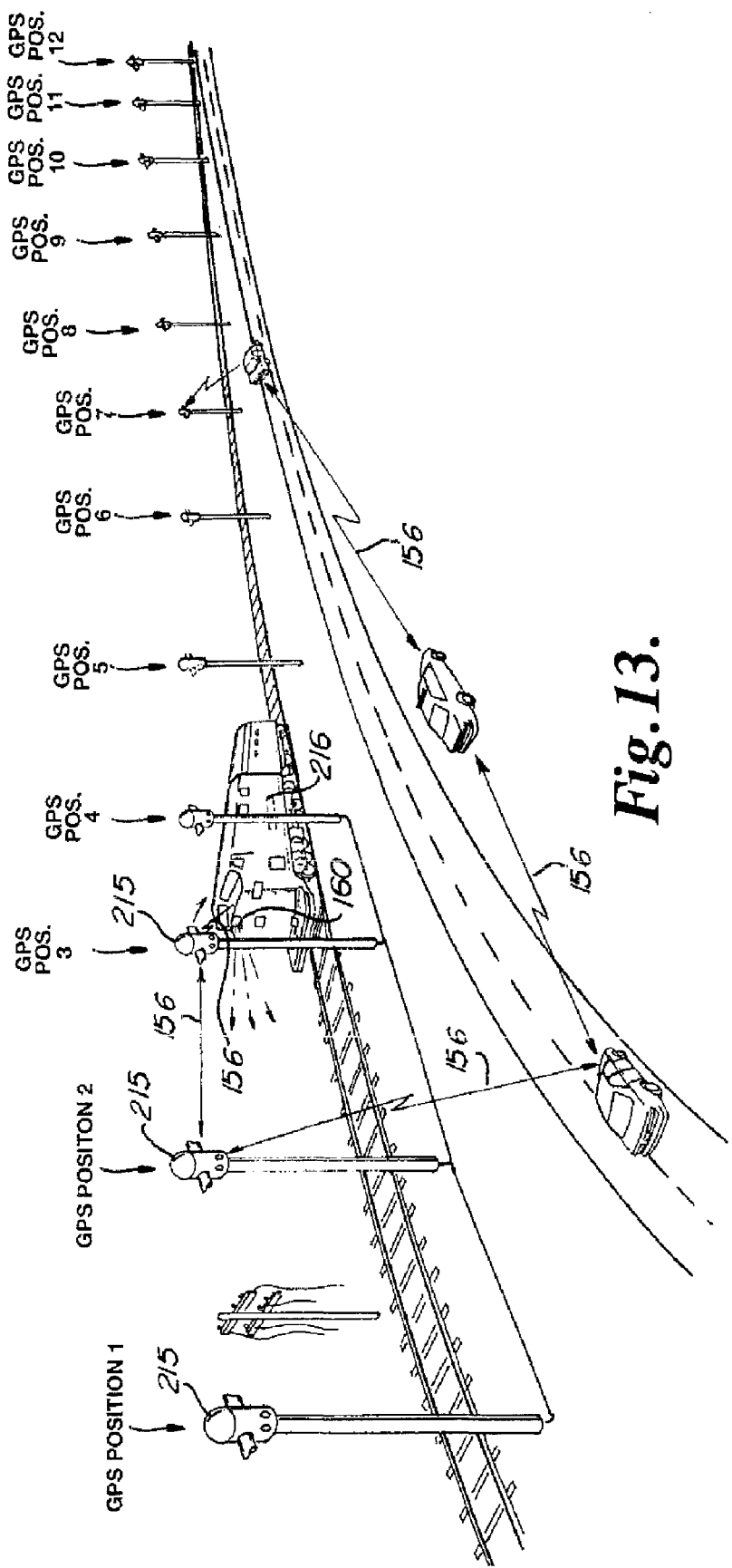

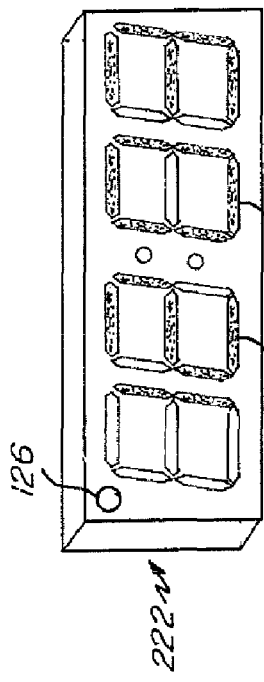
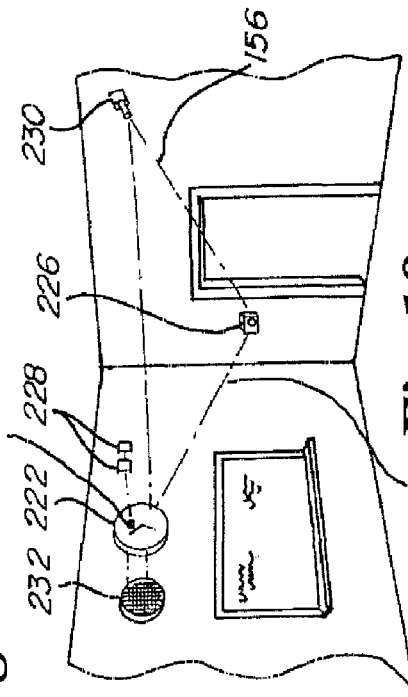
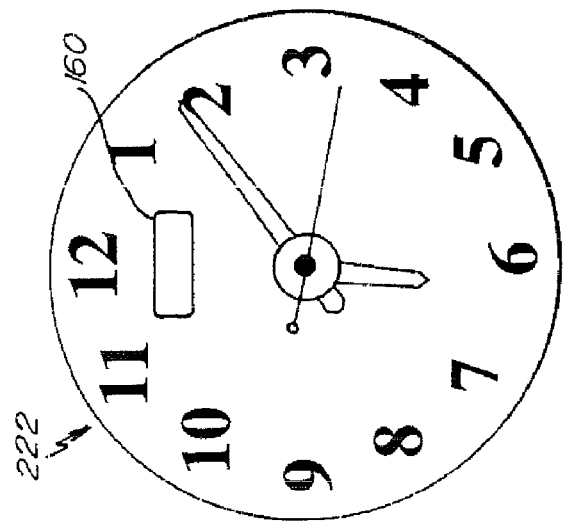
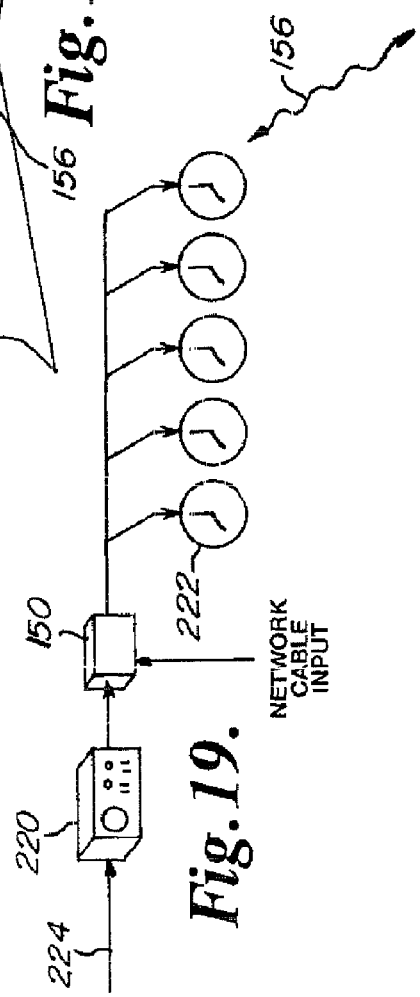

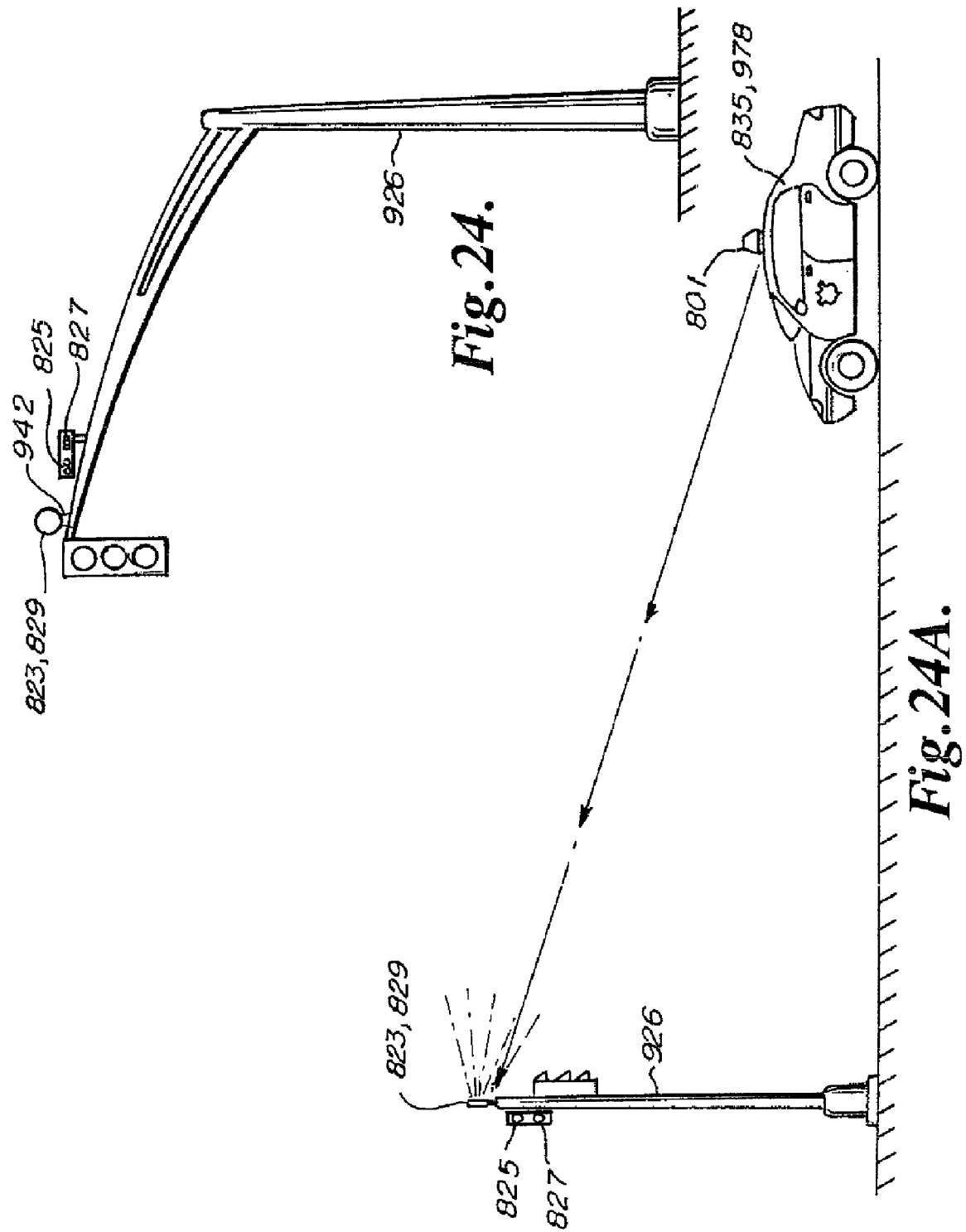

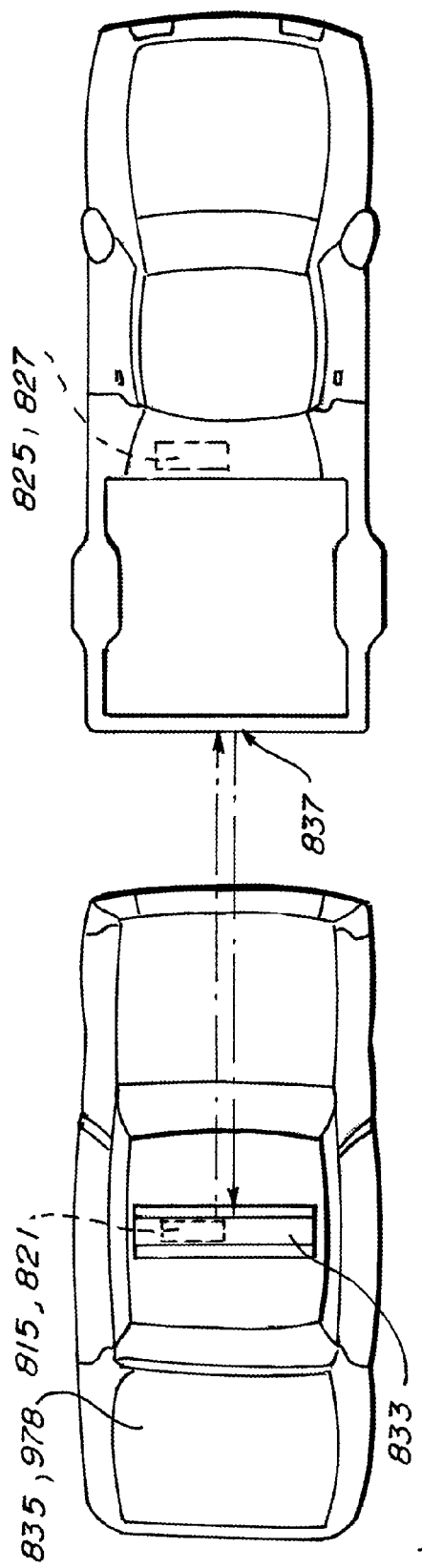
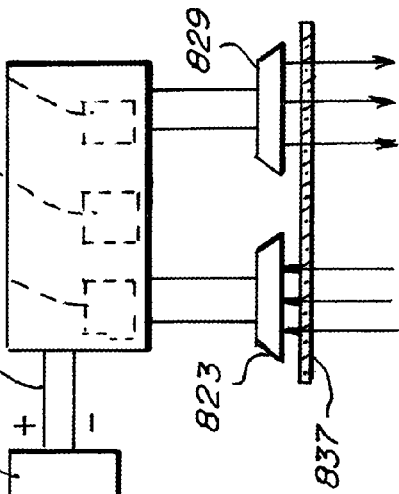
Fig.27.
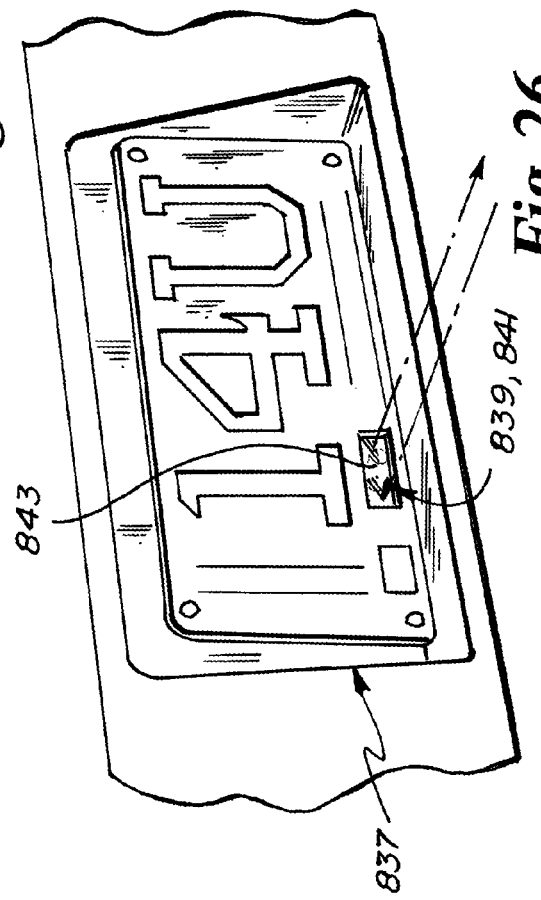
Fig.25.
Fig.26.

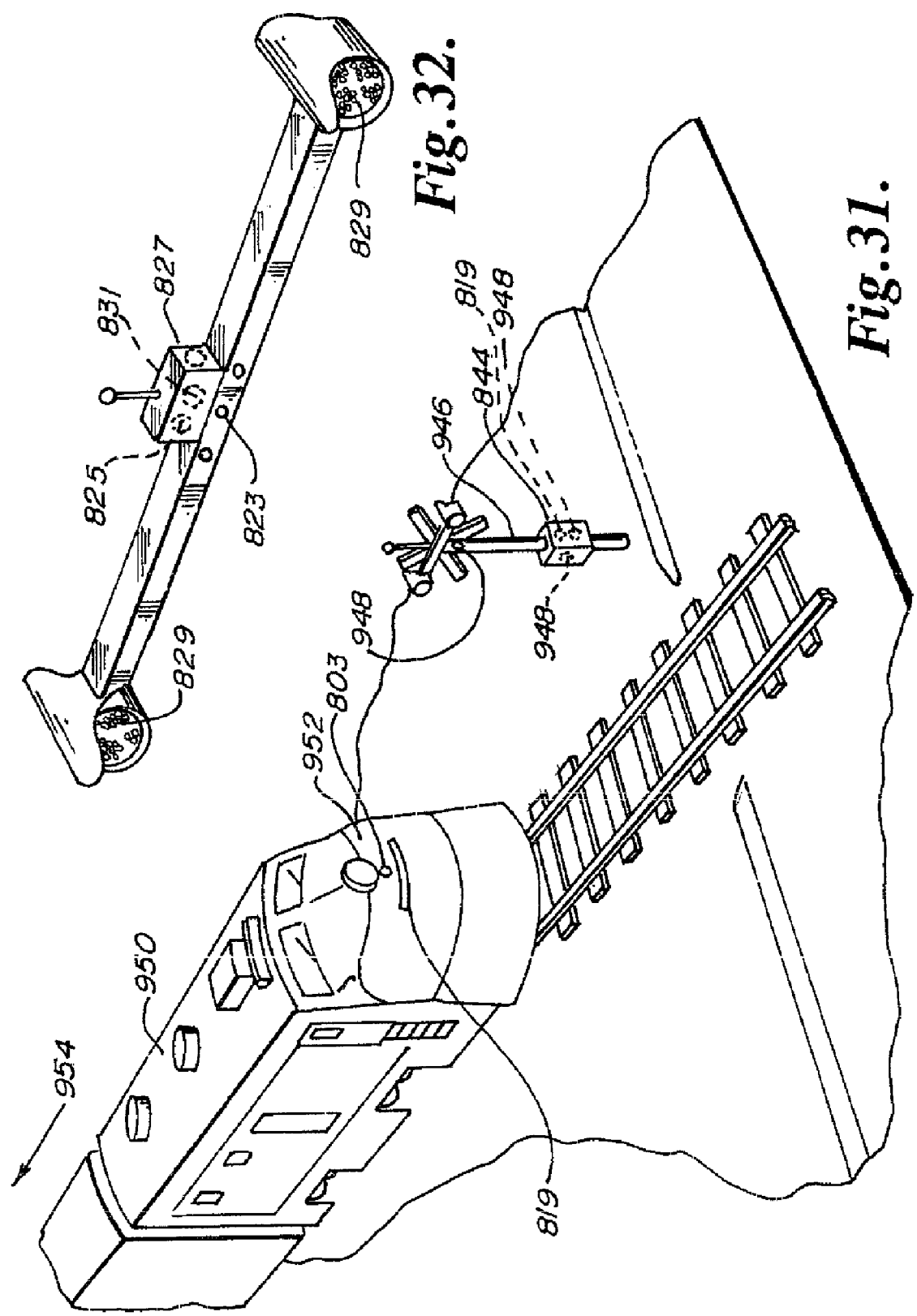

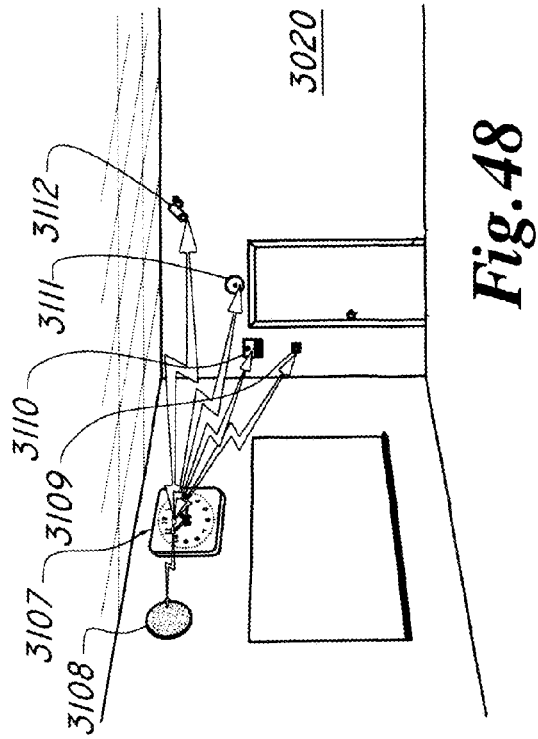
Fig. 45
Fig. 46
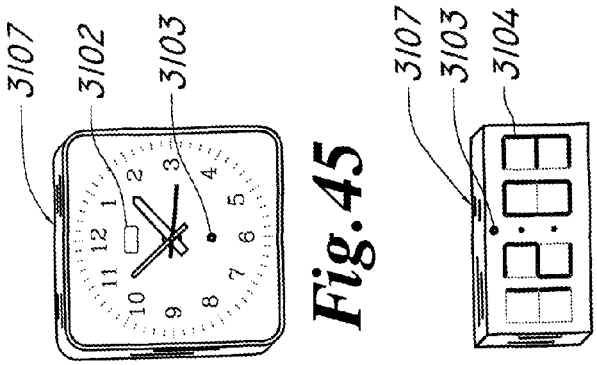
Fig. 48
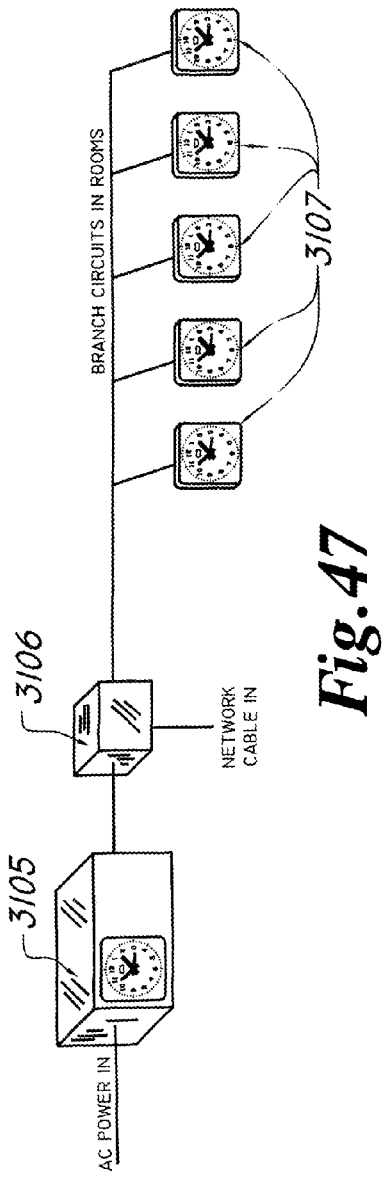
Fig. 47

LED LIGHT COMMUNICATION SYSTEM

CROSS-REFERENCE TO RELATED APPLICATIONS

This application claims priority to provisional patent application No. 60/931,611, filed May 24, 2007, the disclosure of which is expressly incorporated herein by reference. This application is also a continuation-in-part of patent application Ser. No. 10/646,853, filed Aug. 22, 2003, U.S. Pat. No. 7,439,847, which claims the benefit of provisional patent application Nos. 60/405,592 and 60/405,379, both filed Aug. 23, 2002, the disclosures of all three being expressly incorporated herein by reference. Finally, this application is a continuation-in-part of patent application Ser. No. 12/032,908, filed Feb. 18, 2008, now abandoned, which is continuation of patent application Ser. No. 11/433,979, filed May 15, 2006, now abandoned, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and power line communication technology to provide internet access and communication capability to residential and commercial clientele.

BACKGROUND OF THE INVENTION

Present communication techniques using radiofrequency (RF) suffer from a number of problems. First, there are security concerns because transmissions using RF can be easily intercepted, in part because of the fact that RF signals are designed to radiate signals in all directions. Second, the heavy regulation by the Federal Communications Commission (FCC) and its control of the frequencies that may be used for RF transmission often present daunting challenges to RF broadcasters. Third, RF by its very nature is susceptible to interference and produces noise.

In contrast to RF communications, light sources used for communication are extremely secure due to the fact that they are focused within a narrow beam, requiring placing equipment within the beam itself for interception. Also, because the visible spectrum is not regulated by the FCC, light sources can be used for communications purposes without the need of a license. And, light sources are not susceptible to interference nor do they produce noise that can interfere with other devices.

Light emitting diodes (LEDs) can be used as light sources for data transmission, as described in U.S. Pat. Nos. 6,879,263 and 7,046,160, the entire contents of each being expressly incorporated herein by reference. LEDs have quick response to "ON" and "OFF" signals, as compared to the longer warm-up and response times associated with fluorescent lighting, for example. LEDs are also efficient in producing light, as measured in lumens per watt. Recent developments in LED technology, such as high brightness blue LEDs, which in turn paved the way for white LEDs, have made LEDs a practical alternative to conventional light sources. As such, LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated. Where possible and cost-effective, human interactions with a building and associated mechanical systems will be optimized, in turn providing the greatest benefit to both the owners and those who use the facilities afforded by the building. Noteworthy is the fact that building users may include both regular occupants such as individual or commercial tenants, and also transient occupants such as visitors, guests, or commercial customers.

Building management includes diverse facets, some which are simply representations of the building and associated systems and people, and other facets which are tangible. Exemplary of representations are accounting or financial monitoring responsibilities which will including record keeping control and assurance of financial transactions involving tenants, owners, and service providers. Exemplary of the physical or tangible responsibilities are physical development and maintenance, including identification of need for features, improvements, maintenance and the assurance of the execution of the same. As is well understood by those highly versed in building management, the diverse responsibilities and extent of information required to manage a building is often quite overwhelming.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need considered at the time of construction or remodeling to facilitate proper lighting design. Intended usage of a space is important in illumination design consideration, since this will dictate necessary illumination levels, times and duration of use, and anticipated cycling of the illumination. In other words, a supply closet will not ordinarily be designed for around-the-clock illumination, and may instead by configured to operate on a switch, or alternatively a motion detector with relatively short-delay turn-off when no motion is detected. The use of appropriate switches and motion detectors helps to reduce the energy required for a building to function with occupants, and simultaneously increases the life of many illumination components such as light sources (light bulbs and equivalents thereto) since the light sources are only required intermittently. As another example, a room where movies, slides, computer or other visual or audio-visual presentations are given, such as a boardroom or classroom, will preferably have light controls such as separate switches or switches and dimmer controls which enable the entire room to be well lit or alternatively maintain a minimum level of illumination normally opposite to where the presentation is displayed. This minimum level of illumination enables occupants sufficient light for note-taking, safe movement and other important activities, without interfering with the legibility of a presentation. In yet another example, a primary work-space such as a desk or kitchen counter will require illumination that does not cast shadows on the work space while work is being performed. Complementary illumination, such as windows or skylights, is also important in design consideration.

Nearly all public buildings rely on a great many lamps positioned throughout the interior of the building, such as along hall corridors and in each room, and also about the exterior. These lights have historically been activated manually, though more recently a small but growing number are activated according to occupancy, proximity or motion sensors, typically incorporating the well-known Infra-Red (IR) motion sensors. Architects are commonly employed to assist not only with a floor plan of physical spaces, but also with the proper selection and layout of lighting to best complement the floor plan and usage of each space within a building. As may be appreciated, illumination of a space is determined at the time of production of blueprints, in anticipation of construction. The illumination that has been chosen for a space is essentially fixed during building construction. Changes may be made later, but not without substantial additional expense that will, for exemplary purposes, often include removal of parts of or entire walls, with the accompanying disruption of the space. Often the space is unavailable for use during the entire duration of a remodeling project.

Further complicating the issue of illumination is the type of light bulb that may be most appropriate for a space or location. Original electric light bulbs were incandescent. With sufficient electrical energy, which is converted to heat within an incandescent bulb filament, the filament will emit visible light. This is similar to a fire, where with enough heat, visible light is produced. As might also be appreciated though, incandescent bulbs produce far more heat than light. The color of the light from these bulbs is also most commonly quite yellow, casting a warm hue at a color temperature typically in the vicinity of 3,000 degrees Kelvin. Warm hues are often prized in relaxed settings such as those of a living room or dining room, more closely resembling gentle candle light. However, in contrast thereto, work and study environments are more preferably illuminated with light of more blue content, more closely resembling daylight with color temperatures of approximately 6,000 degrees Kelvin. Daylight color temperatures are not practically obtained using an incandescent bulb. In addition, these incandescent bulbs have only a few thousand hour life expectancy, even with more than a century of improvements, because the extreme temperatures required for the filament to light also gradually evaporates the filament material. Finally, the thermal mass of the filament greatly influences how quickly the filament both illuminates and extinguishes. In spite of the many limitations, incandescent bulbs are still in fairly wide-spread use today.

An alternative to incandescent light bulbs in common use today is the fluorescent bulb. A fluorescent light bulb uses a small amount of mercury in vapor state. High voltage electricity is applied to the mercury gas, causing the gas to ionize and generate some visible light, but primarily UltraViolet (UV) light. UV light is harmful to humans, being the component that causes sun burns, so the UV component of the light must be converted into visible light. The inside of a fluorescent tube is coated with a phosphorescent material, which when exposed to ultraviolet light glows in the visible spectrum. This is similar to many glow-in-the-dark toys and other devices that incorporate phosphorescent materials. As a result, the illumination from a fluorescent light will continue for a significant time, even after electrical power is discontinued, which for the purposes of the present disclosure will be understood to be the latent period or latency between the change in power status and response by the phosphor. As the efficiencies and brightness of the phosphors has improved, so in many instances have the delays in illumination and extinguishing, or latency, increased. Through the selection of ones of many different modern phosphorescent coatings at the time of manufacture, fluorescent bulbs may be manufactured that produce light from different parts of the spectrum, resulting in manufacturing control of the color temperature, or hue or warmness of a bulb.

The use of fluorescent bulbs, even though quite widespread, is controversial for several reasons. One source states that all pre-1979 light ballasts emit highly toxic Polychlorinated BiPhenyls (PCBs). Even if modern ballasts are used, fluorescent bulbs also contain a small but finite amount of mercury. Even very small amounts of mercury are sufficient to contaminate a property. Consequently, both the manufacture and disposal of mercury-containing fluorescent tubes is hazardous. Fluorescent lighting has also been alleged to cause chemical reactions in the brain and body that produce fatigue, depression, immuno-suppression, and reduced metabolism. Further, while the phosphor materials may be selected to provide hue or color control, this hue is fixed at the time of manufacture, and so is not easily changed to meet changing or differing needs for a given building space.

Other gaseous discharge bulbs such as halide, mercury or sodium vapor lamps have also been devised. Halide, mercury and sodium vapor lamps operate at higher temperatures and pressures, and so present undesirably greater fire hazards. In addition, these bulbs present a possibility of exposure to harmful radiation from undetected ruptured outer bulbs. Furthermore, mercury and sodium vapor lamps generally have very poor color-rendition-indices, meaning the light rendered by these bulbs is quite different from ordinary daylight, distorting human color perception. Yet another set of disadvantages has to do with the starting or lighting of these types of bulbs. Mercury and sodium vapor lamps both exhibit extremely slow starting times, often measured by many minutes. The in-rush currents during starting are also commonly large. Many of the prior art bulbs additionally produce significant and detrimental noise pollution, commonly in the form of a hum or buzz at the frequency of the power line alternating current. In some cases, such as fluorescent lights, ballasts change dimension due to magnetostrictive forces. Magnetic field leakage from the ballast may undesirably couple to adjacent conductive or ferromagnetic materials, resulting in magnetic forces as well. Both types of forces will generate undesirable sound. Additionally, in some cases a less-optimal bulb may also produce a buzzing sound.

When common light bulbs are incorporated into public and private facilities, the limitations of prior art bulb technologies often will adversely impact building occupants. As just one example, in one school the use of full-spectrum lamps in eight experimental classrooms decreased anxiety, depression, and inattention in students with SAD (Seasonal Affective Disorder). The connection between lighting and learning has been conclusively established by numerous additional studies. Mark Schneider, with the National Clearinghouse for Educational Facilities, declares that ability to perform requires "clean air, good light, and a quiet, comfortable, and safe learning environment." Unfortunately, the flaws in much of the existing lighting have been made worse as buildings have become bigger. The foregoing references to schools will be understood to be generally applicable to commercial and manufacturing environments as well, making even the selection of types of lights and color-rendition-indexes very important, again depending upon the intended use for a space. Once again, this selection will be fixed, either at the time of construction when a particular lighting fixture is installed, or at the time of bulb installation, either in a new fixture or with bulb replacements.

A second very important area associated with building management is energy management. The concern for energy management is driven by the expense associated with energy consumed over the life of a building. Energy management is quite challenging to design into a building, because many human variables come into play within different areas within a building structure. Considering the foregoing discussion of lighting, different occupants will have different preferences and habits. Some occupants may regularly forget to turn off lights when a space is no longer being occupied, thereby wasting electricity and diminishing the useful life of the light bulbs. In another instance, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands large relative to total consumption of power, simply due to the relatively large amount of power that will rush in to the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices. Control over inrush current is therefore very desirable, and not economically viable in the prior art.

Energy management also includes consideration for differences in temperature preferred by different occupants or for different activities. For exemplary purposes, an occupant of a first office space within a building may prefer a temperature close to 68 degrees Fahrenheit, while a different occupant in a second office space may prefer a temperature close to 78 degrees Fahrenheit. The first and second office spaces may even be the same office space, just at different times of day. For exemplary purposes, an employee working in a mail room from 8 a.m. until 4 p.m. may be replaced by a different mail room employee who works from 4 p.m. until 12 a.m. Heating, Ventilation, and Air Conditioning (HVAC) demand or need is dependent not only upon the desired temperature for a particular occupant, but also upon the number of occupants within a relatively limited space. In other words, a small room with many people will require more ventilation and less heating than that same room with only one occupant.

With careful facility design, considerable electrical and thermal energy can be saved. Proper management of electrical resources affects every industry, including both tenants and building owners. In the prior art, this facility design has been limited to selection of very simple or basic switches, motion detectors, and thermostats, and particular lights, all fixed at the time of design, construction or installation.

A third very important area associated with building management is security. Continuing to use a school as but one example of a public building, a one-room country school fifty years ago was made up of one teacher who knew well the small number of pupils. Security consisted of a simple padlock on a wooden door. The several windows on one side of the room provided light. They were locked but almost never broken into, for nothing of major value, even during the Depression, enticed potential thieves.

Architecture changed as the years passed. Buildings were enlarged as school populations increased. Students started to conceal books, outerwear, valuables, and occasionally even weapons in enclosed lockers. Indoor lighting was required. Eventually as society became more hazardous, security had to be provided in many schools in the form of personnel who were required to patrol both outside and inside schools in order to provide a measure of safety.

In many public buildings, including schools, modern security presently screens a building's occupants to ensure that they belong or have proper authorization to enter the building. Security must also check for weapons, drugs, and even explosives. Thus, modern security personnel are often responsible for property as well as people. As the types of potential perils increase, so does the need for personnel, to process occupants through more and more stations. For exemplary purposes, in schools, airports, court houses, and other public facilities, one or more guards may check identification, admission badges or paperwork, while one or more other guards monitor metal detectors. One or more additional guards may be monitoring drug sniffing dogs or equipment, or spot checking bags. Unfortunately, the possibilities of duplication and/or forgery of credentials, or of hostile powers infiltrating security, or other criminal methods demonstrate the potential weaknesses of the present system, which depends upon a large number of security employees. Motion sensors and other prior art electronic security measures, while often beneficial, occasionally fail even when used in combination with security personnel to provide adequate protection. On the outside of a building, motion sensors may be activated by strong winds, stray animals, passing vehicles, or blowing debris. Inside, they operate only for a specific time; a room's occupant, if not moving about, may suddenly be in the dark and must re-activate the light by waving or flailing about.

An increasingly complex, and therefore hazardous, society requires increasingly extensive patrols and safeguards. Current security system, which must rely on increasing the numbers of guards and security devices, are subject to inherent defects and extraordinary expense, generally rendering them inadequate even with the best of intention.

Yet another very important area associated with building management is guidance control and indication, which impacts building security, as well as building convenience and efficiency for occupants. In buildings having many alternative hallways or paths, such as are commonly found in hospitals and other large public facilities, directions are often clumsy and difficult for visitors or emergency personnel to follow. Old-fashioned directories may be hard to locate or decipher, especially for non-English speakers or for persons with little or no time, again such as emergency personnel. Consequently, some buildings provide color stripes along walls that serve as color coding to guide visitors to various areas within the building. Unfortunately, the number of color stripes that may be patterned is quite limited, and the expense and defacing of appearance associated therewith is undesirable. Furthermore, such striping does not completely alleviate confusion, and the color stripes can only serve as general guides to commonly visited areas.

In addition to their numerous uses with building management, LEDs can be used in networking applications. In any network, a variety of client devices will communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet.

A variety of client devices have heretofore been enabled to connect to host devices. Such client devices may commonly include computing devices of all sorts, ranging from handheld devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Existing client devices are designed to connect to host network access points through wired connections, like copper wire, for example, fiber optic connections, or as wireless connections, such as wireless routers. In the case of a wired system, whether through simple wire, twisted wire, co-axial cable, fiber optics or other line or link, the host and client are tethered together through this physical communications channel. The tether, as may be appreciated, limits movement of the client relative to the host, is often unsightly and hard to contain in a workspace, and so may even be or become a tripping hazard. In addition, electrical connectors such as jacks must be provided, and these connectors necessarily limit the number of access points and locations. The installation of connectors defaces walls, sometimes rendering them unsuitable for a particular desired application, and yet they add undesirable installation expense, whether during new construction or in retrofitting an existing building structure.

In contrast, in the case of wireless routers, an RF signal replaces the physical communications channel with a radio channel. This advantageously eliminates the wire or fiber tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices are utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components.

The security of these prior art wireless devices can be compromised in that they are vulnerable to unauthorized access or interception, and the interception may be from a significant distance, extending often well beyond physical building and property boundaries. Moreover, reliability can be hindered by interference from an appliance such as a microwave oven.

Buildings can encompass a very large number of rooms or discrete spaces, each functioning relatively independently from each other. Where the rooms or discrete spaces together form a larger entity such as a business, public institution or facility, or the like, which have attempted to include synchronized time keeping throughout the entity. A large number of buildings, both public and private, have synchronized clocks installed therein.

These same buildings also have a number of additional features including, for exemplary purposes though not limited thereto, fire and smoke detection, temperature control, and public address. Because of the ever-changing nature of a building and the best practices associated therewith, it can be quite difficult if not impossible to keep all areas within a building up to date with best practices or preferred capabilities. One method of desirable features or capabilities within a building space is through the use of electrical wiring adequate to accommodate the features or capabilities, particularly when the features or capabilities are identified subsequent to original construction.

For exemplary purposes, a building may accommodate very different numbers of occupants at different times within a relatively enclosed space, such as a meeting or class room. The number of occupants is known to significantly alter the temperature and associated need for HVAC control. Furthermore, other factors, such as weather conditions and sunlight or lack thereof through windows in a room may have as much or greater effect on the need for HVAC control. However, many older buildings were only provided with a single central thermostat, providing the same amount of heating or air conditioning to a room or other space regardless of demand for the same. Newer HVAC systems enable control, through electrically controlled dampers or vents within the HVAC system to much more precisely respond to the needs of a single space or room within a building. However, without providing wiring within the room to accommodate the thermostat and various duct controls, the room may not be individually controlled.

Even where a building is originally provided with appropriate wiring for each electrical system or component desired, necessary remodeling may critically alter the need. As one example, consider when a room or space is subdivided into two smaller spaces. Existing wiring only provides for electrical connection to one set of devices for one room. In this case, it may be necessary to run new wires back to one or more central locations, utility rooms, or the like to accommodate the new room and devices within the room.

More buildings are incorporating wireless networks within the building, the networks which are intended to reduce the need for wiring alterations and additions practiced heretofore. However, these wireless networks are not contained within the walls of a building, and so they are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. If only one room or space in a building is to be covered, this signal overlap is without consequence. However, when many rooms are to be covered by different transceivers, signal overlap between transceivers requires more complex communications systems, including incorporating techniques such as access control and device selection based upon identification. Since the radio signal is invisible, detection of radiant pattern and signal strength are difficult and require special instruments. Further, detection of interference is quite difficult. Finally, such systems are subject to outside tapping and corruption, since containment of the signal is practically impossible for most buildings.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

GENERAL DESCRIPTION OF THE INVENTION

The present application is also related to the patent application entitled "Led Light Dongle Communication System," patent application Ser. No. 12/126,227, filed contemporaneously herewith, which is incorporated herein by reference in its entirety. Also, the present application is also related to the patent application entitled "Building Illumination Apparatus with Integrated Communications, Security and Energy Management," patent application Ser. No. 12/126,342, filed contemporaneously herewith, which is incorporated herein by reference in its entirety. Also the present application is related to the patent application entitled "LED Light Interior Room and Building Communication System," patent application Ser. No. 12/126,647, filed contemporaneously herewith, which is incorporated by reference herein it its entirety. Further, the present application is also related to the patent application entitled "LED Light Broad Band Over Power Line Communication System," patent application Ser. No. 12/126,469, filed contemporaneously herewith, which is incorporated by reference herein in its entirety. The present application is also related to the patent application entitled "LED Light Global Positioning And Routing Communication System," patent application Ser. No. 12/126,589, filed contemporaneously herewith, which is incorporated by reference in its entirety.

According to the invention, there is provided a light emitting diode (LED) communication system which may be depicted in several embodiments. In general, the light communication system may be formed of a single row, single source, or an array of light emitting diode light sources configured on a light support and in electrical communication with a controller and a power supply, battery, or other electrical source. The pulsed light communication system may provide various light signals, colored light signals, or combination or patterns of light signals for use in association with the communication of information. These light signals may also be encoded. Additionally, the light communication system may be capable of displaying symbols, characters, or arrows. Rotating and oscillating light signals may be produced by sequentially illuminating columns of LEDs on a stationary light support in combination with the provision of variable light intensity from the controller. However, the pulsed light communication system may also be rotated or oscillated via mechanical means. The light communication system may also be easily transportable and may be conveniently connected to a stand such as a tripod for electrical coupling to a power supply, battery, or other electrical source as a remote stand-alone signaling or communication device.

The light communication system may be electrically coupled to a controller used to modulate, pulse, or encode, the light generated from the light sources to provide for various patterns or types of illumination to transmit messages.

Individual light supports as a portion of the LED communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LEDs, to regulate or modulate the light intensity for the LED light sources. The individual LEDs and/or arrays of LEDs may be used for transmission of communication packets formed of light signals.

The controller for the LED light support may generate and/or recognize light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

Some embodiments of the present invention utilize an existing master clock that regulates or synchronizes additional slave clocks within a building. Because all of the clocks in the system operate on a dedicated network, the master clock is already connected to all of the rooms or spaces within the building having slave clocks. The present invention couples through the synchronization wire to each room or space. Communications are achieved that connect all rooms in a building that have these master and slave clocks, without changing wiring. Also since these synchronized clocks have dedicated electrical wiring for the synchronization signal that is separated from the AC power wiring, the synchronization wire is not subject to such severe interference as might be found on the building's AC power wiring.

In some embodiments of the present invention a clock with an optical transceiver delivers network access by way of LED transceivers. Since in many buildings clock systems with synchronization wiring is already in place, there is no need to install additional expensive and inconvenient wiring.

In some embodiments of the present invention a clock with an optical transceiver is integrated into systems, such as security, safety, HVAC and other diverse functions. In some embodiments of the present invention a clock with an optical transceiver provides for several types of communications with a room and electrical devices therein, including audible, visual and optical LED communications. In some embodiments of the present invention a clock with an optical transceiver improves security, because light does not go through walls, in contrast to radio communications, and steps can be taken to obstruct visible transmissions with a much greater certainty than with radio waves. In some embodiments of the present invention a clock with an optical transceiver limits or directs visible light by known optical components such as lenses and reflectors to selectively narrow the radiant transmission energy, as opposed to omni-directional transmissions. In some embodiments of the present invention a clock with an optical transceiver reduces interference with existing communication systems like those that are common today. In some embodiments of the present invention a clock with an optical transceiver facilitates and simplifies set-up, testing, troubleshooting and the like with respect to various facility systems. In some embodiments of the present invention a clock with an optical transceiver generates relatively high energy outputs using the preferred visible light communications channel, since the human eye is adapted and well-protected against damage from visible light. In contrast, many invisible transmission techniques such as Ultraviolet (UV) or Infra-Red (IR) systems have much potential for harm.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 10A is an environmental view of an alternative embodiment of the LED Communication System.

FIG. 12 is a block diagram of an alternative embodiment of the LED Communication System, depicting light sources in communication with a broadband over power line service.

FIG. 13 is an environmental view of an alternative embodiment of the LED Communication System.

FIG. 14 is a block diagram of an exemplary embodiment of a data packet.

FIG. 15 is an environmental view of an alternative embodiment of the LED Communication System.

FIG. 16 is a front view of an alternative embodiment of the LED Communication System.

FIG. 17 is a front view of an alternative embodiment of the LED Communication System.

FIG. 18 is an environmental view of an alternative embodiment of the LED Communication System.

FIG. 19 is an environmental and block diagram view of an alternative embodiment of the LED Communication System.

FIG. 24 is a front view of a traffic semaphore and pulsed light OPTICOM system;

FIG. 24A is an environmental view of an emergency vehicle and pulsed light OPTICOM system;

FIG. 25 is an environmental view of an LED pulsating light signal between two vehicles;

FIG. 26 is an environmental detail view of a license plate LED pulsating light signal system;

FIG. 27 is a partial cross-sectional top view of a license plate LED pulsating light signal system;

FIG. 31 is an environmental view of an LED pulsating light signal and railroad crossing;

FIG. 32 is a detailed view of an LED pulsating light signal and railroad crossing indicator;

FIG. 45 illustrates by isometric projected view a first embodiment of a slave clock combined with optical transmitter and receiver in accord with the teachings of the present invention.

FIG. 46 illustrates by isometric projected view a second embodiment of a slave clock combined with optical transmitter and receiver in accord with the teachings of the present invention.

FIG. 47 illustrates by projected environmental view an embodiment of a communications network incorporating master and slave synchronized clocks.

FIG. 48 illustrates by front environmental view an embodiment of a building communication and management system within one room or space, using a single slave clock to communicate with a variety of diverse devices through optical LED communication channels.

DETAILED DESCRIPTION OF THE PREFERRED EMBODIMENTS

Figure 1:
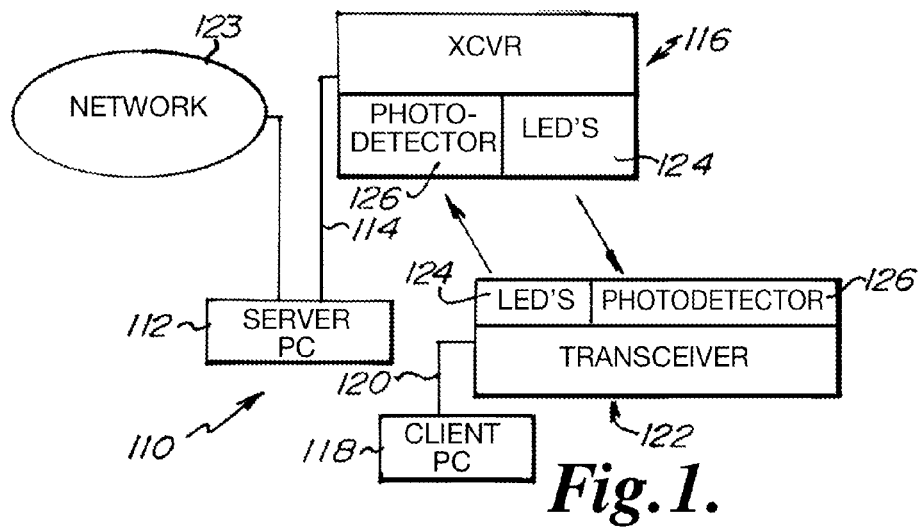
FIG. 1 is a block diagram of one embodiment of the LED Communication System.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In each of the embodiments discussed below, the LEDs may be formed of the same or different colors. The controller may be configured to select the color of the LEDs to be illuminated forming the light signal.

It is also envisioned that the controller may control supports having multiple sides, such that each side is capable of producing light signals or combinations of light signals that are independent and/or different from those produced upon the other sides.

In one embodiment, the controller may regulate the illumination of the LED light sources individually, or in combination, to provide a desired light signal or LED signal. Also, the controller may illuminate the LED light sources independently with respect to an opposite side of a support to provide different light effects to be observed by an individual dependant upon the location of the person relative to the light source. The controller may also simultaneously or independently regulate the light intensity for the LED illumination sources.

Figure 23:
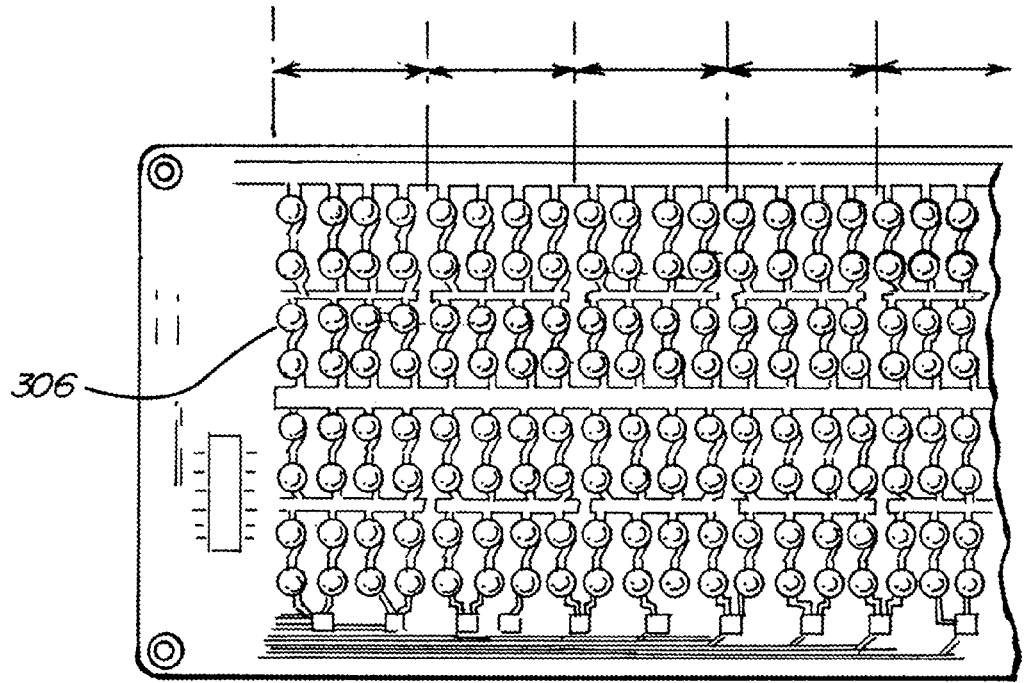
FIG. 23 is an alternative detailed view of an LED light source having sectors.

In the embodiments disclosed herein, the controller may also regulate and/or modulate the duty cycle for the light sources, thereby varying the intensity of the observed light. The controller may be utilized to simultaneously provide modulated or variable light intensity to different and/or independent sections, areas, and/or sectors 326 of a light source (FIG. 23). Also, the controller may be utilized to simultaneously provide modulated or variable light intensity to different and/or independent sectors, areas, and/or sections 326 of the forward facing side or rearward facing side of a light support for the provision of different light signals, or a different light effects, on each side.

FIG. 1 depicts an exemplary embodiment 110 of an LED light and communication system. FIG. 1 shows a server PC 112 connected via a USB cable 114 to a server optical transceiver (XCVR) 116, and a client PC 118 connected via a USB cable 120 to a client optical transceiver 122. The server PC 112 is in communication with a network 123 via a CAT-5 cable, for example. The server optical XCVR and the client optical XCVR are substantially similar in at least one embodiment. An exemplary optical XCVR (or, simply, "XCVR") circuit includes one or more LEDs 124 for transmission of light and one or more photodetectors 126 for receiving transmitted light. LEDs and photodetectors are known and, as such, their specific operation will not be described in detail. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072,587, the entire contents of which are expressly incorporated herein by reference.

The XCVR circuit can be a Universal Serial Bus (USB) dongle, such as shown in FIGS. 8A-8D, or similar device that is plugged into a laptop computer or other USB-configured device. The dongle, or similar device, allows hardware like printers, etc. that were not originally designed with an optical XCVR to be easily retrofitted to permit optical communications. As seen in FIGS. 8A-8D, USB dongle 1000, includes a USB plug 1020 which is in the preferred embodiment most desirably compatible with standard USB connectors found on many devices. USB connectors are found on nearly all recently manufactured printers, PCs, flash drives, portable media players such as MP-3 and video players, and a plethora of other devices. While USB plug 1020 is preferred, owing to the wide availability of USB-enabled client devices, it is contemplated herein that the physical and electrical interface may comprise other standards or alternative constructions. As but one example, an IEEE-1394 (Firewire) interface may be provided alternatively or in addition to USB plug 1020. USB dongle 1000 is in the most preferred embodiment physically small, such that it may plug into diverse client devices for the purpose of providing data access and communication without mechanically interfering with the placement or use of the client device.

Instead of relying on radio frequencies, USB dongle 1000 communicates through a light communications channel. Data signals carried upon an optical transmission are received from a host through photodetector 1040. Data signals are transmitted to the host by LED 1060. Most preferably, photodetector 1040 and LED 1060 are isolated by a visible barrier, which may be a simple protrusion 1080. Recesses and other optical barriers are further contemplated herein to serve as isolation from emitter-receiver feedback.

Figure 8A:
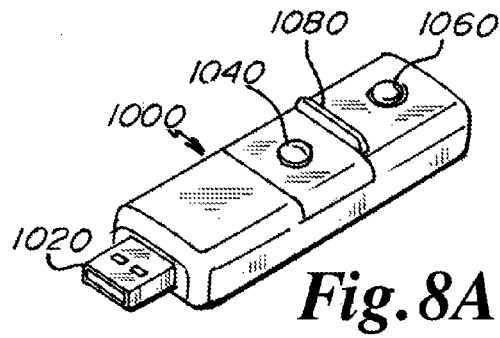
FIGS. 8A-8D are various views of a USB dongle device using an LED light and communication system.
Figure 8B:
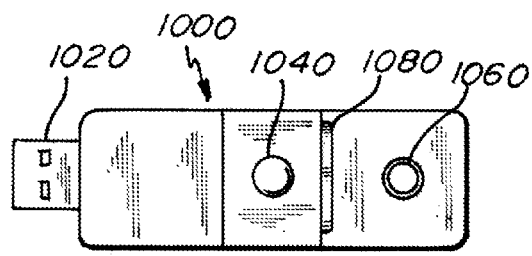
Figure 8C:
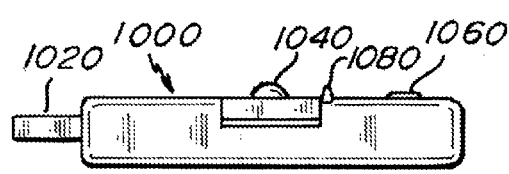
Figure 8D:
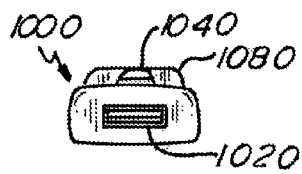
Figure 8E:
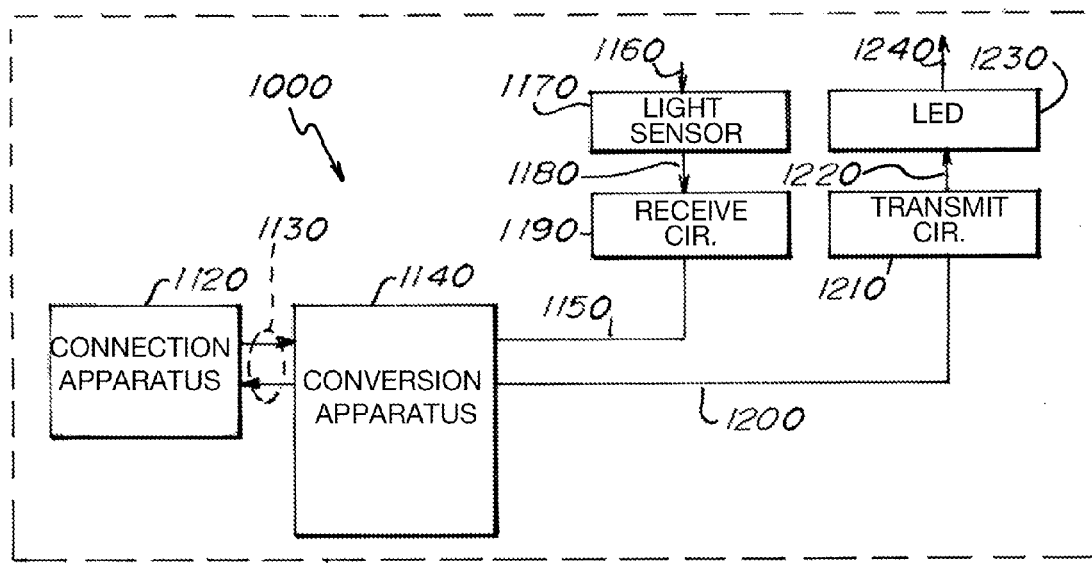
FIG. 8E is a block diagram of an exemplary embodiment of the USB Dongle device using an LED light and communication system.

USB dongle 1000 is enabled to electrically connect to any client that accepts USB plug 1020, or other connector substituted or provided in addition thereto. FIG. 8E illustrates through schematic block diagram an exemplary electrical design of a USB dongle. To be recognized by the client device, the USB dongle will have to obey the electrical and communications specifications for the particular connection type. Consequently, in the preferred embodiment, the USB dongle will comply with both physical and electrical USB specifications through a suitable connection apparatus 1120, allowing connection to a USB host.

Referring now to FIG. 8E, the USB-compliant signal 1130 is not, in the preferred embodiment, the preferred signal format for optical transmission or reception. Consequently, transmission of USB-compliant signals 1130 will require conversion through conversion apparatus 1140 to suitable optical transmission format required at transmit signal 1200. For exemplary purposes, if the USB specification uses a differential signaling method using two wires for data, it may be desirable to convert USB-compliant signal 1130 to a different signaling standard, such as a single-ended signaling scheme like the well-known RS-232 standard, which uses a single line for data. Conversion apparatus 1140 will, in accord with the preferred embodiment, be configured to provide the selected electrical conversion. Transmit circuitry 1210 may, in the preferred embodiment, simply be appropriate buffering, isolation, modulation or amplification circuitry which will provide appropriate voltage and power through drive signal 1220 to adequately drive LED 1230 into producing a data-bearing visible light transmission 1240. Exemplary of common transmit circuitry are operational amplifiers (op-amps) and transistor amplifiers, though those skilled in the art of signal conditioning will recognize a plethora of optional circuits and components which might optionally be used in conjunction with the present invention. In one conceived embodiment, the data-bearing visible light transmission may further be modulated, using FM, AM, PWM, PPM, OFDM, QAM or other known modulation techniques.

Similar to the transmission circuitry, USB dongle 1000 also incorporates reception circuitry for receiving data from a data-bearing visible light wave input signal 1160. Data-bearing visible light wave 1160 will be detected by light sensor 1170 and converted to a data-bearing electrical signal 1180. Receive circuitry 1190 will appropriately condition, and may further convert data-bearing electrical signal 1180. As but one example of such conversion, receive circuitry 1190 may additionally demodulate data-bearing electrical signal 1180, if the data stream has been modulated by an optical host, and suitable buffering, amplification and other conditioning may be provided to yield a received data signal 1150. Conversion apparatus 1140 will convert received signal 1150 to a USB-compliant signal 1130.

The preferred embodiment USB dongle 1000 uses light as the communications channel between client and host, which improves security, reliability, system testing and configuration, bandwidth, infrastructure, etc. Security is greatly increased because light does not go through walls, in contrast to radio communications, and steps can be taken to obstruct visible transmissions with a much greater certainty than with high frequency radio waves. Furthermore, the visible light may additionally be limited or directed by known optical components such as lenses and reflectors to selectively form beams, as opposed to omni-directional transmissions.

The optical link does not interfere with existing communication systems like those that are common today. Consequently, the preferred embodiment may be used in a variety of applications where prior art systems were simply unable due to EMI/RFI considerations.

Set-up, testing, troubleshooting and the like are also vastly simplified. When the light communication system is working, the user can actually see the illumination. If an object interferes with light transmission, the user will again immediately recognize the same. Thus, the ease and convenience of this light system adds up to greater mobility and less cost. In addition, relatively high energy outputs may be provided where desired using the preferred visible light communications channel, since the human eye is adapted and well-protected against damage from light. In contrast, many invisible transmission techniques such as Ultraviolet (UV) or Infra-Red (IR) systems have much potential for harm.

A host lamp fixture system replaces stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

When a client (such as a laptop) asks for channels, the host responds with the location of the channels. Lights in a ceiling, for example, will communicate with any capable transceiver. One suitable method uses BPL (Broadband over Power Lines) for network connection, taking data and embedding it into a carrier frequency or group like radio, but instead using power lines or wave guides for transmission throughout an existing set of power lines within a building. Thus, a building needs to be wired only for lights, saving a huge infrastructure of other wires and fixtures, saving a great deal of money.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Modulation and demodulation techniques for modulating light signals are known by those of ordinary skill in the art. Examples of such techniques are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

Figure 2:
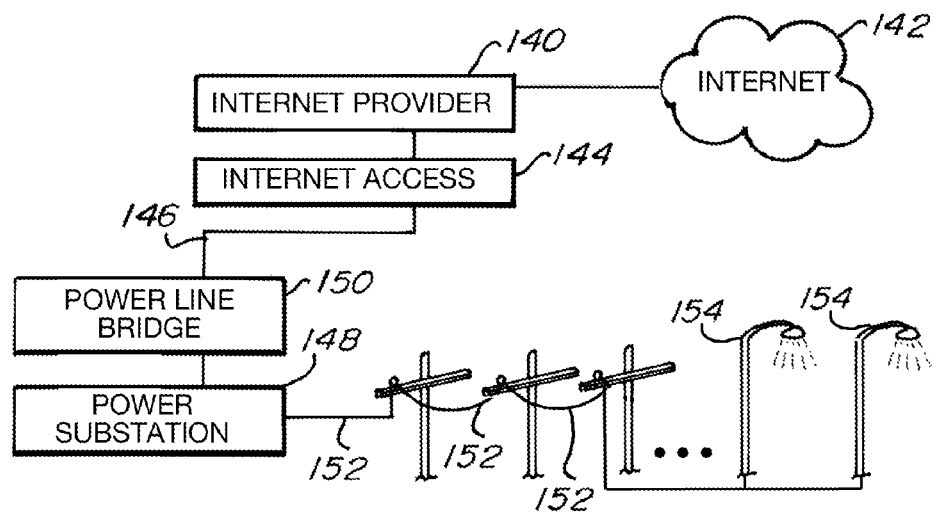
FIG. 2 is a block diagram of an alternative embodiment of the LED Communication System.
Figure 3:
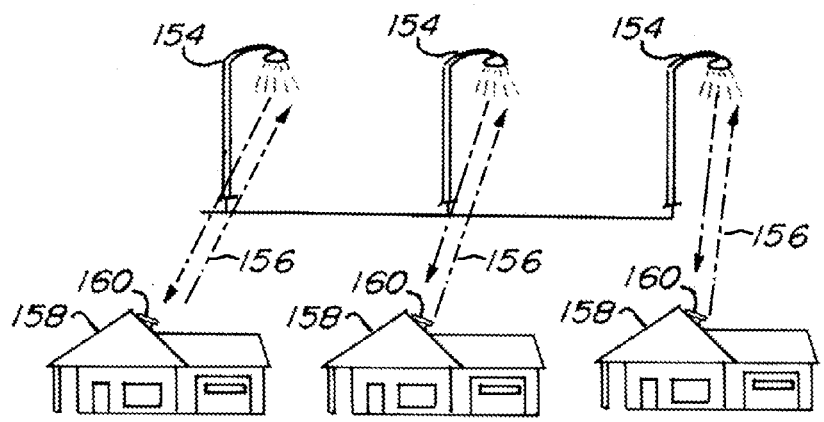
FIG. 3 is a block diagram of an alternative embodiment of the LED Communication System.
Figure 4:
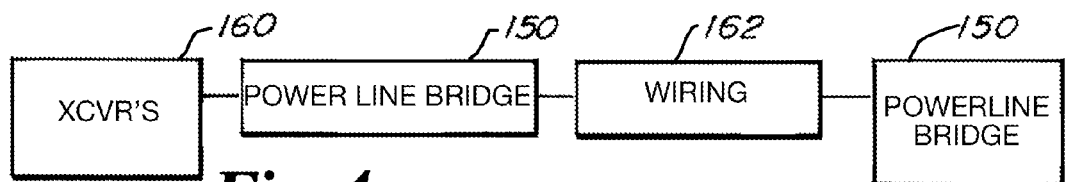
FIG. 4 is a block diagram of an alternative embodiment of the LED Communication System.

FIGS. 2-4 depict an embodiment of the present invention. In FIGS. 2-4, an application of the LED light and communication system of FIG. 1 is shown. In such an embodiment, the LED light and communication system is integral to a broadband over power line (BOPL) communications system. FIG. 2 shows a simplified block diagram of how Internet access can be provided with the optical XCVR described with respect to FIG. 1. In FIG. 2, an Internet Provider 140, connected to the Internet 142, provides Internet Access 144 via fiber optic cable 146, or other transmission medium, to a power substation 148 (4 kV-30 kV, for example). In order to inject the signals onto the power lines, a power line bridge 150 is provided that can modulate, alter, or otherwise adapt the Internet signals (not shown) for transmission over the power lines. As mentioned above, this is a simplification. More information may be found in U.S. Pat. No. 7,349,325, the entire disclosure of which is expressly incorporated herein by reference. As used herein, the term "power line bridge" is used to denote any device that is capable of injecting Internet signals onto power lines, whether it is located at a substation or power line, home, business, etc., or any device that can extract an Internet signal from the power lines in a home, business, etc.

Figure 6:
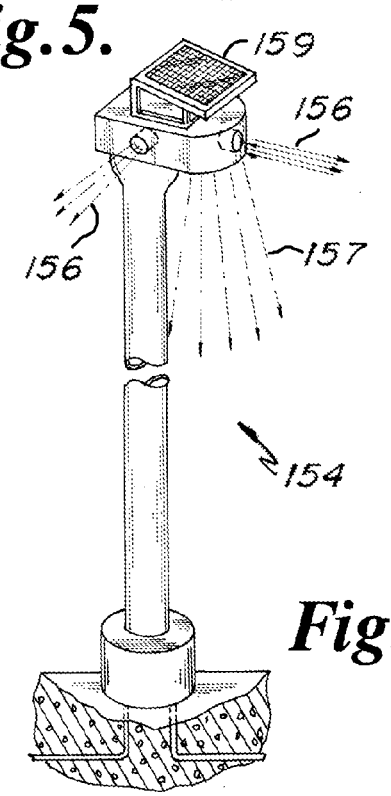
FIG. 6 is an isometric view of an alternative embodiment of the LED Communication System transmitter/receiver.

Still referring to FIG. 2, the data signals exit the distribution substation on the distribution bus (not shown) and are then injected onto the power lines 152 (either overhead or, preferably, underground). In the embodiment depicted in FIG. 2, the power lines are fed to street lights 154. Each street light 154 is adapted to use an optical XCVR, such as those described above. Although it is envisioned that current street lamp light sources would be replaced with optical XCVRs, in some embodiments, the optical XCVRs can be used in conjunction with current street lamp light sources. Prior to broadcasting the data via a light signal from the LED street light, the data must be extracted via demodulation techniques from the power supplied to the street light (not shown). An exemplary street light is shown in FIG. 6.

Using street lamps as an Internet connection point takes advantage of the ubiquity of street lighting. Additionally, a major problem for amateur radio enthusiasts would be dramatically reduced by the use of street lights in the above manner. Amateur radio enthusiasts are greatly concerned with the noise generated and radiated when power lines are used for broadband transmission. However, electricity is generally supplied to street lamps via underground cables and through internal wiring in the street light columns (see FIGS. 6 and 7 for example). This design significantly reduces the amount of RF noise radiated during transmission of the signals. And, when finally broadcast, the signal is in light form and is thus not a source of RF noise.

Turning now to FIG. 3, FIG. 3 shows a graphical representation of how the street lights of FIG. 2 form an optical link 156 with customers 158. In FIG. 3, residential homes are depicted, but the technology can of course be used for commercial, industrial, or any other customer desiring broadband access. The optical XCVRs in the street lights transmit light to and receive light from the optical XCVRs 160 that are placed at the customer site.

FIG. 4 is a simplified block diagram depicting how a customer's optical XCVR provides Internet access to the customer via the customer's electrical wiring.

The customer's optical XCVR 160 is in operative communication with a power line bridge 150. The power line bridge 150 modulates the signal sent via the street light and injects the modulated signal onto the customer's electrical wiring 162, usually at 120-240 VAC. In at least one embodiment, the modulated signal is injected onto the electrical wiring at the electrical mains feed at the circuit breaker panel. This embodiment injects the signal to all electrical circuits at the customer site, providing access to the signal on each electrical circuit in the home, etc. In some embodiments, rather than injecting onto the electrical wiring at the electrical mains feed at the circuit breaker panel, the modulated signal can be injected onto specific electrical circuits, if desired.

After signals are injected onto the customer's electrical wiring, a number of methods are available for transmitting the data to the end user. In some embodiments, another power line bridge 150 is used to demodulate the signal from the electrical power. For example, a power line bridge similar to a BellSouth®Powerline USB Adapter may be used. Of course, a power line bridge can also be Ethernet compatible. The power line bridge can plug into an electrical outlet, demodulate the signal from the electrical power, and transmit the signal to electronic equipment requiring Internet access.

In at least one embodiment, the signal is in operative communication with the electronic equipment via cables, such as Ethernet cables.

In other embodiments, the power line bridge plugged into the electrical outlet includes an optical XCVR, and instead of cables, an optical link provides the transmission medium to the electronic equipment. The light signal can be modulated, if desired. Of course, in such an embodiment, another optical XCVR in communication with the electronic equipment receives and transmits data.

In some embodiments, an optical XCVR provides lighting for one or more rooms on the customer premises. In operative communication with the optical XCVR is a power line bridge that demodulates the signal from the electrical power that supplies power to AC/DC converter that supplies power to the LED array of the XCVR. The power line bridge sends the demodulated signal to the optical XCVR for transmission.

It can be desirable, however, to modulate the light signal prior to transmission to reduce the effects of external lighting. The light sent via the optical XCVR over the optical link is received by another optical XCVR in communication with electronic equipment and demodulated, as described above. Such an embodiment can be desirable because each room at a customer premise can be either be designed for or retrofitted with optical XCVRs in the ceiling, for example, for lighting. As such, the main light source in the room doubles as an optical link for electronic equipment. Because the optical XCVRs are located in the ceiling, there are few items that can block the light signal.

Injecting the signal onto the electrical wiring and providing an optical link through LED lighting is advantageous over wireless DSL modems. Often times, metal shelving or other structures on the premises interfere with or even block RF signals, thereby requiring multiple access points. However, providing an optical link through LED lighting in each room, for example, inherently provides multiple access points.

Figure 5:
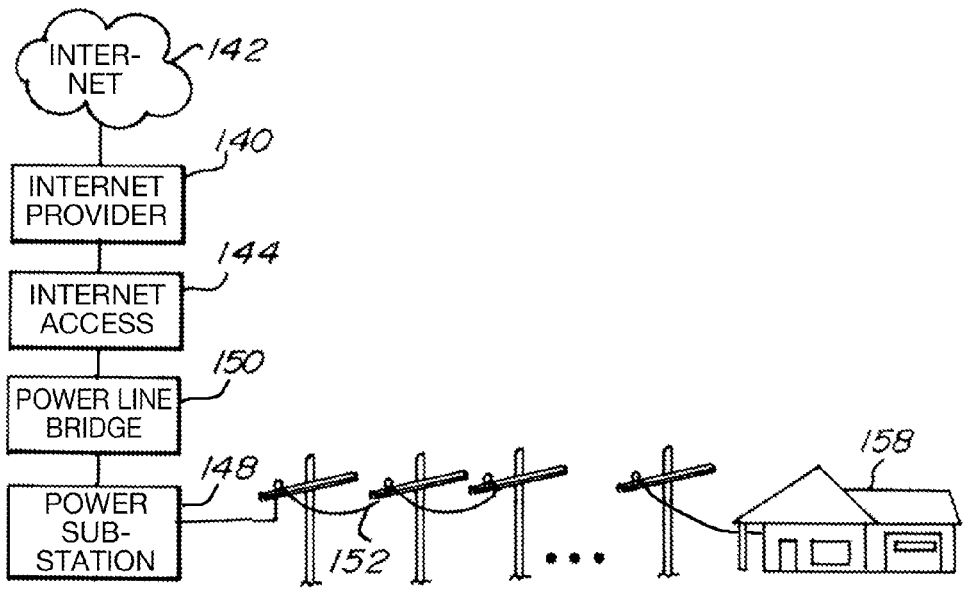
FIG. 5 is a block diagram of an alternative embodiment of the LED Communication System.

In an alternative embodiment, Internet access is provided to a customer's electrical wiring by standard BOPL techniques, without the use of LED lighting in street lights, for example, such as described in U.S. Pat. No. 7,349,325 and shown in FIG. 5. However, once the signal is on the customer's electrical wiring, it can be extracted and broadcast over an optical link using optical XCVRs, as described above.

In addition to street lights, traffic signals can include optical XCVRs. As such, vehicles can be receiving information as they drive along streets.

Figure 10C:
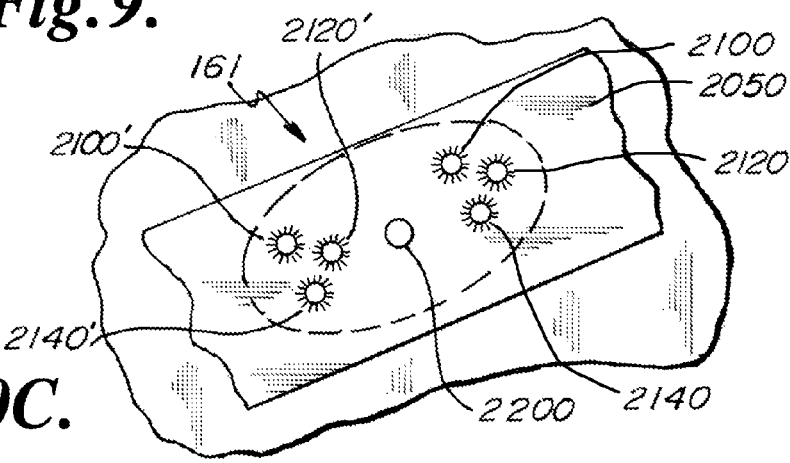
FIG. 10C is a detailed view of an exemplary embodiment of an LED light source.

In another embodiment of the present invention, security badges, ID badges, communications badge, badge, user interface device, or name tags, these terms being used interchangeably hereafter, can include optical XCVRs, as shown in FIG. 10A. The optical XCVR of a user's security badge 170 communicates with the optical XCVRs 160 that are also acting as room lighting, hall lighting, or other lighting 161 in a customer's facility, as shown in FIG. 10A. Of course, the optical XCVRs can be placed in numerous other locations as lighting sources. Using the XCVRs as light sources can reduce energy consumption and simplify communications by reducing the filtering or modulation complexities necessary to distinguish data signals from extraneous lighting sources. As shown in FIG. 10A, a user is shown with a name tag 170 that is broadcasting and receiving data over an optical link 156 using the XCVR described in FIG. 10A to a ceiling mounted fixture. Badge 170 is pinned to, affixed with or otherwise transported by a person, in the embodiment as illustrated as a replacement for standard security identification badges.

Figure 10B:
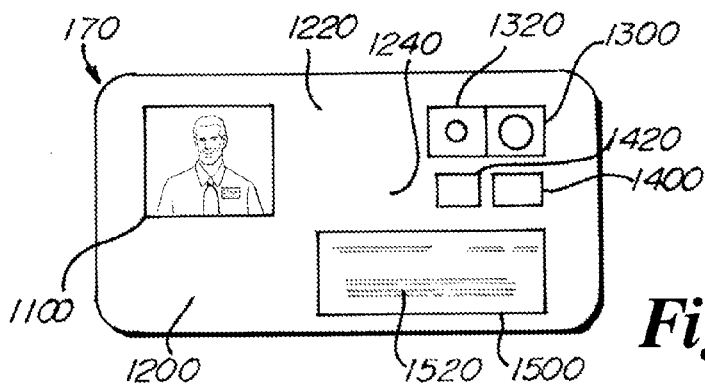
FIG. 10B is a detailed view of an exemplary embodiment of a security badge.

Badge 170 is illustrated in greater detail in FIG. 10B, and may include features commonly found in standard security identification badges, including but not limited to such attributes as a photograph 1100 of the person assigned to the badge, and indicia such as employee identification or number 1200, name 1220, and business or entity logos 1240. Business or entity logos 1240, or other components may integrate anti-counterfeiting technology as may be available or known for such diverse applications as passports, driver's licenses, currency and other applications. Commonly used devices include holograms, watermarks, special materials or unique threads, and embedded non-alterable electronic, visible, sonic or other identification codes. An optical transmitter 1300 and receiver 1320 are most preferably provided and enable communication over optical communications channel 156. A microphone, loudspeaker, microphone and speaker combination, or dual-purpose device 1400 may be provided to integrate an auditory communication channel between communication badge 170 and nearby living beings or other animate or inanimate objects. A video camera 1420 may be incorporated to capture video or still pictures. A video display 1500 may additionally be incorporated into communication badge 170, permitting information 1520 to be displayed thereon, which could for exemplary purposes could comprise either text or graphics.

Depending upon the intended application for which communication badge 170 is being designed, to include such ordinary factors as cost and desired features, and also upon the size of communication badge 170 and available video resolution within video display 1500, photograph 1100 may in some cases be eliminated and replaced entirely by an electronic representation displayed within video display 1500 either continuously or upon request or polling. Similarly, indicia such as employee identification or number 1200, name 1220, and business or entity logos 1240 may also be provided either as illustrated in FIG. 10B, or in another embodiment solely upon video display 1500.

Biometric detectors and systems may be employed within or in association with communication badge 170. For exemplary purposes, but not limited solely thereto, a fingerprint reader or other biometric detector may be incorporated within badge 170. In such case, periodic or action-driven re-activation may be required to verify that badge 170 is still in proper possession of the person assigned therewith. For exemplary purposes, when a particularly sensitive area is being accessed, or a building first entered, the security system in accord with an embodiment of the present invention may communicate through badge 170 to person and require a fingerprint verification scan. Other biometric indicators may not require active confirmation, and more than one biometric indicator may be incorporated herein.

Communication badge 170 communicates with XCVR 160 in LED light source 161. LED light source 161, illustrated by magnified view in FIG. 10C as a body 2050 that incorporates at least one, and preferably a plurality of LEDs and optical detectors. One or more photodetectors 2200 may be provided, and may either be broad spectrum detectors or alternatively color-filtered or sensitive to only a single color. The detector will be any of the myriad known in the art, the particular selection which will be determined by well-known considerations such as sensitivity, reliability, availability, cost and the like.

As illustrated, LEDs are in clusters of three. In accord with the present invention, these LEDs are RGB LEDs, designating that they include red, blue and green which are the primary additive colors from which all other colors including white may be produced. For exemplary purposes only, LED 2100 may generate red light, commonly of approximately 650 nanometer wavelength, LED 2120 may generate blue light, commonly of approximately 475 nanometer wavelength, and LED 2140 may generate green light, commonly of approximately 565 nanometer wavelength. LEDs 2100-2140 may be discrete components, or may alternatively be integrated onto a common die and take the physical form of a single LED. Furthermore, more than one RGB LED may be integrated upon a single die or within a common package, as may be deemed most appropriate by a manufacturer. A plurality of RGB LEDs may also be provided upon or within a single body 2050, as illustrated in FIG. 1C by RGB LEDs 2100', 2120' and 2140'. In practice, there is no limit to the number of RGB LEDs that may be used, other than physical size and available space limitations, and thermal dissipation capacity and power requirement constraints.

By controlling the relative power applied to each one of the RGB LEDs 2100-2140, different colors may be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors.

Through the use of RGB LEDs, color temperature of an LED light panel 2000 may be adjusted or controlled, and may be varied in real time without making any hardware or apparatus changes. Instead, power applied to the RGB LEDs is adjusted to favor one or another of the RGB LEDs 2100-2140. Since the light emitted from the RGB LEDs is approximately full-spectrum light, the color-rendering index may also be relatively high, particularly when compared to mercury or sodium vapor lamps, making the light feel very natural.

While human eyes are substantially more tolerant of visible light, and while visible light intensity is readily discerned by humans, there is some description in the prior art of potential hazards associated with extreme intensity blue-wavelength illumination. In an embodiment of the invention, safeguards may be programmed or designed into the control of RGB LEDs 2100-2140 to prevent occurrence of conditions that could lead to blue-light hazard or other safety hazard that might potentially exist.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel 156 is created between XCVR 160 and one or more communications badges 170, higher data transfer rates may be obtained with more rapid control of illumination levels. Consequently, if phosphors are used in the generation of light from LED light source 161, and if faster data exchange rates through optical communications channel 156 are desired, these phosphors will preferably be very fast lighting and extinguishing.

A variety of physical and electrical configurations are contemplated herein for LED light source 161. As illustrated in FIG. 10A, light source 161 may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefit, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120 VAC at 60 Hertz in the United States, may pass through the electrical connector pins. LED base 2050, in such case, may be designed to insert directly into a standard fluorescent socket, such as, for exemplary purposes only and not limited thereto, the standard T8 and T12 sockets used in the United States. In such case, either RGB LEDs 2100-2140 are arranged and wired to directly operate from line voltage, or appropriate electronics will need to be provided directly in LED base 2050 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

For LED light source 161 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through optical communication channel 156.

In accord with a preferred method of the invention, LEDs are used to transmit through optical communication channel several kinds of data, including identity, location, audio and video information. The use of an optical communications link provides large available bandwidth, which in turn permits multiple feeds of personal communication between LED light sources and badges similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of a badge and associated person can be discerned to a particular room, hallway or other similar space.

In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. As noted, the large bandwidth permits video signals to be integrated with badge location and movement, providing the opportunity to create audio-video records that are fixed in time and location.

Since location may be relatively precisely discerned, optical transmitter 1300 or LEDs 2100-2140 of FIG. 10B may in one embodiment be configured to change color, flash, or otherwise be visually changed or manipulated to assist with directional guidance, personnel or intruder identification, energy management, or to facilitate the meeting and connection of individuals. To achieve these objectives, a building needs to be wired only for lights, saving a huge infrastructure of other wires and fixtures.

Figure 9:
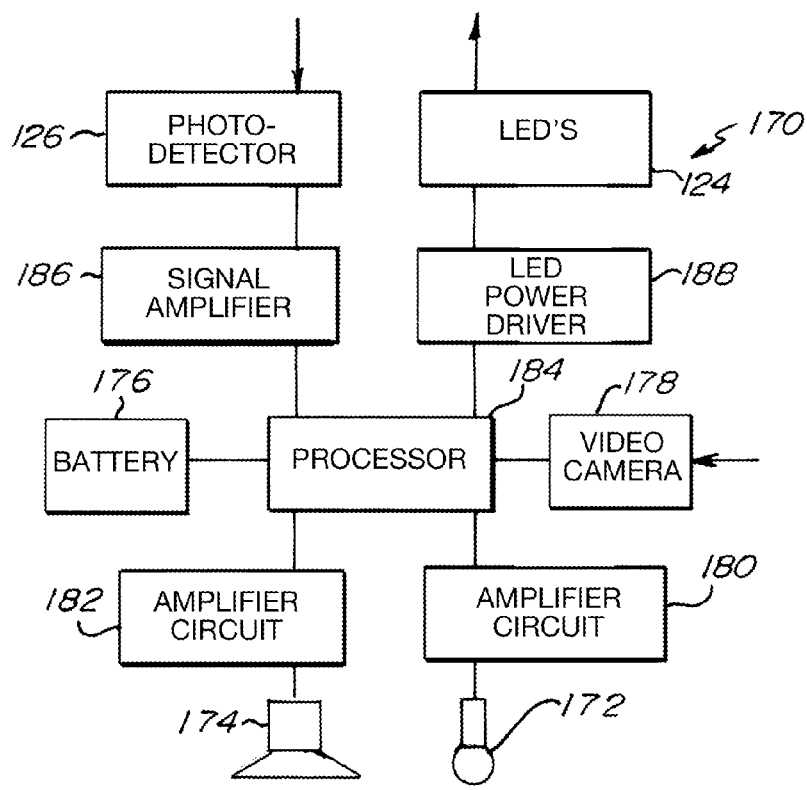
FIG. 9 is a block diagram of an alternative embodiment of the LED Communication System.

Some embodiments of the name tag 170 XCVR include any or all of the following devices: a microphone 172, a speaker 174, a rechargeable battery 176, and a video camera 178, as shown in the simplified block diagram of FIG. 9. In at least one embodiment, the microphone is in communication with an analog-to-digital converter (ADC)(not shown) for converting the analog speech input to a digital signal. An amplifier circuit 180 can be used to boost the microphone signal. The signal can be amplified prior to or after the ADC. In some embodiments, the speaker is communication with a digital-to-analog converter (DAC)(not shown) for converting the received digital signal to an analog output. An amplifier circuit 182 can be used to boost the speaker signal. The signal can be amplified prior to or after the DAC. The processor 184 shown in FIG. 9 converts the digital signals from the microphone/amplifier to data packets that can be used for transmission by the optical XCVR. Similarly, the processor converts the data packets received by the optical XCVR to audio out signals directed to the speaker. The processor can convert data packets received from or directed to the video camera. The term "processor" as used herein refers to a processor, controller, microprocessor, microcontroller, or any other device that can execute instructions, perform arithmetic and logic functions, access and write to memory, interface with peripheral devices, etc.

In such an embodiment, the user can use the name tag as a communication device. Alternatively, the user may use the name tag to stream music, or video if a display is included. Furthermore, the optical XCVR can also include non-volatile memory (FLASHRAM, EEPROM, and EPROM, for example) that can store firmware for the optical XCVR, as well as text information, audio signals, video signals, contact information for other users, etc., as is common with current cell phones. While a hard-drive may be used instead of these semiconductor-based memory devices, hard-drives may be impractical in some embodiments based on their size, access times, as well as their susceptibility to jarring.

The optical XCVR includes one or more photodetectors 126 for receiving transmitted LED or other light signals, and one or more LEDs 124 for transmitting LED signals, as shown in FIG. 9. In some embodiments, an optical signal amplifier 186 is in communication with the photodetectors to increase the signal strength of the received light signals. In at least one embodiment, the LEDs are in operative communication with an LED power driver 188, ensuring a constant current source for the LEDs.

In some embodiments, the name tag may include circuitry that performs modulation, demodulation, data compression, data decompression, up converting, down converting, coding, interleaving, pulse shaping, and other communication and signal processing techniques, as are known by those of ordinary skill in the art.

In at least one embodiment, the name tag of FIGS. 9 and 10 is embedded with a unique code, similar in principle to the MAC address of a computer, for example. Thus, every name tag has a unique identifier. The name tag broadcasts the unique code at regular intervals, or irregular intervals if desired. Optical XCVRs located within the user's building and near the user can then receive the unique code transmitted by the name tag.

There are numerous applications of such a design. For example, in some embodiments, an optical XCVR is engaged to a door lock. When a user with a name tag approaches a locked door, the name tag broadcasts the unique code, and an optical XCVR in communication with the door lock receives the code, and if acceptable, unlocks or opens the door. A table of acceptable codes may be stored in a memory device that is in communication with, and accessible by, the door's optical XCVR. Alternatively, the door's optical XCVR may transmit a code to a central station that compares the user's code against a table of approved codes and then sends a response either allowing or denying access.

Figure 11:
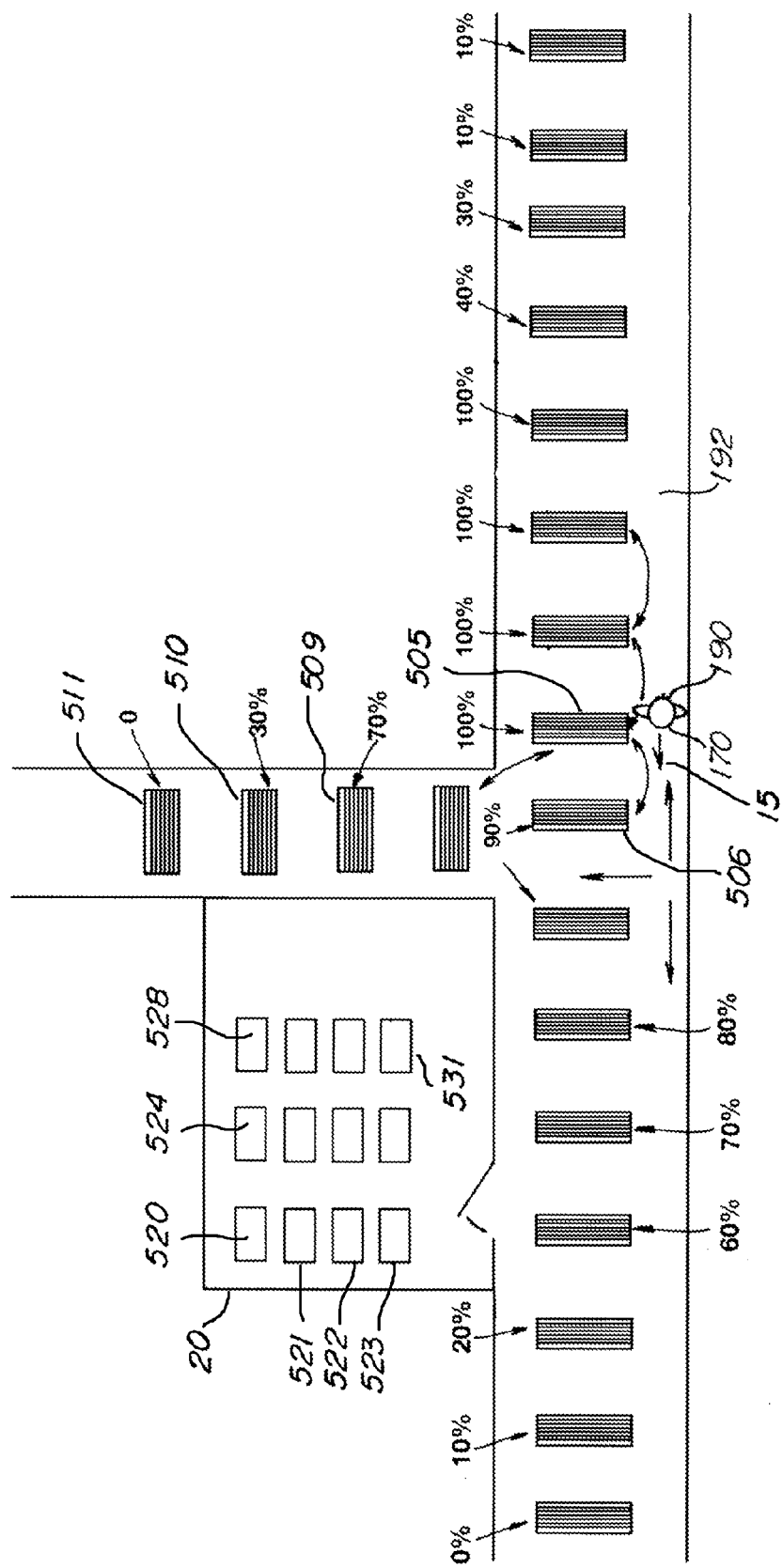
FIG. 11 is a block diagram of an alternative embodiment of the LED Communication System, depicting an energy management scheme.
Figure 20:
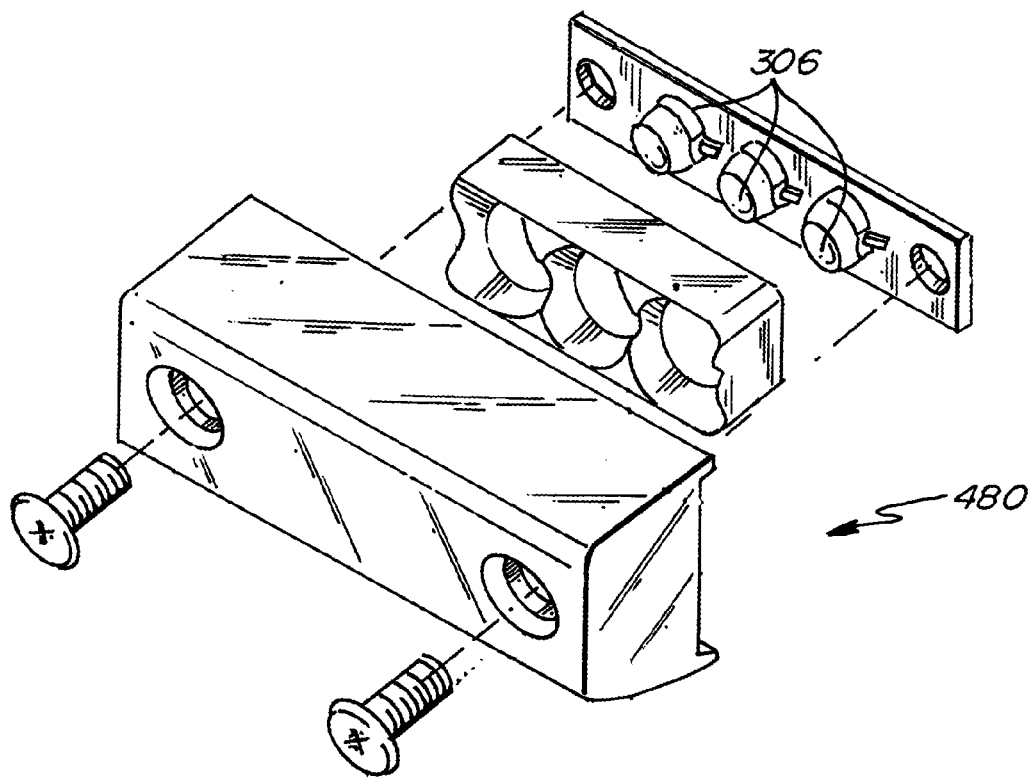
FIG. 20 is an exploded isometric view of an alternative collimator assembly and modular LED light source.
Figure 21:
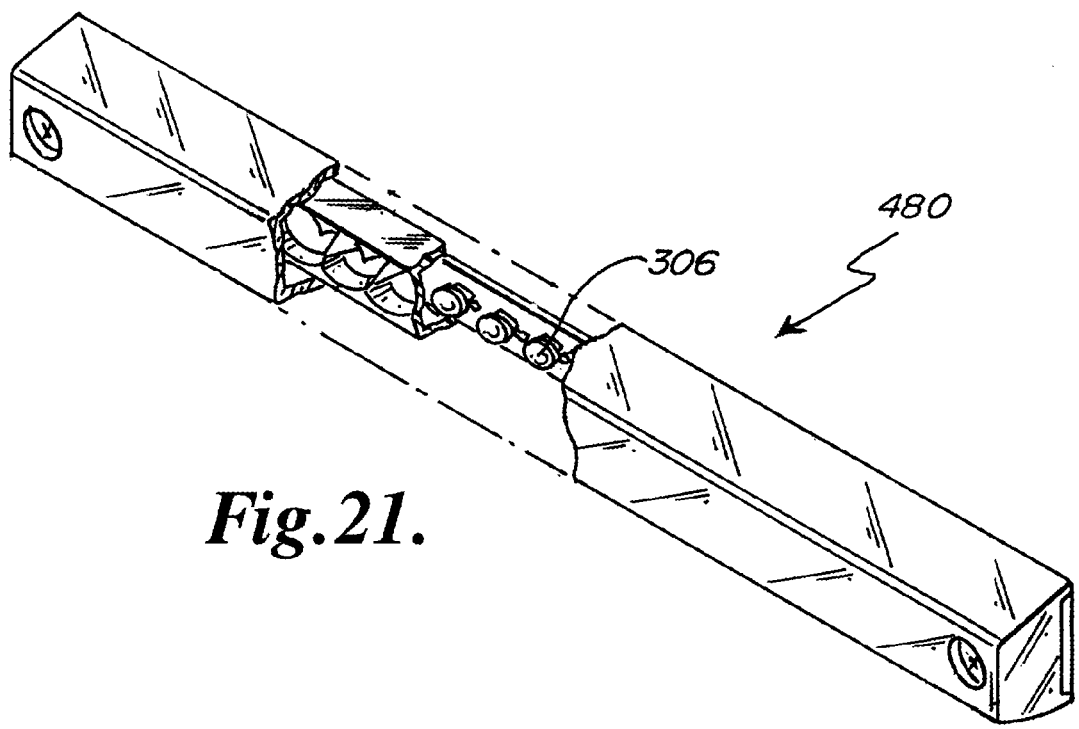
FIG. 21 is an alternative partial cut away isometric view of an alternative collimator assembly and LED light source.
Figure 22:
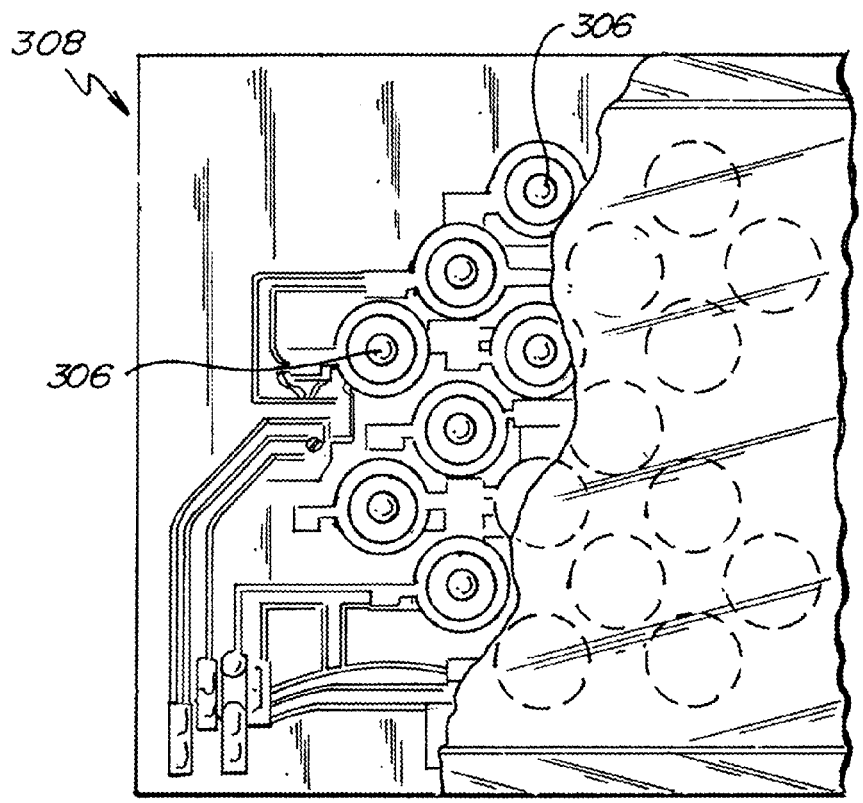
FIG. 22 is an alternative detailed partial cut away view of a strip LED light source.

As seen in FIG. 11, the electrical wiring in the hallways and/or rooms may include BOPL. As such, the name tag may be used to provide access to the Internet via the optical XCVRs in the hallways and rooms. A person walking down the hallway may receive a phone call on their name tag from a person on the other side of the world as long as the other person was using the Internet to communicate and knew the unique code of the name tag. Such communication is possible because the Internet is based upon transmission of packetized data, a form ideally suited for use with an optical XCVR.

FIG. 12 illustrates a simplified block schematic diagram of an electrical circuit used to couple power and data to one or a plurality of LED light sources 161. Power, which may be either AC or DC current is coupled through a power line bridge 150 with data from a network cable input, for example. The source of the data is not critical to the operation of the present invention, but may include various computer outputs such as might, for exemplary purposes, include control processor output or network connections such as commonly found on Local Area Networks (LAN), Wide Area Networks (WAN) or through the Internet. In accord with one embodiment, the wiring between power line bridge 150 and LED light source 161 is shielded by passing through a conduit or the like, defining a Shielded Broadband-over-Power-Line (S-BPL) connection that is both resistant to interfering communications and also produces almost no radiant energy.

In at least one embodiment, the name tag may be used in conjunction with the LED lighting in hallways, rooms, etc. to reduce energy consumption, as shown in FIG. 11. For example, all the lights in a hallway may have a standby setting such that they are relatively dim or even off. As a person with a name tag proceeds down a hallway, the lights in front of the person turn on in response to a transmitted signal (e.g. the unique code of the name tag). As the person moves beyond a light, the light returns to its standby setting of dim/off brightness through a signal communicated from a XCVR at a sufficiently remote location to indicate that the individual has passed, and is no longer present at this particular location. The presence of an individual proximate to an XCVR may be determined by either recognition of a signal or through the failure to continue to recognize a signal or by a proximity calculation as based on a controller receiving a signal from a remote location which indicates recognition of a name tag. A proximity is then calculated where initial or previous XCVR light sources are extinguished as an individual passes a particular location. In other embodiments, the lights can gradually become brighter, as a percentage of full brightness, as a person approaches, and then gradually dim, as a percentage of full brightness, as a person moves away based on proximity calculation as earlier described.

The lights shown in FIG. 11, in accordance with an embodiment of the invention, will have AC wiring with data carriers such as S-BPL, and static locations encoded into the system. Thus a person 190 entering a hallway 192 with a communications badge 170 could use only those lights needed for his travel. As the person progresses toward a destination, the lights behind the person may be no longer needed and so may be programmed to turn off. These lights could function variably from 10 to 100% brightness as needed, for example. As shown in FIG. 11, the person 190 is approximately adjacent to light 505 and traveling in the direction shown by arrow 15 towards light 506. From this position, person 190 might prefer to be able to see into the branching corridor containing lights 509-511. With appropriate central computer control and programming which will be readily understood and achieved by those skilled in the computer arts, the illumination of these neighboring lights can be increased, to provide sufficient illumination to ensure the safety of person 190. Since different persons will have different desires regarding the extent of adjacent illumination, an embodiment of the present invention may incorporate custom programming of such features by individual person 190, or within standard preset selections, such as "cautious" where a relatively large number of lights are illuminated adjacent to person 190, or "carefree," where only a minimum number of lights are illuminated. Again, the level of illumination may additionally vary with relation to the person, the geometry of the building space, in accord with personal preferences, or for other reasons.

When person 190 has traveled farther, lights 509-511 may be extinguished, in effect providing a moving "bubble" of illumination surrounding person. Other lights are automatically shut-off or dimmed as desired and controlled by program. As FIG. 11 further illustrates, lights within a room 20 may similarly be activated and controlled. For exemplary purposes as illustrated, light 531 may be at full intensity, lights 521-528 may be extinguished completely, and light 520 may be operating in a greatly dimmed state, but still providing adequate lighting to ease person 190.

As is apparent, the present invention reduces the extent of human interaction required to control various functions such as light switches and thermostats, while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements for optimal physiological and/or psychological effects and benefits. Such embodiments are an improvement over conventional motion detectors, due to the "smart" nature of the optical XCVRs. Rather than waiting for a time delay as is the case with motion detectors, the optical XCVRs (and in some embodiments the optical XCVRs in conjunction with software) in the lighting fixture recognize immediately that the person has moved beyond a particular light, allowing that particular light to be dimmed or turned off. Also, this smart technology may be used to turn lights on only for people with the correct code embedded in their name tag. In such an embodiment, the user can walk into a restricted area, and if not authorized to be there, the lights would remain off, and if authorized the lights would turn on. Alternatively, a teacher with a name tag grading papers in a classroom, for example, may use the name tag to turn on only the lighting near the teacher's desk at full brightness, while other lighting in the room remains at a dimmer, more energy efficient, setting.

Energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. LED light sources are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light sources or equivalents thereto.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

In some embodiments, the name tag may be used to assist emergency personnel. For example, if a person with a name tag had an incapacitating emergency condition while walking along a hallway in a building with optical XCVRs, as in the embodiments described above, the hallway lighting can be modified to direct emergency workers directly to the injured person. The lights can be made to flash, change color, or form directional arrows, or sequential directional indicators, or otherwise signify to the emergency personnel the quickest path to the person.

In addition to energy management, some embodiment of the present invention are directed towards security and detection of intruders. In the event of an intruder, the present preferred apparatus may be used to detect and locate the intruder. Since the building is dark, in many cases an intruder will rely upon a flashlight to move through the building. Most preferably, the XCVR will detect this unidentified light source. Optionally, an attempt will be made through the XCVR to communicate with the unidentified light source. A failure to communicate will indicate an intruder or unauthorized access. In such case, since the location of XCVR is known precisely, the location of the intruder is also known. Further, even as the intruder moves about, so the intruder will be tracked by virtue of the light emitting from the intruder's flashlight. When emergency personnel are called to the building, lights may be used to guide the emergency personnel to the exact location of the intruder. The emergency personnel may not be limited to police. As may by now be apparent, ambulance workers as well as police would appreciate flashing directional lights because quicker access to an emergency scene could potentially save lives. This custom guidance system can include red, white or other suitably colored or illuminated lights which may be steady or flashing for emergency situations. Corridor lights and/or individual communication badges may be equipped to flash, directing emergency personnel to a desired location or person.

In a further embodiment of the invention, the communication badge may communicate with prior art screening equipment, such a metal detectors, x-ray machines, drug and explosives sniffers, and other such hardware. A building employing the present invention may incorporate multiple safety features. Instead of relying on several security guards at several stations to read badges and monitor each station, a proximity detector may first detect whether a person is passing through the entrance. If so, the adjacent LED light source will query for an appropriate or legitimate communications badge. Even if detected, if a badge has been duplicated, preferred logging and verification through software will instantly identify that the first person is already in the building. Consequently, the presently entering person and the person already in the building can both be located, and the intruder identified. As discussed herein above, biometrics may additionally be incorporated, and for exemplary purposes a fingerprint scan or the like may be required to verify identity prior to passing through proximity/badge detector.

Once a valid badge has been detected, a person will continue through as many additional security checks as may be deemed appropriate, such as a metal detector and drug/explosive sniffer. Rather than requiring the traditional operator for each station, a single guard will in accordance with the present teachings often be adequate, so long as appropriate back-up is available on short notice. Because this energy management system requires far fewer human monitors, it provides additional cost saving. A guard would be needed primarily to respond if an alarm were present without having to identify several situations. A guard might be stationed only near a metal detector, for example, without having to monitor other stations. In addition, a more accurate inventory of persons, other assets, or substances in a building becomes possible. An important safety feature, however, is the greater reliability of electronics over personal vigilance.

The present invention also has the capability to provide low power communications for energy management, emergency back-up, security and special applications utilizing alternative power sources such as batteries or solar cells. Since each individual LED light source may be separately controlled, unnecessary lights may be extinguished in an emergency. Remaining lights may be used to signal emergency routes which may be emergency exits, predetermined shelter such as in the event of a tornado, safe locations potentially determined in real time in the event of an intruder or other hazard. The remaining lights may also or alternatively be used to maintain nominal communications channels within the building. The signals in such instance may be unable to be carried through power lines, and so may alternatively be implemented through a repeater function from one light to the next to travel entirely through a chain of LED light source.

In accordance with another alternative embodiment of the present invention, building lighting may be modulated with time and date stamps or the like. Video recordings made within the space of modulated illumination will have an optical watermark automatically embedded therein. The embedding of such identifiable signals ensures the integrity of video recordings made under these lights.

Building management in accord with another embodiment of the invention further includes automated secured access control to apparatus such as doors, drawers, electronic computer operations, cars, thermostats, and any other devices that may be electronically controlled. By means of LED communication, the location of unauthorized devices as well as persons can be tracked or polled by the system. Doors, either locked or unlocked, can be manipulated in response to the location or movement of these devices or persons.

If audio and/or video is additionally enabled, either through communications badges or separate wall-mounted devices, the video can be used to capture the last-known conditions of a user or an area. This can be important in the event a disaster strikes that results in significant destruction of property or life.

An intelligent audio/visual observation and identification database system may also be coupled to sensors as disposed about a building. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED light source, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

Security zones which may use intelligent video/audio observation and identification database system may include, but are not necessarily limited to, areas such as airports, embassies, hospitals, schools, government buildings, commercial buildings, power plants, chemical plants, garages, and/or any other location for which the monitoring of vehicle or individual traffic and/or security is desirable.

An intelligent observation and identification database system may be arranged to learn the expected times for arrival and departure of individuals and vehicles from various zones. Each time an individual or vehicle enters or exits a security zone, the system may record in the database the time and location of the arrival or exit. Thus, over time, the system may learn the expected arrival and departure times based upon the average of predetermined times, such as normal shift times. Thus, if a vehicle of an individual attempts to enter or exit a zone at a time other than the learned expected time of entry or exit, the system may alert security personnel to initiate an investigation.

If a low level tracking priority is assigned to the vehicle or individual, tracking may be accomplished by recording the location and time for each instance when the system identifies the vehicle or individual. Thus, a low level tracking priority may normally generate a log of when and where a vehicle or individual was seen. Over time, the system may learn typical paths, times and zones where specific vehicles and individuals spend their time. The system may then issue an alert when a vehicle or individual deviates from their normal path. For example, if a person normally may be found on the second floor, and they occasionally pass through first floor but have never gone to the fourth floor, then the system may alert security personnel if the person is identified by the system on the fourth floor.

Thus, the intelligent audio/visual observation and identification database system may be coupled to the operational systems for a building, such as locking systems for doors, lighting systems, air conditioning systems, and/or heating systems.

Another embodiment of the present invention incorporates guidance and communications systems. For exemplary purposes, consider the situation where a visitor wishes to meet with a regular building occupant. The visitor may be guided through any suitable color or intensity pattern such as but not limited to flashing patterns, color changes or the like in LED light source or other similar fixtures to the location or person they seek. Further, once within the same building space, the person being sought out may further be made conspicuous by similar changes in color or intensity pattern within the sought-person's communication badge, for exemplary purposes either within video display 1500 or optical transmitter 1300, as shown in FIG. 10B. Once again, such system control using the RGB LEDs of the present invention is simply a matter of software control.

In those embodiments where audio signaling or communications are enabled, and owing to the exact room position detection afforded by the present invention, location specific access intelligence may also be incorporated. As but one example, if a doctor is in a surgical room, the pager may remain silent. Once the doctor exits surgery, then the pager may be reactivated. This control may be automatic, simply incorporated into the programming of the system. As another example, students may use the preferred communication badge for communications similar to cellular telephones, including text messaging, voice communications, web access, and so forth. However, upon entering a classroom, communications might in one embodiment then be disabled, ensuring the students are not distracted with unauthorized activities. In addition to the foregoing, audio and video communications are possible in accord with light communications in locations and environments where cellular or radio communications may be impossible, forbidden, or unreliable, extending existing communications systems.

The name tag embodiment need not be restricted to use by people. The name tag embodiment may be associated with cars, for example. In such an embodiment, the car 205 includes a tag (not shown) that broadcasts a unique code that may either turn street lights 154 on or increase the brightness of dimly lit street lights, as shown in FIG. 15, similar to the hallway or room lights described above. There are numerous other embodiments. For example, such a device may be used to indicate that a car is authorized to enter a restricted area. Or, such a device may be used to pay tolls on highways or pay fees at a parking garage by uniquely identifying the vehicle and the account to be charged. Alternatively, such device may be used to open garage doors.

Another embodiment of the present invention incorporates Global Positioning System (GPS) information into the data packet to be sent. The Global Positioning System is described in U.S. Pat. No. 4,785,463, the entire contents of which are expressly incorporated herein by reference. GPS positioning uses one or more coordinate systems, such as World Geodetic System 1984 (WGS84), to provide a reference frame, allowing every point on earth to be coded with a unique GPS location.

A data packet may include GPS location header bits that include the packet's destination address in GPS coordinates. The data packet may further include GPS location trailer bits that include the packet's origin address in GPS coordinates. The data packet may further include the address in GPS coordinates of the optical XCVR that most recently transmitted the packet (the last known transmission address, or LTA), as will be described in more detail below. The data packet further includes the data to be transmitted, and may include any other bits of information determined to be necessary for successful transmission of data, such as error detection bits, as understood by a person of ordinary skill in the art.

Routing data packets from one location to another location can be accomplished using GPS location information tags data packets having a geographic location instead of a cyber location. Such an embodiment eliminates the need for any later geographic location translation because a data packet starts with geographic source and destination information. This simplifies locating the destination of the data packet.

In some embodiments, each data packet is assigned a GPS origin/destination address as it passes through the network infrastructure. The data packet is always searching for the next closest GPS address location. Each stationary (or static) optical XCVR, and some dynamic optical XCVRs, within a network will be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet. If the ILA code is closer to the data packet destination address than the LTA code stored within the data packet, the optical XCVR's processor inserts its ILA code into the data packet as the new LTA code and then repeats transmission of the entire data packet with the updated LTA code. An exemplary data packet 210 including GPS address information is shown in FIG. 14.

The network continues this process until the data packet reaches the destination optical XCVR, at which point the data packet is transmitted. If a piece of the infrastructure is missing, the packet will be rerouted to the next nearest optical XCVR and continue until it finds the shortest pathway through the network to the destination address.

This means that each user on the network may declare one or more static positions and also have a dynamic position. A static address may be a home, an office, etc. When a user leaves their static address location to move through the network infrastructure, the user then becomes dynamic. The network may track the user as the user passes optical XCVRs, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

FIG. 13 shows railroad poles 215 adapted with optical XCVRs. The railroad poles 215 with optical XCVRs are shown in more detail in FIG. 7. Each optical XCVR on a railroad pole has a known static GPS address. Because each optical XCVR has a unique code, as a user drives along the road, that specific user's dynamic GPS address location may be determined by the proximity of the user's optical XCVR to the static GPS address locations of the railroad pole, for example. Of course, in other embodiments, street lights, traffic signals, sign posts, buildings, or other stationary structures may include optical XCVRs. Because of this interaction between the user's optical XCVR and the network's optical XCVRs, the network knows the dynamic GPS address of the user. In such a manner, a data packet initially routed to a user's static GPS address (e.g. home, office, etc.), may be rerouted by the network to the user's dynamic location. It is unnecessary for the system to know the exact GPS location of the user; the system only needs to know the static GPS location of the closest static device (e.g. a railroad pole, street lamp, etc.) to the user so that the system may ensure the user will receive the broadcasted signal.

It should be noted that in a preferred embodiment, an optical XCVR and its associated hardware, namely its memory, simply stores its known static GPS location information. In such an embodiment, it is unnecessary for the static optical XCVR to further include a GPS receiver because its location is known and fixed. However, in some embodiments, the optical XCVR may be combined with a GPS receiver.

Still referring to FIG. 13, a train 216 with an optical XCVR 160 is shown having an optical link 156 with the optical XCVRs on the railroad poles 215. The optical link may be used to provide Internet access to the train operator or the passengers. The optical link can also be used for switching purposes, ensuring that the train proceeds on the correct track.

Figure 7:
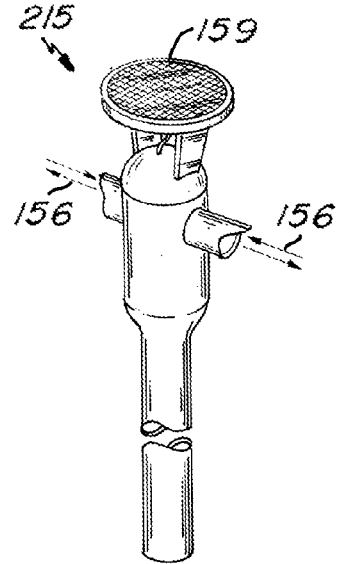
FIG. 7 is an isometric view of an alternative embodiment of the LED Communication System transmitter/receiver.

Exemplary street lights 154 and railroad poles 215 with optical XCVRs are shown in FIG. 6-7. The street lights and railroad poles can include internal optics that allow for long range 2-way communication via optical link 156. In addition, the street lights (and railroad poles, not shown) can include a light source 157 for general illumination and local data access. In some embodiments, the street lights and railroad poles include a solar panel 159 and a battery in operative communication with its optical XCVR. The solar panel allows communication to continue in the event of a loss of power to the street lamp. The solar panel provides the primary source of power in some embodiments for the optical XCVR in the railroad pole.

Other embodiments using GPS and optical XCVRs include tagging each optical XCVR in an office building, for example, with a unique GPS location. If User A, located in User A's office, attempted to contact User B, located in User B's office, but User B was instead located in User C's office, the transmission could be diverted to User C's office automatically. The data packet sent by User A includes User B's static GPS location address, namely User B's office, as well as User B's unique code. The network is aware that User B is in User C's office because User B's optical XCVR is broadcasting its unique code to the optical XCVRs located in User C's office. So, as the data packet is sent out by User A, the data packet is re-routed to one or more optical XCVRs to User C's office, and then broadcast directly to User B's optical XCVR. The re-routing may be accomplished by routing all data packets to a base station. The base station may then determine if the static GPS destination address in the data packet is the correct destination, based on the current location of the destination optical XCVR, or if the GPS destination address needs to be modified based on the dynamic information of the destination optical XCVR. If the GPS destination address needs to be modified, the base station may replace the static GPS destination address with the appropriate address of the destination optical XCVR.

In some embodiments, the memory of a user's optical XCVR stores the unique code, the static GPS location address, or both, of another user's optical XCVR in its "phone book", like a cell phone. In at least one embodiment, the optical XCVR includes a display, also like a cell phone, that allows a first user to find a second user's information and initiate communication with the second user.

In at least one embodiment, the name tag of FIGS. 9 and 10 is embedded with a unique code, similar in principle to the MAC address of a computer, for example. Thus, every name tag has a unique identifier. The XCVR broadcasts the unique code at regular intervals, or irregular intervals if desired. Optical XCVRs located within the user's building and near the user may then receive the unique code transmitted by the name tag.

For example, a first user may wish to use his optical XCVR to contact a second optical XCVR, used by John Smith. The first user's optical XCVR has the unique code of John Smith's optical XCVR stored in its memory, or the static GPS location address of John Smith's optical XCVR stored in its memory, or both. Using a display and/or keypad on the optical XCVR, the first user searches the phone book stored in this optical XCVR for John Smith's name, like a cell phone. Using the keypad, the first user initiates communication with John Smith. Because the first user's optical XCVR includes John Smith's contact information, the first user's optical XCVR is able create data packets with sufficient information to allow the network to route the packets to him, as described above.

In at least one embodiment of the present invention, the optical XCVR may be incorporated into a clock, preferably on the face of the clock, as seen in FIGS. 16-19. The AC electrical wiring of a building (e.g. school, office, etc.) is used to provide BOPL access to the building. The building includes a master clock 220 and one or more clocks 222 located throughout the building, each clock powered by the AC electrical wiring 224, as seen in FIG. 19. In some embodiments, the master clock 220 and the other clocks 222 are on the same electrical circuit. The master clock may include a number of functions, including an annunciator panel. The annunciator panel may be used to communicate fire alarms, tornado alarms, lockdowns, presence of an unknown person(s), etc. to annunciator panels on the other clocks. The master clock is in operative communication with a power line bridge 150. The master clock includes appropriate circuitry for encoding the alarm signals and transmitting them to the power line bridge onto the AC electrical wiring. The packets are then routed to clocks located in other rooms in the building to communicate the alarm signal.

The other clocks include power line bridge circuitry for decoding the signal and a display and/or speaker for communicating the transmitted alarm. As seen in FIG. 16, the clocks 222 further include one or more optical XCVRs 160 that allow communication between other devices in a room that are equipped with optical XCVRs, such as thermostats 226, smoke detectors 228, cameras 230, and PA speaker 232, as seen in FIG. 18. The optical XCVRs in the clock also allow communication with other rooms and/or a central location. For example, upon sensing smoke, a smoke detector equipped with an optical XCVR broadcasts the signal, which is in turn received by the clock's optical XCVR and transmitted over the AC wiring to a central location as an alarm.

Energy management may also be accomplished by using the optical XCVR on the clock to turn down/up a thermostat equipped with an optical XCVR, based on the time of day, or whether anyone is in the room. In such an embodiment, students, for example, may each wear one of the above-described name tags that broadcast a unique code. If the optical XCVR in the clock in the room is polling and does not detect any unique codes being broadcast in the room, it sends the information along to a central location that, in turn, instructs the optical XCVR in the clock to broadcast a signal to turn the thermostat up/down to save energy. A similar function may be performed with respect to the lighting in the room. As described in detail above, the BOPL and optical XCVRs may be used to provide Internet access, thereby allowing the optical XCVR on the clock to be the access point for the Internet connection. If a PA speaker is included in the clock, or is in communication with the clock as in FIG. 18, the optical XCVR of the clock may also be used as a public address system to broadcast messages.

In some embodiments, the clock face is an analog display, as seen in FIG. 16. However, in at least one embodiment, the clock is a digital clock, as seen in FIG. 17. In some embodiments, the LED segments 234 act both as the display of the clock and as the LEDs used for transmitting data signals. The digital clock further includes one or more photodiodes 126 for receiving data signals.

In at least one embodiment of the present invention, each student in a school wears a name tag with an optical XCVR. The optical XCVR on a name tag may communicate with the optical XCVR on a clock to indicate whether a student in a classroom is present, or provide the student's location. In a normal classroom setting multiple students will be present. Thus, a channel access method can be provided to allow all students and teachers to use the clock's optical XCVR.

In some embodiments, a channel access method like time division multiple access (TDMA) may be used. TDMA splits a signal into timeslots, with each user transmitting only in their allotted time slot. One of ordinary skill will recognize that frequency division multiple access (FDMA), code division multiple access (CDMA), or other channel access method may be used to allow multiple optical XCVRs to transmit to a single optical XCVR.

In some embodiments, the optical XCVR associated with the clock, for example, is constructed and arranged such that each photodiode acts as a separate receiver channel. The multi-channel optical XCVR on the clock may be used for parallel processing of received data, for example 30 students with unique name tags transmitting simultaneously. In such an embodiment, it may not be necessary to use channel access methods because the optical XCVR is designed with sufficient channel capacity to handle all incoming traffic. In some embodiments, the processor of the optical XCVR may simultaneously process all incoming signals. In embodiments where the processor cannot simultaneously process all incoming signals, it may be desirable to include buffers to buffer the incoming signals so that signals are processed according to the time they were received.

In at least one embodiment, the optical XCVR associated with the clock, for example, is constructed and arranged such that each LED acts as a separate transmission channel. The multi-channel optical XCVR on the clock may be used for parallel transmission of data, for example. That is, each LED in the LED array of the optical XCVR may be used to broadcast a different data stream. So, LED1 could broadcast a data stream to computer 1, and LED2 could simultaneously broadcast a different data stream to computer 2, and LED3 could simultaneously broadcast a different data stream to computer 3, etc. It should be noted that the optical XCVR in a clock is an exemplary embodiment. One of ordinary skill will recognize that a multi-channel optical XCVR may be embodied in numerous other devices, or as a standalone device.

As stated above, the LEDs may be bi-directional. In at least one embodiment, the optical XCVR is comprised of bi-directional LEDs. In such an embodiment, the optical XCVR is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

As described herein each, optical XCVR may also include non-volatile memory (FLASHRAM, EEPROM, and EPROM, for example) that may store firmware for the optical XCVR, as well as text information, audio signals, video signals, contact information for other users, etc., as is common with current cell phones.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In some embodiments, the XCVRs may include circuitry that performs modulation, demodulation, data compression, data decompression, up converting, down converting, coding, interleaving, pulse shaping, and other communication and signal processing techniques, as are known by those of ordinary skill in the art.

Referring to FIGS. 20-23, in this embodiment the light support 480 for the communication system may include one or more panels or strips of LED light sources 306. A strip LED light source 308 may also be secured to the exterior of a vehicle or an emergency vehicle at any location. Additional details of the light support 480 and the light source 308 can be found in US 6879263, e.g. in reference to FIGS. 31-35.

The LED light sources 282, 306 described in relation to any embodiment herein may be electrically coupled to each other using parallel or series electrical connections for electrical communication to a centrally located controller 50 and power source.

Referring to FIG. 23, a panel 304 of individual LED light sources 306 is depicted. The panel 304 may form the illumination element for the LED communication system. In this embodiment each panel 304 may contain a plurality of rows 34 and columns 32, 328 of individual LED light sources 306. The panels 304 are in electrical communication with the controller 50 and power supply (now shown).

In one embodiment the strip LED light sources 308 may be organized into distinct sections, segments, and/or sectors 326 for individual illumination and/or generation of a LED communication signal by the controller 50. Each distinct segment, section, and/or sector 326 may therefore be illuminated with a communication message and/or distinct type of light signal, with, or without, modulated or variable light intensity.

In at least one embodiment individual LED light sources 306 are not required to receive the same level of duty cycle from the controller 50. Therefore, different individual LED light sources 306 may receive different duty cycles within a single light signal for generation of different LED communications.

The LED light sources 306 for generation of the pulsed light communication signals may be used on other devices and are not necessarily limited to use on an emergency vehicle. It is anticipated that the LED light sources 306 for generation of pulsed light communication signals may be used on a variety of apparatus including but not limited to snowmobiles, water craft, helmets, airplanes, security badges, buoys, trains, or airport support vehicles, or the like.

In an additional embodiment of the invention the reflector 494 may be adjustable so as to redirect and/or focus light emitted from the light source 282 during use. Also, the visible reflectors 494 may also have one or more lenses equipped thereon to provide a generated signal light or pulsed light communication signal with the ability to magnify and/or diffuse emitted light or emitted communication signal.

In an alternative embodiment, an LED light support as described herein or as incorporated by reference herein, having at least one LED illumination source, may simultaneously produce and emit a light signal and a systematic information transfer through encrypted/pulsed light or signal, where the pulsed light signal is not visible to an unaided eye of an individual. The pulsed light signal functions as a free space carrier of information for processing by a receiver unit. The pulsed light signal may also be used independently, and is not required to be incorporated as a distinguishable component of a light signal. In this embodiment the pulsated light signal appears as a continuous light source.

Light emitting diodes may be manufactured to emit light at any wavelength from infrared to visible. Therefore, an almost infinite variety of colors representative of different wavelengths of LEDs are available for use in the generation of a communication signal. LEDs also are extremely flexible in the provision of an instantaneous light signal, which minimizes and/or eliminates carry over illumination after termination of power. The termination of power to a traditional light source having a filament does not immediately terminate the provision of light. A carry over illumination effect continues as the traditional light source filament cools. The traditional light source filament therefore is not flexible for receipt of very rapid pulses or modulated power for transmission of a pulsed light communication signal.

An LED light source however is well adapted to receive a rapid pulsed power supply for the provision of a pulsed light signal. In fact, LEDs have the capability to pulse thousands of times per second where the rapid pulses are unobservable to an unaided human eye. In these instances, the pulsed LED light source will appear to an individual to be continuously illuminated where the pulses are not recognizable. A dual function light signal may also be provided, which would include an observable light signal and secondly a communication carrier which is not normally observable within the light signal.

In at least one embodiment, the duty cycle and/or power to be provided to an LED light source 282 is regulated by a controller. The controller may include a rapid switch to enable the rapid pulsation of electrical current to the LED light source, which in turn causes the provision of the non-observed pulsating light. Simultaneously, the controller 50 may also regulate an observable light signal for illumination in minutes, seconds, and/or fractions of seconds to provide a desired type of unique light effect.

In one embodiment, the LED illumination sources 803 generally may be formed of solid state light components capable of high speed switching, which are able to sustain single or multi-plex channels of communication, while appearing as a regular light. The LED illumination sources 803 thereby fulfill the requirements of conventional and non-conventional lighting as well as emergency or other types of lighting systems.

In at least one embodiment, the LED pulsed light communication system is formed of an LED support 801 having one or more first LED illumination devices 803 electrically coupled thereto. The LED support 801 may be formed in any shape as earlier described, or as incorporated by reference herein. The LED support 801 may also be stationary or secured to a rotational device 805 as earlier described.

In some embodiments, the first LED illumination sources 803 may be comprised of a single LED which has been selected for transmission of a specific wavelength of emitted visible or non-visible light. Each first LED illumination source 803 may also be positioned to the interior of a collimator reflector assembly 807. Alternatively, a stationary and/or rotatable reflector 809 may be positioned proximate to the first LED illumination source 803 to reflect a pulsed light signal along a desired line of sight, vector, and/or path.

In one embodiment, the LED support 801 may alternatively be formed of a plurality of first LEDs 803 having the same or different wavelengths of emitted visible or non-visible light. The LED support 801 may also be organized into specific sectors 811 or zones of first LED illumination sources 803, of the same or different wavelengths of visible or non-visible light.

In at least one embodiment, the LED support 801 and the first LED light sources 803 are electrically coupled to a power source 813 as regulated through a controller 815. The power source 813 may be a low voltage, low current power supply and may include a rechargeable battery capable of receiving recharge through coupling to a solar energy cell 817. Other sources of electrical power may be suitable substitutes herein. The controller 815 regulates and/or modulates the duty cycle to be exposed to the individual first LED light sources 803 for the creation of a desired type and/or pattern of observable light signal. The controller 815 also preferably regulates and/or modulates the duty cycle to be exposed to the individual first LED illumination sources 803, for the creation of a desired type and/or pattern of pulsed light communication signal. A variable duty cycle may also be applied to the first LED light sources 803 through the controller 815 as well as regulation of the type or combination of distinct types of light signals as earlier described. In addition, the same types and/or combinations of types of light signals, whether observable light signals and/or pulsated light signals, may be provided simultaneously and/or independently of each other within different sectors 811 of the LED light support 801.

In some embodiments, the combination of different colors of first LED illumination sources 803 by the controller 815 is particularly useful in the creation of white light which may be formed of a plurality of individual LED light source 803 wavelengths, where each individual first LED light source 803 is an independent channel of pulsed light. A composite white light signal may therefore include in excess of 100 channels of independent and distinct wavelengths of pulsed first LED light sources 803, where each wavelength of first LED light sources 803 is pulsating at an approximate rate of 1000 pulses per second. The rapid rate of pulsation for the first LED light sources 803, produces a staggering volume of information for receipt by a second controller 827. Naturally, a significant number of second receivers 823 may be required to receive all transmitted information. It may also be preferable to have the number of second receivers 823 equal or exceed the number of wavelength channels utilized by the first LED illumination sources 803 for transmission of a pulsed light communication signal.

In one embodiment, the LED light support 801 may also include a first receiver 819 which is electrically coupled to a converter 821. The converter 821 may be coupled to the controller 815. The first receiver 819 is capable of recognizing and receiving a pulsed light communication signal which may be transmitted either as directional and/or non-directional pulsated light.

In some embodiments, the operational range for the first receiver 819 and the first LED illumination sources 803 is dependent upon the environmental conditions such as humidity, air pressure, air temperature, ambient light, interference, and pollution factors. It is anticipated that in good environmental conditions that the effective operational range of the first receiver 819, and first LED illumination sources 803, may exceed one half mile, and may extend to three miles or more. In alternative embodiments the effective operational range of the first receiver 819 and first LED illumination sources 803 may be less than one half mile in length.

In one embodiment, the first receiver 819 is constructed and arranged to receive LED pulsed light signals as generated by a second independent LED illumination source(s) 829 having a recognizable wavelength. The received LED pulsated light signal maybe converted into a digital signal by a converter 821 for communication to the controller 815. The controller 815 receives the converted digital signal for processing and extraction of transmitted information to respond to an interrogation or information transmission request. The controller 815 may be programmed to process the received digital signal for preparation of an appropriate responsive signal. At the direction of an individual the controller 815 may communicate a responsive signal to the converter 821 which in turn converts the responsive signal to a series of pulses for transmission from the first LED illumination source 803 as a responsive pulsed LED optical free space communication signal.

In one embodiment, the responsive LED pulsed light signal is in turn received by a second receiver 823 as coupled to a second converter 825, second controller 827, and second LED illumination device 829. The second receiver 823, second converter 825, and the second controller 827 proceed to translate and process the pulsed light signal containing communications which originated from the first controller 815.

Figure 43:
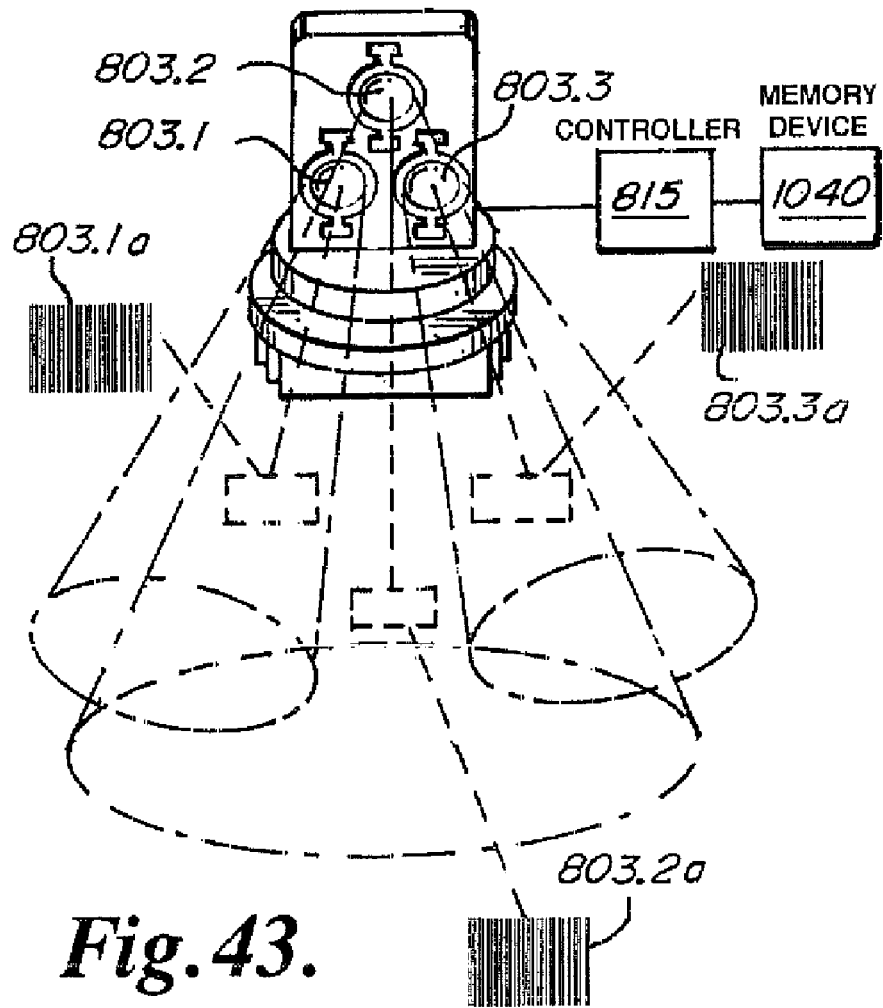
FIG. 43 is a detailed view of the LED pulsed light communication system.
Figure 43A:
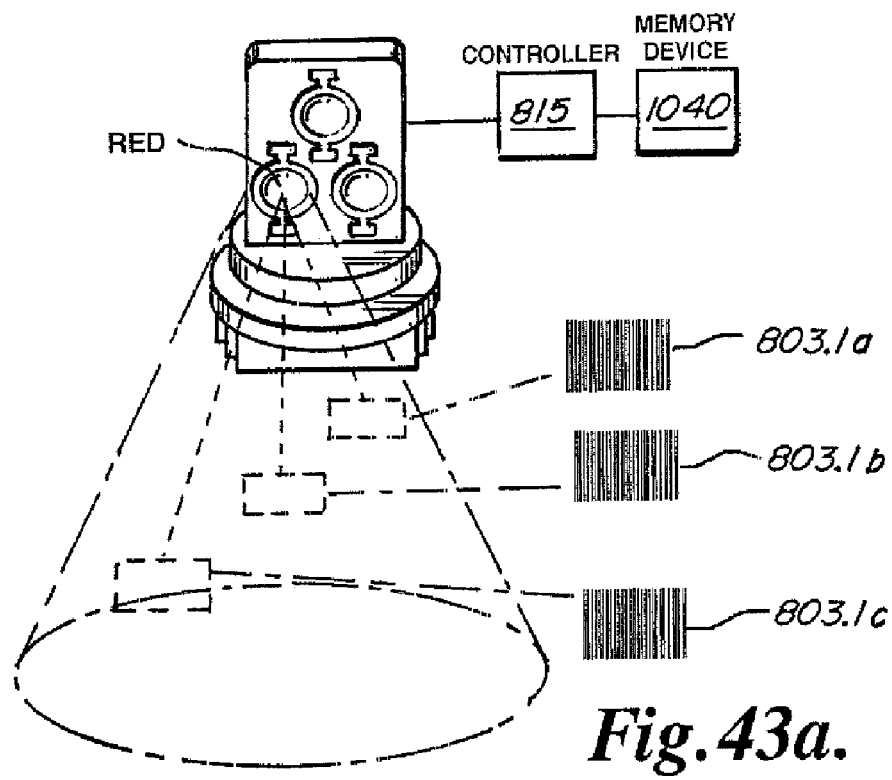
FIG. 43A is an alternative detailed view of the LED pulsed light communication system.
Figure 43B:
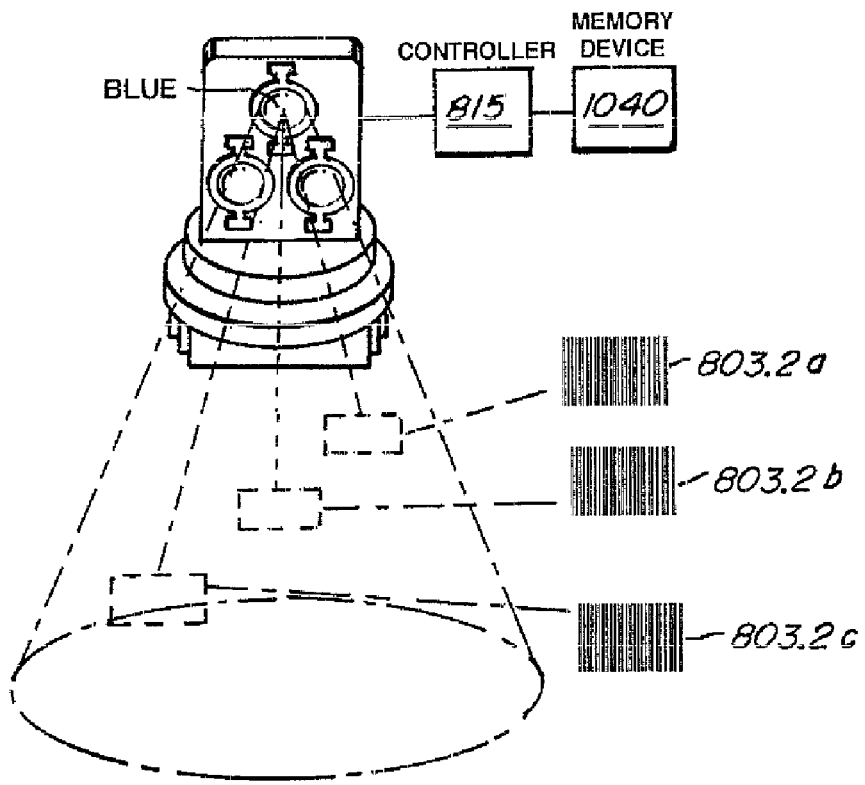
FIG. 43B is an alternative detailed view of the LED pulsed light communication system.
Figure 43C:
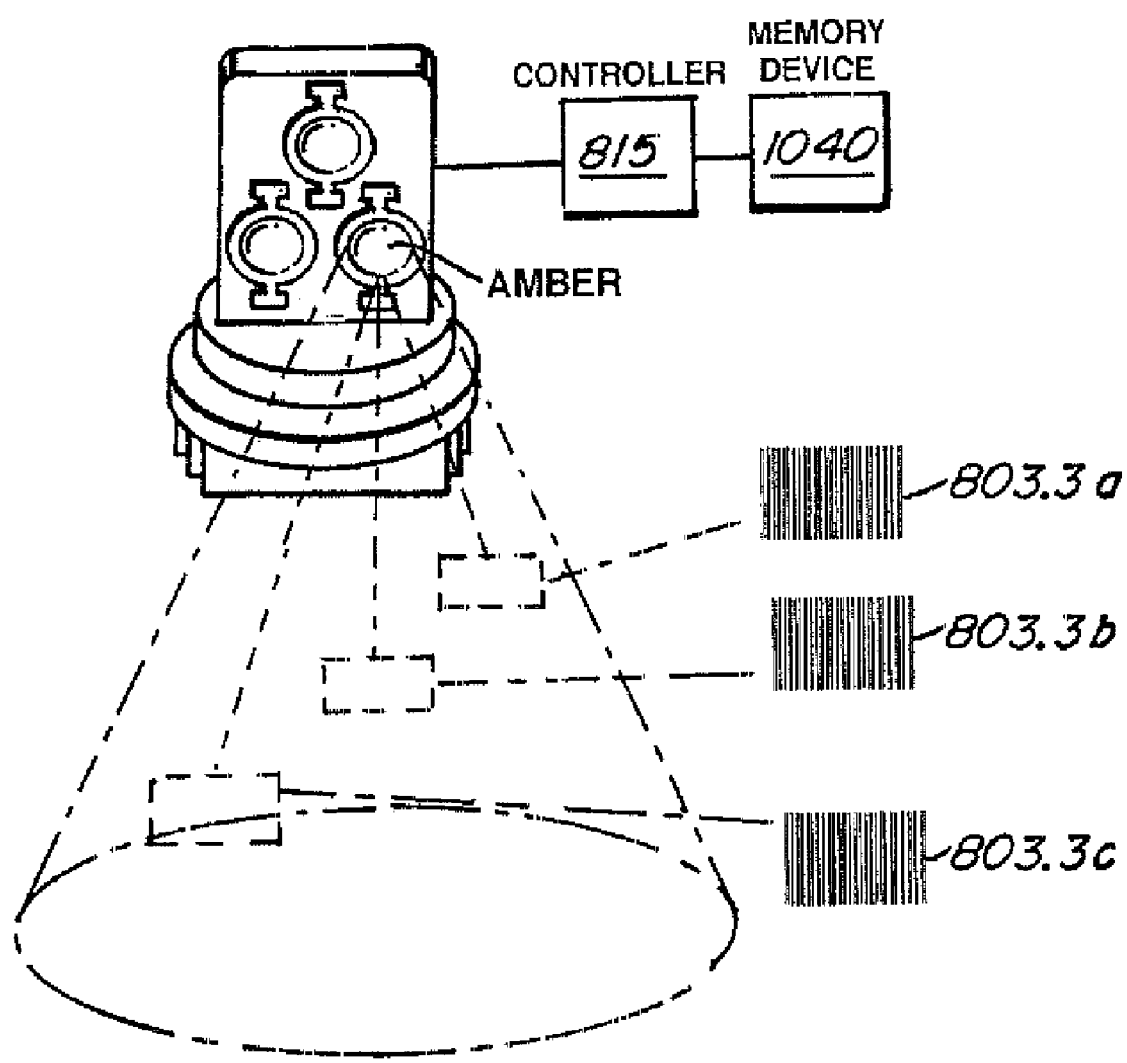
FIG. 43C is an alternative detailed view of the LED pulsed light communication system.
Figure 44A:
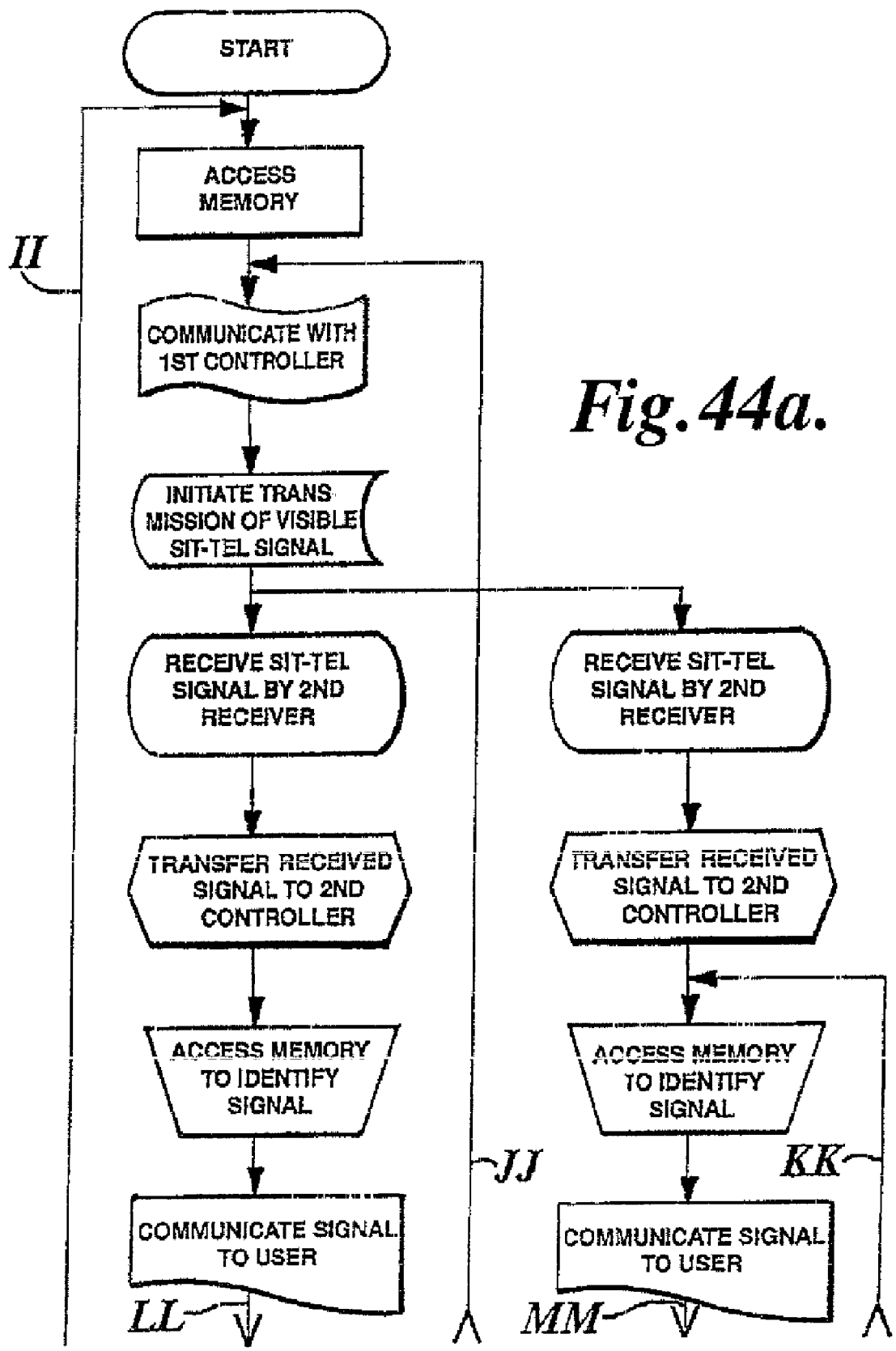
FIGS. 44A-C constitute a block diagram of the operation of the first, second, and third controllers within the LED pulsed light communication system.
Figure 44B:
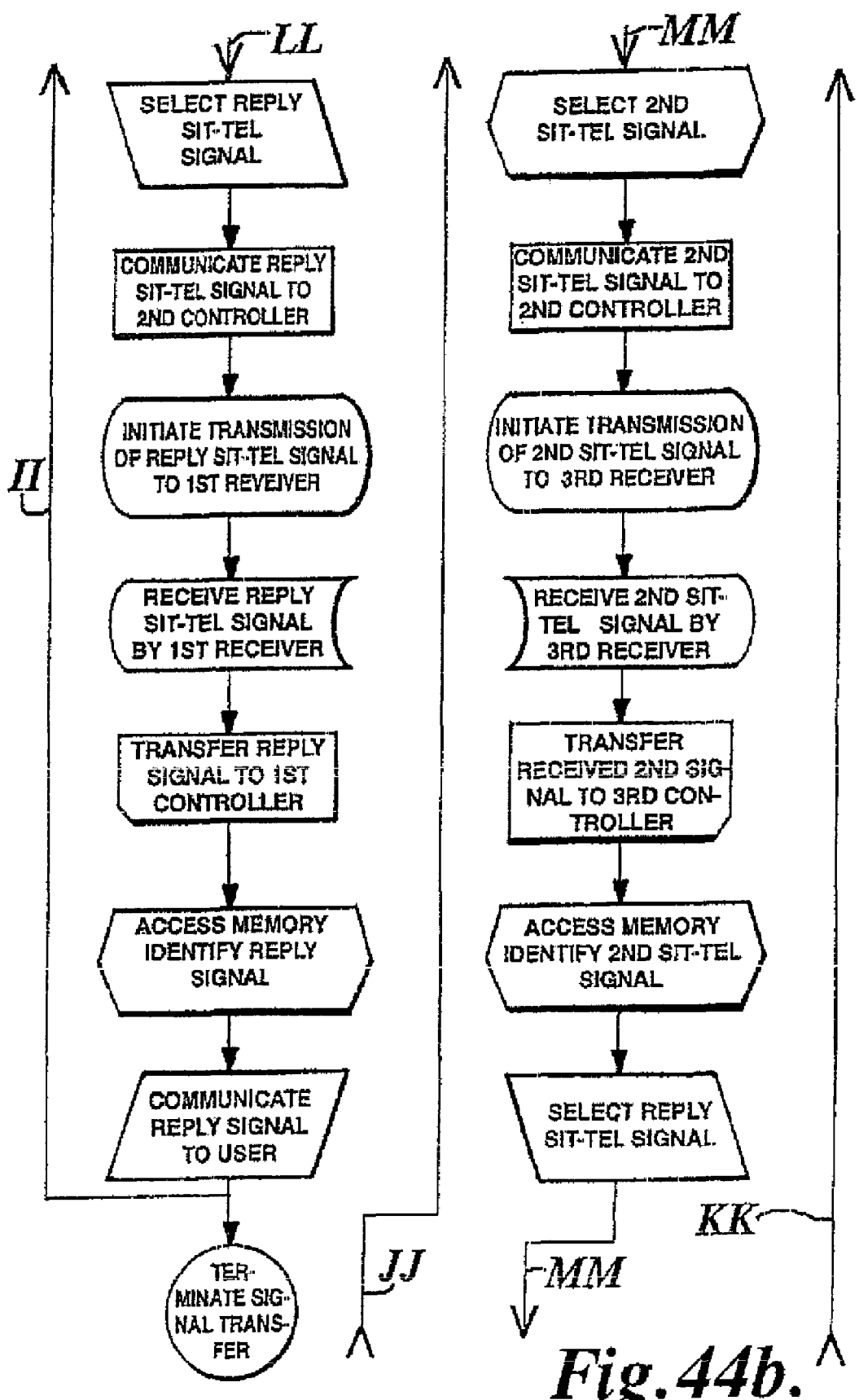
Figure 44C:
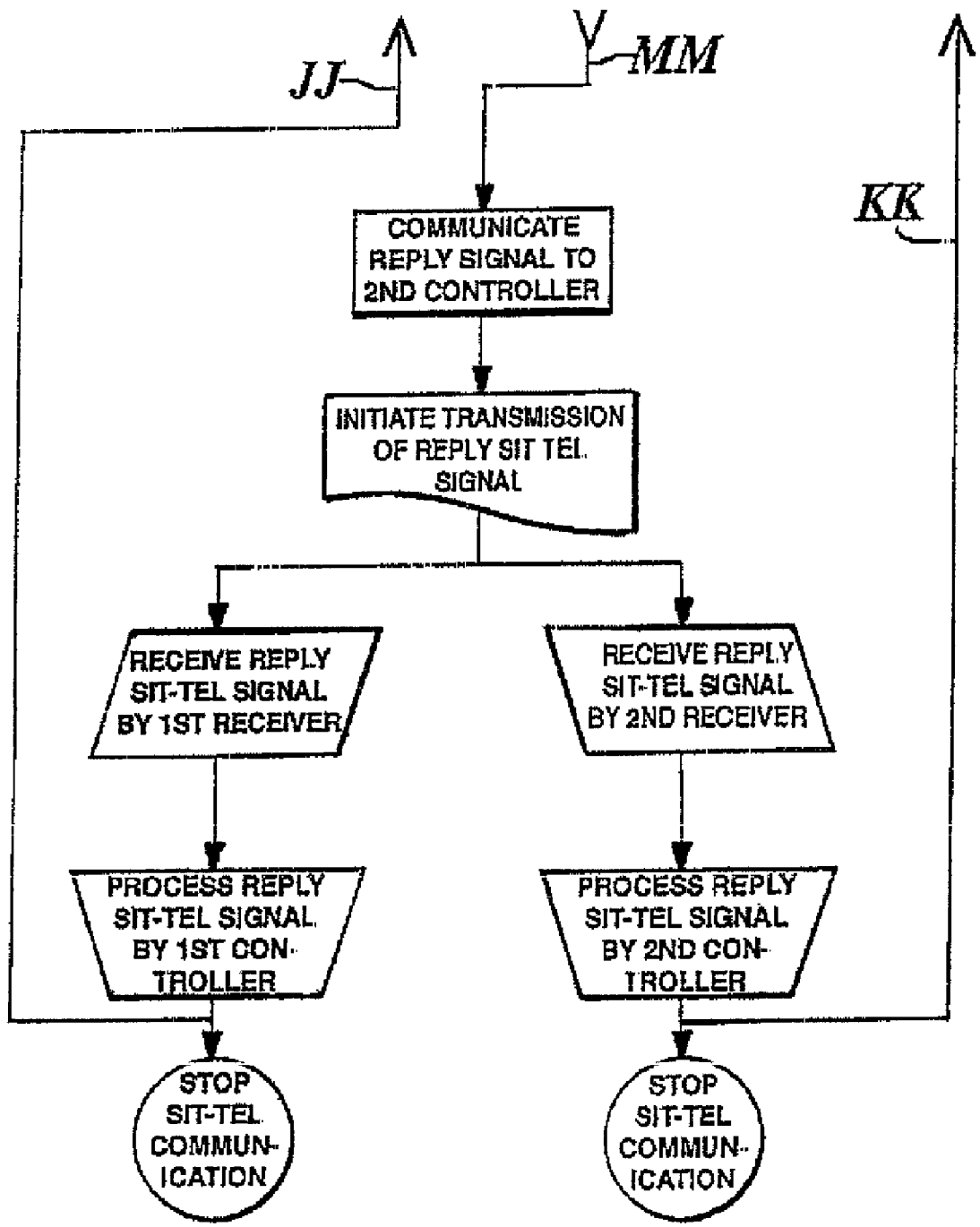

In at least one embodiment, the first controller 815 and the first LED individual light sources 803, as well as the second controller 827 and second LED illumination sources 829, are constructed and arranged to regulate the transmission of an infinite variety of pulsed LED free space optical light signals. The types of LED pulsed optical light signals may include but are not necessarily limited to pre-stored characters, numbers, and/or words, and/or terms as identified by an assigned combination of long or short pulses or bar code type or form of signal 803.1, 803.2, 803.3, 803.1a, 803.1b, 803.1c, 803.2a, 803.2b, 803.2c, 803.3a, 803.3b, and 803.3c. (FIGS. 43-43C.) The pulsed LED light signals may be generated so that each pulsed LED light signal has an identical duration as a portion of a communication. Alternatively, the pulsed LED light signals may have different durations. Any number of pulsed light signals having the same or different durations may be grouped into a signal packet. Each packet or combination of signals may be assigned a character, number, or other information as data within a memory which may be integral to a controller 815. Individual packets of grouped pulsed LED light signals may be combined into a message, word, and/or character for processing and/or translation by a second controller 827 for communication of information to an individual. The first illumination sources 803 and the second illumination sources 829 are constructed and arranged to emit and/or transmit thousands of pulses of LED light within a time period of approximately one second. The volume of available combinations of LED pulsed light signals within a very short period of time enables transmission of a significant amount of information subject to processing via a first or second controller 815, 827.

In some embodiments, the first and second controllers 815, 827 respectively, each include a memory having stored software and data files for processing of received LED pulsed light signals. The memory and available stored data facilitate the immediate and automatic recognition of an environmental condition, parameter, or generation of a pre-stored pulsed light response. One example of recognition of an environmental condition or situation is when information is desired from a source having an interrogating or second controller 827, which requests through a pulsed light signal the identity and/or status of a first controller 815. The responsive first controller 815 upon receipt of a verified interrogation signal request, initiates a responsive LED pulsed light signal, which communicates the identification and/or other requested information. A second example of recognition of an environmental condition and/or situation is when a first receiver 819 encounters a continuously emitted LED pulsed light signal which may function as a warning to trigger an audible or visual alarm to the first controller 815, to minimize safety risks to individuals.

In one embodiment, a first controller 815 and a second controller 827 each preferably contain software establishing recognition or handshake protocol for acknowledgment, receipt, and transmission of information optically through free space LED pulsed light signals. The handshake protocol initiates upon the first receiver 819 acknowledging being tagged, or receiving an initial pulsed LED light signal from a second controller 827. A responsive signal is then generated by the first controller 815 for transmission to the second receiver 823. An acknowledgment message is returned by the second controller 827 to the first receiver 819. A pre-selected pattern of acknowledgments are interchanged to verify readiness for transmission and receipt of desired information through the transmission of free space pulsed LED light signals. Following transmission of the demanded information and/or data, additional verification and/or acknowledgment transmissions may occur between the first receiver 819 and the second receiver 823 prior to the termination of contact through the use of a sign off protocol.

In one embodiment, the first and second receivers 819, 823 are constructed and arranged to recognize certain wavelengths of incoming pulsed LED light signals. The first and second receivers 819, 823 may be constructed of a plurality of photo detectors, photo diodes, optical transceivers, and/or photo detecting elements to simultaneously, individually, and/or sequentially receive transmissions of LED pulsed light signals of a preset wavelength or of differing wavelengths. The first and second controllers 815, 827 respectively may also be coupled to an automatic and/or manual scanner 831 or dial which may be manipulated to tune into another wavelength of transmitted LED pulsed light signals. For example, an individual observing a predominantly red LED light signal who is expecting to receive a transmitted pulsed LED light signal of a different wavelength may dial and/or tune a first receiver 819 to an alternative spectrum wavelength to locate the signal. Similarly, adjustments are available for other observed colors. The scanning for pulsed LED light signals may also be automated by the scanner 831. The scanner 831 and/or first and second receivers 819, 823 are constructed and arranged to independently and/or simultaneously receive directional and/or non-directional pulsed LED light signals for transmission and communication of information between geographically removed LED illumination sources 803, 829. An automatic and/or manual scanner 831 or dial may also be manipulated to tune into a wavelength of transmitted LED pulsed light signals to compensate for environmental conditions/factors such as humidity, air pressure, air temperature, ambient light, interference, and/or pollution.

In one embodiment, the light support 801 may be integral and/or fixed to a light bar 833 as engaged to a motor vehicle or emergency vehicle 835. During use of the communications system, the second receiver 823, second controller 827, and second LED illumination devices 829 may be integral and/or attached to the light bar 833. In one embodiment, the first receiver 819, first controller 815, and first LED illumination sources 803 may be integral with and/or affixed to a motor vehicle license plate 837. The license plate 837 may include a recessed area 839 or a transmission opening 841 which is adapted to receive the first receiver 819 and the first LED illumination sources 803. A transparent cover 843 preferably traverses the recessed area 839 and/or transmission opening 841 to protect the first receiver 819 and first LED illumination sources 803 from contamination during use of the pulsated light system. A battery 845 and/or power connector 847 may be coupled to the first controller 815 which is located upon the non-exterior face of the license plate 837. The battery 845 may be rechargeable through the use of solar powered cells or other electrical source. Further, the power connector 847 may be coupled to a vehicle electrical system for the provision of power to the first controller 815, first receiver 819, and first LED illumination sources 803.

Figure 38:
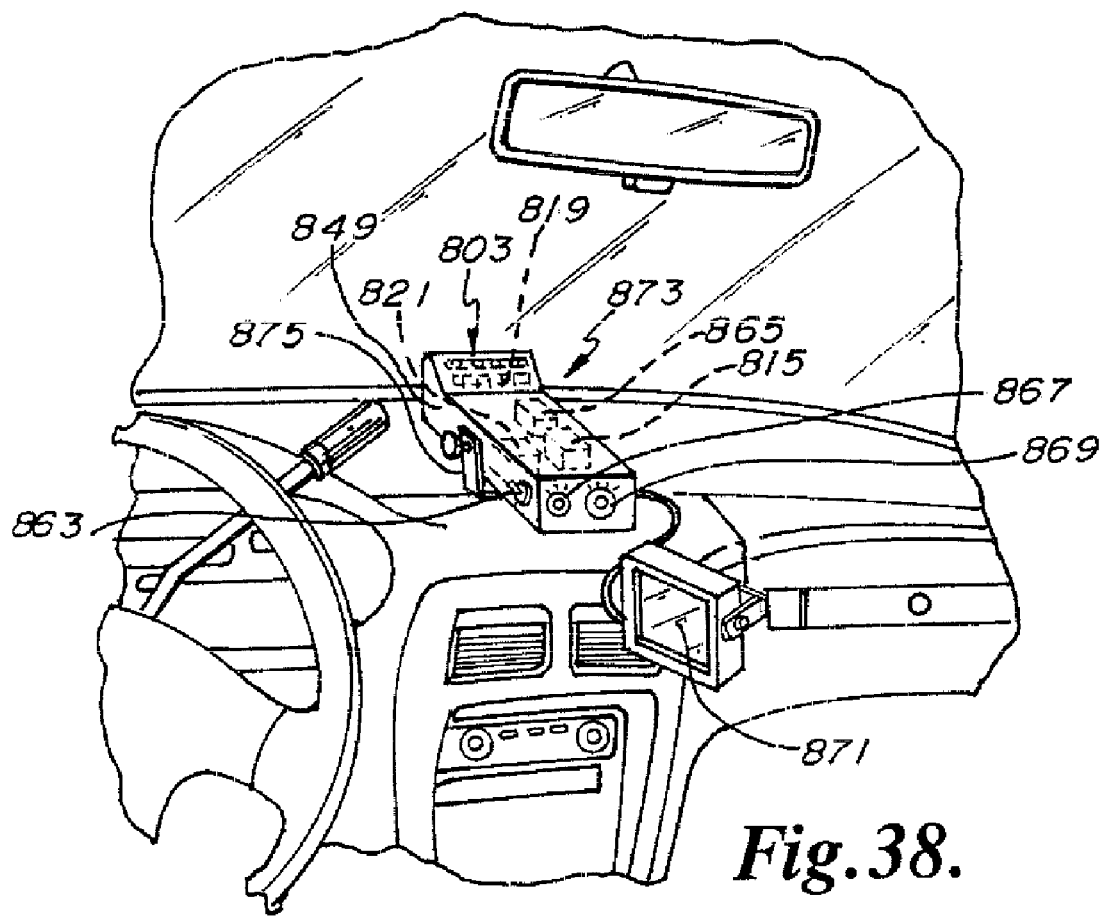
FIG. 38 is an environmental view of a dashboard and pulsed light signaling system engaged to an emergency vehicle.
Figure 39:
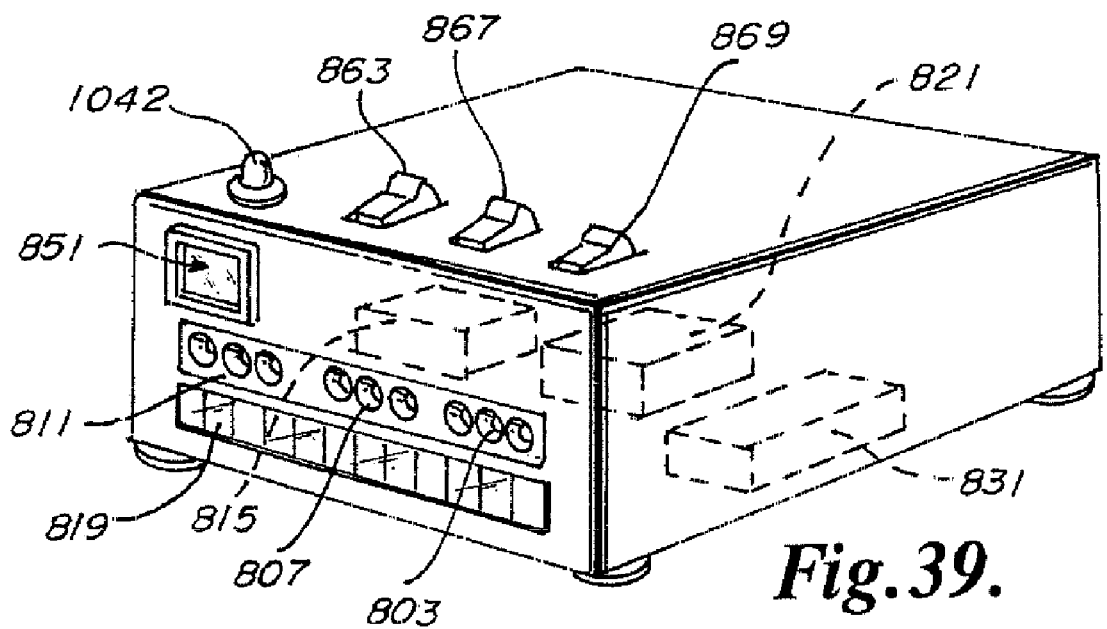
FIG. 39 is an alternative partial phantom line view of a pulsed light signaling system.
Figure 40:
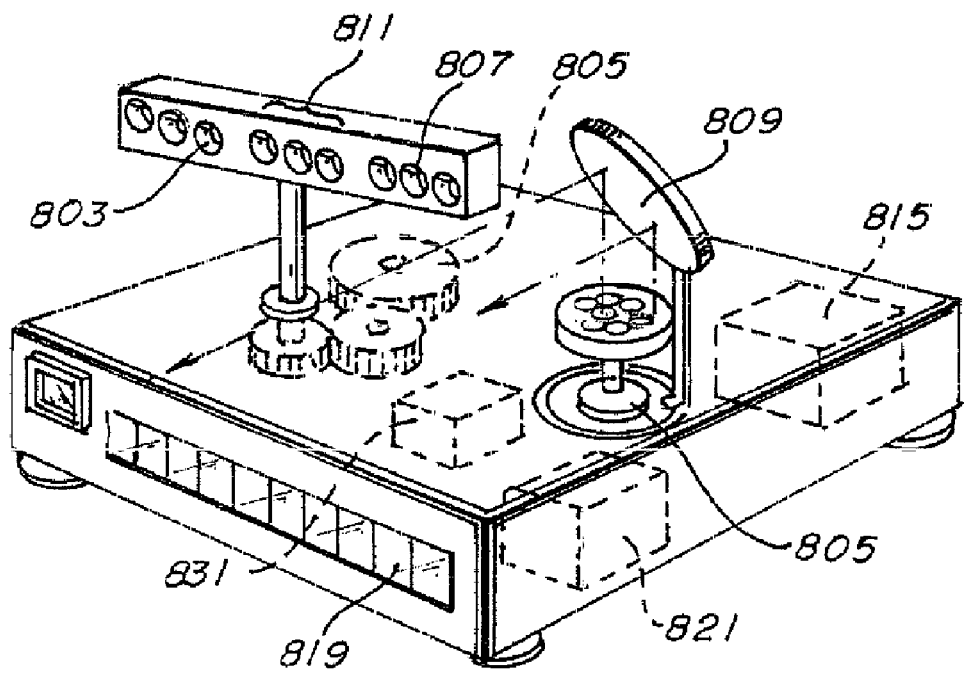
FIG. 40 is an alternative partial phantom line view of a pulsed light signaling system.

In one embodiment, the first controller 815 may additionally be electrically connected to a first signaling device 849 which may be attached to the dashboard of the motor vehicle. (FIG. 38.) Alternatively, the first signaling device 849 may be wired into a radio for a motor vehicle. The first signaling device 849 is constructed and arranged to receive a signal from the first controller 815 during situations in which the first receiver 819 has detected a traffic message as generated by a pulsed LED signal emitted from the second LED illumination devices 829. The first signaling device 849 may provide a visual LED signal 1042 to the occupants of a motor vehicle as to the presence of a police officer necessitating clearance of a roadway. (FIG. 39.)

Alternatively, the first signaling device 849 may be coupled and/or electrically connected to the radio of a motor vehicle to provide an interrupt switch. Receipt of a pulsed light communication signal may activate the interrupt switch to cause termination of internal radio or stereo transmissions within a passenger vehicle. Alternatively, the activation of the interrupt switch may permit initiation of a pre-recorded oral communication for broadcast over a speaker system, to advise an occupant of a motor vehicle as to the presence of an emergency situation necessitating the clearance of a roadway. Alternatively, during periods when a motor vehicle radio has not been activated, the first controller 815 may activate the first signaling device 849 to engage a motor vehicle radio for the provision of an audible alarm. The first controller 815 may additionally include prerecorded voice recognition messages which may be initiated by the first controller 815 upon receipt of an appropriate signal from the second LED illumination devices 829.

In one embodiment, the first receiver 819 may be formed of a relatively flat and thin rectangular sensor 851 which may be positioned adjacent to a window within the interior of a motor vehicle. The first receiver 819 is preferably electrically connected to both the first controller 815 and the first signaling device 849. The first receiver 819 is preferably constructed and arranged to receive pulsed LED optical signals for transmission to the first converter 821 for communication to the first controller 815 for processing. The first receiver 819 may additionally be constructed and arranged to receive a polarized pulsed LED light signal, or as filtered through a polarized window, of a motor vehicle. The first receiver 819 is preferably placed at a location about a motor vehicle which is easily accessible to transmitted directional and/or non-directional pulsed light signals.

In at least one embodiment, the second LED illumination device 829, second controller 827, second receiver 823, and second converter 825 may be attached or integral to the interior or exterior of an emergency vehicle. The first signaling device 849 may also include a switch 863 disposed at a convenient location within the interior of the emergency vehicle for activation of the pulsed LED signaling and/or interrogation system. A scanner 865 may also be coupled to the second controller 827 to facilitate recognition of the wavelength of the pulsed LED light.

In at least one embodiment, a selection switch 867 may also be coupled to the second controller 827 to regulate the emission of focused optics and/or wide angle directional or non-directional pulsed LED light signals from the second LED light sources 829. A wavelength switch 869 may also be coupled to the second controller 827 to enable adjustment or change to the wavelength of emitted pulsed LED light signals. The second controller 827 may also be electrically connected to a terminal 871 within an emergency vehicle 835 and/or police squad automobile to visually generate information observable on a screen or display by an officer. (FIG. 38.)

Figure 42:
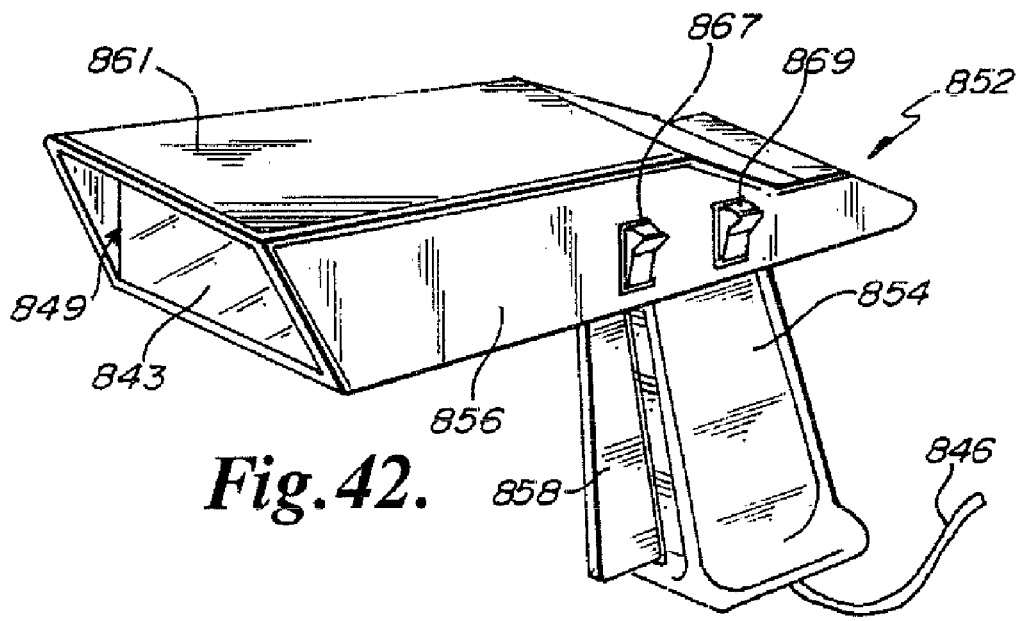
FIG. 42 is a detailed alternative view of the hand held pulsed light signaling system.

In one embodiment, the second LED illumination device 829 and/or second receiver 823 may be incorporated into a hand held unit 852 for use in specific targeting of motor vehicles by law enforcement personnel. (FIG. 42.) The hand held unit 852 may include a hand grasping portion 854 and a main body portion 856. A trigger 858 may be included in the handle grasping portion 854. The trigger 858 enables a law enforcement officer to instantaneously and selectively initiate the generation of a pulsed LED communication signal from the second LED illumination device 829 to interrogate of a first controller 815 and first receiver 819. The main body portion 856 includes a forward end 861 which is the location of the second LED illumination device 829 and second receiver 823. The second controller 827, second converter 825, and/or battery 845 may be located in either the main body portion 856 and/or the handle grasping portion 854 dependent upon space availability considerations.

In one embodiment, the handle grasping portion 854 and/or the main body portion 856 may also include a selection switch 867 and/or wavelength switch 869 as earlier described. A scanner 865 may also be integral or connected to the main body portion 856 for identification and recognition of pulsed LED communication signals to be received by the receiver 823. The hand held unit 852 and second LED illumination devices 829 may also generate focused optics and/or a wide angle directional or non-directional pulsed LED light signals within the visible or non-visible spectrum. The hand held unit 852 may also electrically connected to a terminal 871 within an emergency vehicle 835 and/or police squad to visually generate information observable on a screen by an officer.

In one embodiment, the features as earlier identified for the pulsed LED light signal system as integral to a light bar 833, vehicle, and/or hand held unit 852 are equally applicable to a stationary unit 873 which maybe releasably mounted to a dashboard. The stationary unit 873 may be provided with or without a hand grasping portion 854. In one embodiment a handle grasping portion 854 may also be omitted and/or eliminated where the trigger 858, switch 863, select switch 867, and/or wavelength switch 869 are preferably located on the main body portion 856, at a location convenient for manipulation by an officer. A scanner 865 as earlier described may also be integral or releasably coupled to the stationary unit 873. The stationary unit 873 may also be connected and/or releasably coupled to a terminal 871 integral to an emergency vehicle 835.

In at least one embodiment the pulsed LED light signal communication system as integral to a vehicle or vehicle license plate, will transfer basic information such as make, model, license plate number, status of license tab registrations, driving after revocation, and/or expiration of insurance, for a tagged and/or interrogated motor vehicle. The responsive signal received by the second receiver 823 of the law enforcement vehicle will be processed by the second controller 827 for coupling to a database and/or microprocessor integral to a terminal 871 within a police vehicle 835. Data therefore may be instantaneously retrieved for display to law enforcement personnel related to the likely occupant and/or criminal or driving record of the tagged vehicle, without the necessity for an officer to close distance to the suspect vehicle to permit unaided observation of the license plate 837. If information is received concerning an individual which would raise a safety concern for the law enforcement personnel, then sufficient time is provided to immediately request backup prior to the initiation of a motor vehicle stop. The speed and ease of access to Department of Motor Vehicle information to aid an officer during police activities is therefore significantly enhanced. In addition, the use of a pulsed LED light signal as free space carrier of information eliminates the necessity to expend significant economic resources for costly optical aids.

In some embodiments, the option to select from either directional or non-directional pulsed LED signals also permits a law enforcement vehicle to interrogate a significant number and/or virtually all motor vehicles on a roadway, to search for a stolen car and/or abduction, where time is of the essence to insure safety to an individual. In addition, a passive search may be activated for the pulsed light communication system to attempt to identify any motor vehicles within a particular class.

In an alternative embodiment, the pulsed LED illumination system may also be used to enhance positioning and/or mapping of the location for, or travel route to be taken by, a vehicle or an emergency vehicle 835. In this embodiment the communication system may periodically communicate with position locators to verify the location of a vehicle within a geographic area. This feature may be particularly useful in fire safety applications.

In at least one embodiment, the pulsed LED light signal may be used to generate optical pulses to be received by a first receiver 819 to transmit a security code for access to a gated community, garage, and/or secure parking lot. In these instances, the second LED illumination sources 829 generate a pulsed LED light signal for receipt by the first receiver 819 which in turn is coupled to a first controller 815 and a switch to open an otherwise locked gate.

In an alternative embodiment, the first controller 815 may be electrically coupled to a motor vehicle speedometer. If the motor vehicle is tagged during law enforcement activities, then the first controller 815 may signal the first LED illumination sources 803 to generate a pulsed light communication representative of the speed of the vehicle to be received by a second receiver 823 integral to a law enforcement vehicle 835.

In at least one embodiment a pulsed LED light signal may also be used by law enforcement and/or highway personnel to modify illuminated highway signs. In this embodiment, a second LED light source 829 may generate a coded signal for modification of a stationary illuminated street sign for display of a new message. Transportation markers such as road signs and/or mileage signs may also include a pulsed LED signaling device to communicate information to a motor vehicle.

The transmitted signal as received by the second receivers 823, integral to the road sign, may be processed by the second controller 827, for issuance of a message such as "congestion", "accident", "reduced speed", and/or any other message as appropriate for communication of traffic conditions. Communications may therefore be passed through free-space from an emergency vehicle 978, to alter roadway signs, without use of radio frequency transmissions.

In one embodiment, the first controllers 815, of the emergency vehicle 978, and the second controller 827, of the roadway signs, may perform recognition protocols to verify authenticity of transmitted instructions and/or messages. In addition, each of the first controllers 815, of the emergency vehicle 978, and the second controllers 827, of the roadway signs, include identification and recording software to assist in recording of transmitted instructions.

Figure 28:
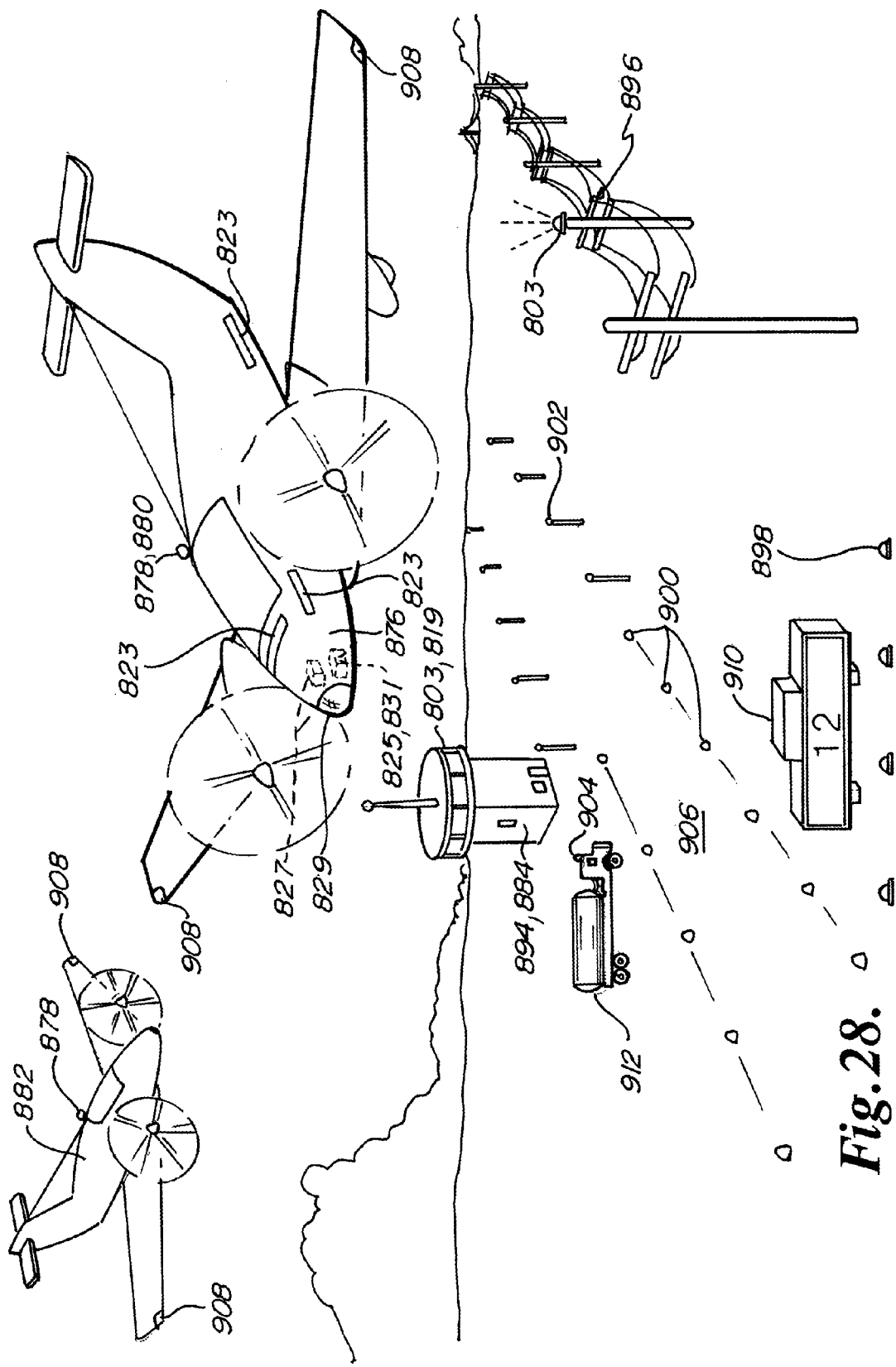
FIG. 28 is an environmental view of an LED pulsating light signal in an airport environment.

In an alternative embodiment the pulsed LED communication system may be incorporated into aircraft. (FIG. 28) Aircraft anti-collision systems are extremely important for pilot and civilian safety. Some aircraft include transponders for use in anti-collision systems and/or TCAS systems within transponders zones proximate to an airport. Other aircraft may pass through regulated transponder zones where the aircraft does not include anti-collision transponders. The risk of air collision within restricted transponder zones is increased by the existence of non-transponder aircraft.

In the past, there has generally been two different versions of TCAS where the first version indicates the bearing and relative altitude of an aircraft within a selected range of approximately 10 to 20 miles of another transponder equipped aircraft. Within this first TCAS system an air traffic advisory may be issued to identify the intruding aircraft, which may permit the increase or decrease of a planes altitude by up to approximately 300 feet. The initial TCAS system does not provide solutions for air anti-collision avoidance, however, the TCAS initial system provides pilots with important information to initiate a course correction to avoid collision. In a second version of TCAS, a pilot is provided with resolution advisories. This TCAS system determines the course of each aircraft and whether the aircraft is climbing, descending, or flying straight and level. The enhanced TCAS system issues resolution advisories to pilots to execute types of evasive maneuvering necessary to avoid collision. If both aircraft are equipped with the enhanced TCAS system, then the two computers on the respective aircraft offer the conflicting resolution advisories. Non-conflicting resolution advisories prevent course alternations which would effectively cancel anti-collision corrections between the two aircraft which would result in a continued threat.

In one embodiment, the pulsated LED communication system may be incorporated into a rotating or flashing beacon 878, which is secured to the exterior of the fuselage of the aircraft 876. Certain aircraft 876, may utilize one or more beacons 878, within the pulsed LED communication system. Each beacon 878, may be formed of a light support 801, and first LED illumination sources 803, as earlier described. In addition, the first LED illumination sources 803, may be positioned within a stationary panel or may be incorporated within a rotational device 805, as earlier described. In the event that a stationary LED light support 801 is utilized within the beacon 878, then a rotatable reflector assembly 809, may be positioned over and/or adjacent to the LED light support 801, to facilitate the appearance of rotation. Alternatively, the LED illumination sources 803, may be selectively illuminated by the first controller 815, to provide and impart the appearance of rotation for the beacon 878. The LED light support 801, may be organized into sectors 811 of individual LED illumination sources 803, having different wavelengths of emitted light as earlier described. The beacon 878, may therefore, incorporate dual functionality of a visible illumination source and a non-visible pulsed light communication system for transmission of information between the first LED illumination sources 803, and a second removed receiver 823.

The beacon 878, first LED illumination sources 803, and any rotational device 805, are in communication with the first controller 815, which is constructed and arranged to provide modulated light intensity to the first LED illumination sources 803. The modulated light intensity may be provided to regulate the rate of pulsation of the first LED illumination sources 803, during the generation of a pulsed LED communication signal.

In one embodiment the pulsated light signals as emitted from the first LED illumination sources 803, as regulated by the first controller 815, may be either encoded and/or encrypted for receipt by the second receiver 823, located at a remote position relative to the aircraft 876. The pulsed LED illumination signals as generated by the first LED illumination sources 803, communicate information as to the identity of the aircraft 876, and/or the position of an aircraft 876, relative to an obstacle and/or tower.

In one embodiment, an observable light signal may be generated from the first LED illumination sources 803, as an anti-collision light source, at a rate of 20 to 60 cycles per minute. A non-observable pulsated light source may be generated by the first LED illumination signals 803, at a rate of 80 hertz and preferably 100 hertz or greater.

In at least one embodiment an operator may select from a number of pre-stored pulsed light combinations representative of information to be communicated via the first controller 815. Alternatively, real time communications may be transmitted by pulsed light signal via the use of a keyboard or voice activated system where the controller 815, translates the information into combinations of pulsed light signals for transmission to a second receiver 823. A second receiver 823, preferably receives the generated pulsed LED signals for initial processing and for transfer to a second controller 827, for communication to an individual or system. The first controller 815 may also be constructed and arranged to communicate pulsed light signals containing information such as call sign, type, destination, flight plan, and/or other pre-programmed information for an aircraft 876.

In at least one embodiment, the first controller 815 includes filtering programming having a sufficient level of sophistication to eliminate recognition of false light signals which may occur from a source such as sunlight during analysis of received pulsed LED light signals. The controller 815 may also include a handshake protocol to assist in recognition of a pulsed LED communication signals. The handshake protocol may include an alternating pre-set pattern of ultra high speed pulsating LED light signals of the same or different wavelengths as may be transmitted in a pre-determined and recognizable combination, prior to the transmission of information between a first controller 815, and a second receiver 823. The second controller 827, is preferably constructed and arranged to search for and focus upon the pre-set patterns of pulsed LED communication signals to finalize the handshake recognition protocol for elimination of interference light signals. The light support may also include any number of filters proximate to the receivers 819, for elimination of undesirable light signals.

The pulsed LED communication system for use in association with an aircraft 876, preferably augments any available TCAS system. The pulsed LED communication system may additionally function as a backup to the transponder of the anti-collision TCAS system. The pulsed LED light signal system may also be used in an airport air traffic environment for VFR pattern verification and control. This is accomplished by the generation and receipt of pulsed light communication signals between first and second signaling devices as previously described.

In one embodiment, the first controller 815, maybe positioned proximate to the control panel of an aircraft 876, for regulation of the transmission of information and/or data via the first LED illumination sources 803.

In at least one embodiment, the controller 815, may receive converted pulsed LED communication signals for processing, in order to communicate information to a pilot and/or air traffic controller. The controller 815 within an aircraft preferably regulates the transmission of data via pulsed LED light signals for transmission to other aircraft and/or tower optical receivers 823. The initiation of the pulsed LED communication system may be continuous or occur at any time as selected by a pilot.

In one embodiment, the controller 815, may transmit more than a single light signal and more than one pulsed LED light signal simultaneously from independent sectors 811 of the light support.

In at least one embodiment, a second aircraft 882, and/or ground location 884, may have one or more second receivers 823 and second controllers 827, where at least one of said second receivers 823 and second controllers 827, are constructed and arranged to simultaneously receive one or more pulsed communication signals as generated from each group and/or sector 811 of LEDs 803. In at least one embodiment the second controller 827, is constructed and arranged to collate, decode, translate, and organize the simultaneously received pulsed LED communication signals into a composite decoded message.

In some embodiments, the speed of transmission and receipt of pulsed LED communication signals enables messages to be encrypted to provide for the secure transmission of information for receipt by a ground location 884, and/or second aircraft 882. The speed of pulsed LED light signals may exceed two kilohertz. The most readily apparent limitation on the transmission of encrypted messages relates to the size of the one or more second receivers 823, for receipt of any encrypted pulsed LED communication signals. The second controller 827, may also include any desired passwords or verification messages to insure the validity of receipt of secure transmissions. Communication of pulsed LED light signals may be terminated by a first controller 815, at any time when an initial and/or periodic required responsive pulsed LED communication signal is not received by the first receiver 819, and/or the accuracy of the received LED communication signal is not verifiable. In some embodiments the first controller 815 may include software to terminate transmission in the event that a responsive communication signal having the appropriate security message is not received.

In one embodiment an array of second receivers 823 may be used on the aircraft. Each array of second receivers 823 maybe interfaced within an aircraft 876 TCAS anti-collision system for detection of pulsed LED communication signals. In this embodiment it is desirable to determine whether a transmitted pulsed LED communication signal is occurring in a crossing direction relative to the array, where the transmitted LED communication signal is sequentially detected and/or tracked by adjacent second receivers 823. If sequential detection of the communication signal occurs by the second receivers 823, then a second aircraft 882, maybe identified as flying in a crossing pattern relative to the first aircraft 876, minimizing risk of collision. Alternatively, if a single second receiver 823, or group of receivers 823, continuously receives a pulsed LED communication signal and no sequential tracking is detected, then it is likely that the second aircraft 882, is on a constant bearing decreasing range course necessitating an anti-collision course correction. A visual and/or audible alarm may be provided by the second controller 827, in the event that the second receivers 823, and/or group of second receivers 823, continuously receive a transmitted LED pulsed light signal for a period of time exceeding approximately three to five seconds. The second controller 827, may be programmed to include any desired period of time as a threshold prior to triggering of the visual and/or audio alarm within the aircraft TCAS system, advising of the existence of a constant bearing decelerating range second aircraft 882.

In at least one embodiment, the alarm 890, triggered by the second controller 827, may advise a pilot by reciting audible warning terms, and may further provide a direction for the received signal. In this embodiment, the individual second receivers 823, may each be associated with a pre-stored site within the second controller 827. The receipt of a pulsed LED light signal may therefore be traced by the second controller 827, to a second receiver site 823, to indicate the general direction of the source of the pulsed LED communication signal. Each second receiver 823, may be assigned a different site especially when two or more arrays, are utilized on an aircraft 876.

In one embodiment, the communication system may further be coupled to an accelerometer which senses aircraft 876 deceleration rates beyond expected parameters. An accelerometer may activate the emergency beacon, and may initiate a pulsed LED communication signal including preprogrammed information related to aircraft call sign, type of craft, GPS coordinates and destination, once an unacceptable deceleration rate is detected. The transmission of pulsed LED communication signals thereby augments the current emergency locator transmitter signals for identification of the location of a downed aircraft 876.

In one embodiment, the systematic information transfer through encrypted/pulsed light system may also be incorporated into an airport tower 894, and/or obstacle 896, such as a power line support tower and/or radio tower In one embodiment the encrypted/pulsed light communication system as engaged to an airport tower 894, and/or obstacle 896, may be formed of a light support 801, having first LED illumination elements 803, as earlier described. The light support 801, may be attached to a rotational device 805 for rotation where the light support may include rotational reflectors 809, as earlier described. Alternatively, a controller 815, may provide modulated light intensity in association with selective illumination of first LED light sources 803, to generate the appearance of rotation as earlier identified.

In one embodiment the signal as generated from a tower 894 and/or obstacle 896 may carry signals representative of characters, numerals, and/or words in a free space transmission. The generated pulsed signals may be utilized for aircraft identification, anti-collision, relay atmospheric conditions, aircraft guidance, and general illumination. The light sources utilized in association with a tower 894, and/or obstacle 896, maybe red in color relating to a pre-selected wavelength in accordance with FAA regulations.

In one embodiment, an aircraft 876, may further include the second LED illumination sources 829, for transmission of the light signals to the first receiver 819, integral to the obstacle 896, and/or tower 894. The first controller 815 as engaged to the obstacle 896 or tower 894, may receive and process a message received from the second controller 827, to record data such as the aircraft identification, time, and date. In addition, the plurality of first receivers 819, may be set at different wavelengths for receipt of pulsed light communication signals. The modulated or reduced duty cycle at certain LED wavelengths may function as a distance indicator relative to the obstacle 896. For example, a first wavelength may be selected where a successful handshake protocol between the first LED illumination sources 803 of the obstacle 896, and the second receivers 823 of the aircraft 876, and the return signal from the second LED illumination sources 829, for receipt at the first receivers 819 of the obstacle 896, indicate an approximate first distance of three miles between the aircraft 876, and the obstacle 896. A selected different wavelength emitted from the first LED illumination sources 803 at a reduced modulated duty cycle as regulated by controller 815, may be recognized by the second receivers 823, only when the distance between the obstacle 896, and the aircraft 876, has been reduced to a distance of two miles or less. The successful handshake protocol related to the second wavelength emitted by the first LED illumination sources 803, indicates that the aircraft 876, has closed distance with respect to the obstacle 896, by approximately one mile. Additionally, many features may be included within successive wavelengths to warn the second controller 827, and aircraft 876, as to the proximity to a hazard and/or obstacle 896. The pulsed light communication signals may be audible alarms, visual LED lights, and/or voice signals.

In one embodiment, any number of distance warnings relative to an obstacle 896 may be emitted from the first LED illumination sources 803. In addition, for each successive pulsed LED communication signal may incrementally escalate in warning content. For example, the three mile pulsed light communication signal may be relatively passive. The two mile pulsed light communication signal may be more severe in the flashing of the lights and buzzing of the audible signals. The two mile pulsed light communication signal may also transmit to a pilot harassing signals, and the one mile pulsed light communication signal may be quite obnoxious. In addition, each successive wavelength having reduced modulated duty cycle intensity, may be set at a different repetitive cycle. For example, the three mile pulsed light communication signal may repeat every 15 seconds. The two mile pulsed light communication signal may repeat every 7 seconds, and the one mile pulsed light communication signal may continuously repeat.

In at least one embodiment, the issuance of continuous warning pulsed LED light communication signals may occur until such time as a compliance signal is generated by the second controller 827, indicating alteration of course of the aircraft 876.

In at least one embodiment, in addition to the first controller 815, simultaneously emitting any number of pulsed LED light communication signals the first controller 815 may alter the observed visual light signal by generation of a faster and/or slower observable light signal. The transition between observable light signals may occur as the controller initiates the transmission of the second or third pulsed LED light communication signals.

Figure 41:
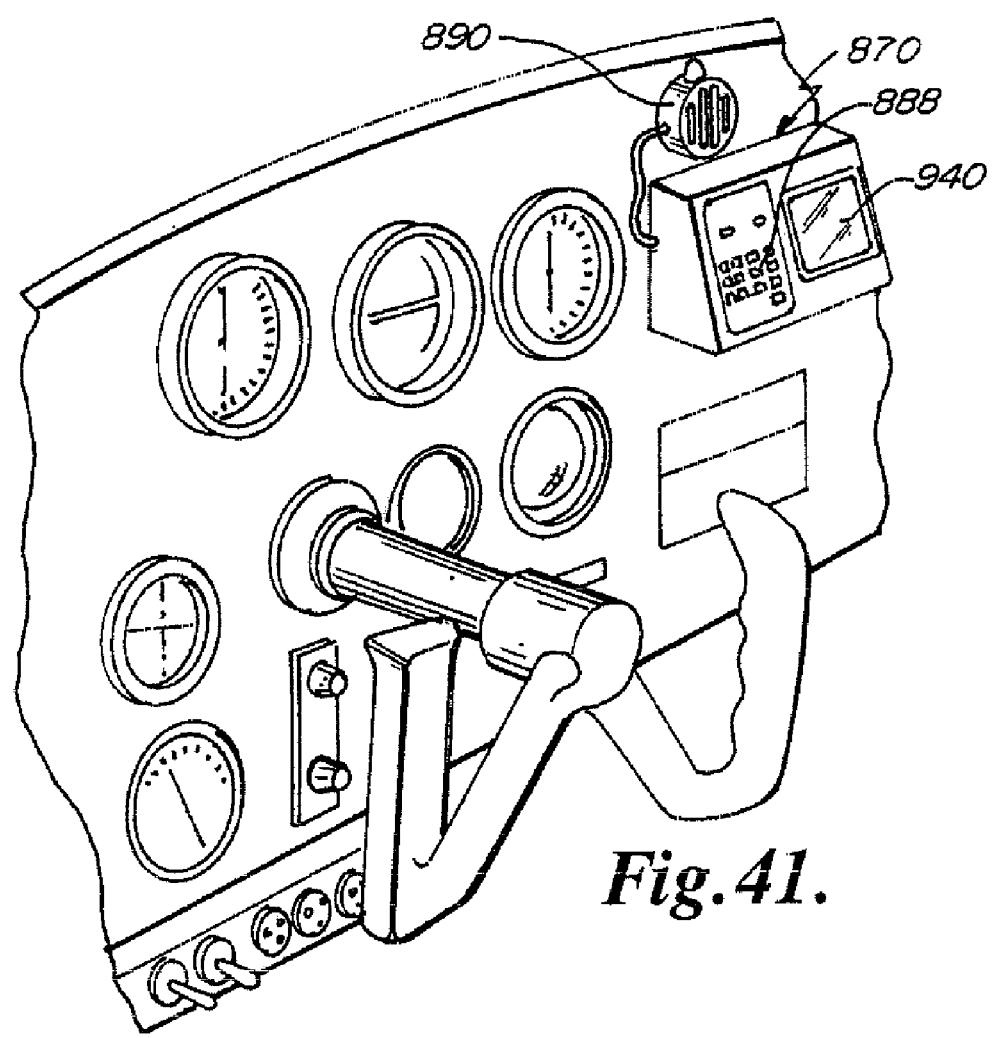
FIG. 41 is an environmental view of the controller of the pulsed light signaling system within the cockpit of an aircraft.

In at least one embodiment, the real-time transmission of information between a second controller 827 and a first controller 815, may occur by the exchange of pulsed LED light communication signals as related to current air traffic proximate to a tower 894, wind direction, wind speed, visibility, ceiling, and/or weather conditions or other information which may be useful to a pilot. Real-time information received from the second controller 827, may be processed for visual display on a screen integral to a cockpit. (FIG. 41.) Alternatively, real-time information received by the second controller 827, may be processed for generation of voice information and instructions by transmission through a speaker integral to a cockpit or through headphones.

In one embodiment a pilot may select a particular wavelength of pulsed LED light communication signals for receipt of a particular class of information. For example, a first wavelength may continuously emit information as to the coordinates or location of an obstacle 896. A second wavelength may provide air traffic control information. A third wavelength may provide information as to weather and a fourth wavelength may provide navigation guides.

In one embodiment the systematic information transfer through encrypted/pulsed light systems may be used to transmit approach and/or position information to an aircraft 876. An acknowledgment protocol as earlier described may be used between an aircraft 876 and/or tower 894 to facilitate landing. Real-time flight information may also be exchanged between the aircraft 876, and the tower 894, related to the aircraft identity, altitude, direction, rate of descent, and wind direction, wind speed, ceiling, instrument approaches, visibility, traffic conditions, landing clearance, as well as other types of aircraft landing information.

The systematic information transfer encrypted/pulsed light signal system may additionally be utilized in conjunction with airport taxi lights 898, runway lights 900, runway approach lights 902, and airport support vehicle lights 904.

In one embodiment the system as utilized in association with a plurality of taxi lights 898, generally places a second LED light support 801, having the second LED light sources 829, and second receivers 823, integral to the marker 910.

Each taxi light 898, may be powered by a hardwired electrical source and/or connected to a battery which may be rechargeable. Each taxi light 898, second illumination source 829, and/or second receiver 823, is also electrically connected to a second controller 827, which may be separated from the taxi lights 898, at a central location. A second converter 825, may be coupled to the second controller 827, for conversion of electrical signals from the second receiver 823, to digital signals, for processing within the second controller 827. The second controller 827, is constructed to pass information to a control center and/or control tower 894, by optical pulsed light within the LED system or via wire connections. More than one controller 827, may be in communication with a single and/or group of taxi lights 898.

In one embodiment the taxi lights 898, as a portion of the system may be organized into patterns and/or groups. Each collection, pattern, and/or group of taxi lights 898, may be in electrical communication with one or more second controllers 827. Further, a second controller 827, may be in communication directly with a control tower 894, or an additional main controller to facilitate transfer of information through a communication system. The signaling system in this embodiment may facilitate the tracking of aircraft 876 on the ground or as adjacent to a runway 906, and/or airport In one embodiment each taxi light 898, in addition to the transmission of a signal indicating proximity of an aircraft, may transmit to the control tower 894, a pulsed LED communication signal which identifies, the location of the individual taxi light. Traffic controllers within the control tower 894, may therefore be provided with real-time positioning of an aircraft 876, taxiing adjacent to a runway 906, without reliance upon radio frequency communications.

In one embodiment a tower 894, may contact a second controller 827, for activation of a selected taxi light 898, to transfer a desired pre-stored and/or real-time pulsed communication signal to the aircraft 876. Traffic regulation signals such as: delay gate departure; remain in a stationary position relative to the taxi way; or proceed to the end of the runway, may occur without the need for radio frequency transmissions.

In one embodiment the systematic information transfer through encrypted/pulsed light system may also be included as an integral component of a runway 906, lighting system. The runway lighting system includes the same LED transmission and receptor components as earlier described in association with the taxi lights 898, and/or aircraft 876. The runway lights 900, are regularly spaced along and are positioned adjacent to a runway 906. The runway lights 900 simultaneously provide illumination of a runway 906, and transmit communication signals through free space transmissions.

In one embodiment, an aircraft hold situation, the second controller 827 may flash a portion of the runway lights 900, to communicate that takeoff clearance has been delayed. In addition, the runway lights 900, and particularly the second receiver 823, and second controller 827, may receive instructions through the use of a signal generated from a tower 894.

In one embodiment the communication system may be incorporated into runway approach lights 902. The approach lights 902, may include a light support 801, second LED illumination sources 829, second receivers 823, and second controller 827 as earlier described. The features and functions as earlier described related to the taxi lights 898, and/or runway lights 900, are equally applicable to the runway approach lights 902.

In some embodiments, the tower 894, may track an approach vector for an aircraft 876, through radar/VFR air traffic control systems. As a backup to the radio frequency communications, duplicate instructions may be transmitted by the approach lights 902, for receipt by the first receivers 819, integral to the aircraft 876. Simultaneously, an airplane 876, may transmit pulsed communication signals identifying information related to vector, rate of descent, speed, and altitude in real-time, to the control tower 894. A computer/processor may receive data communicated by the LED pulsed light communication system for verification of acceptable approach parameters. Analysis of the aircraft approach may result in the transmission through radio frequency and signals of an abort approach message due to the existence of unacceptable approach parameters. Alternatively, a tower 894, may transmit through the approach lights 902, and/or by issuance of radio frequency and/or communications, that approach parameters for an aircraft 876 are required to be modified for a successful landing. The approach lights 902, may alternatively continuously transmit through emission of communications information such as wind direction, wind velocity conditions, weather information, runway status, ceiling information, and/or other information as appropriate to facilitate landing of the aircraft 876.

In one embodiment the approach lights 902, as regulated by the second controller 827, may also alter a pattern of strobe or other observed illumination during approach to a runway 906. The alteration of a pattern of illumination for the approach lights 902, and/or the color of the transmitted light, may function as an additional visual indicator to an aircraft 876.

It should be noted that free space transmissions described herein for aircraft may be equally applicable for communications outside the earth's atmosphere as related to communications in space.

In one embodiment the second controller 827 for an airport service vehicle 912, may include preprogrammed locations relative to an airport. An individual may therefore select an appropriate location via an entry pad or keyboard to alter the pulsed signal to be transmitted to a control location or tower 894 to reflect a change in position of the airport service vehicle 912. Alternatively, a plurality of positional receivers may be disposed at various locations about an airport. In this embodiment, the airport service vehicle light 904, continuously emits an identification signal which is detected by at least one adjacent positional receiver. Upon receipt of the signal from the airport service vehicle 904, a pulsated light position indicator signal is generated to either an aircraft 876, and/or tower 894, by the positional receiver. The second LED illumination sources 829, as coupled to the positional receivers may simultaneously communicate a pulsed signal representative of the location of the positional receivers as well as the identification of the type of signal received indicating the type of airport service vehicle 904 which is proximate to the positioned receivers.

In one embodiment each second controller 827, as integral to an airport service vehicle 904, may include a pre-programmed coded pulsed signal identifying the particular type and/or function for an airport service vehicle 912. Alternatively, the type of aircraft service vehicle 912, may be indicated through the signals of different and independent wavelengths.

In one embodiment the use of a communication system in association with an airport service vehicle light 904, enables communication to the cockpit for an aircraft 876, to indicate the real-time status of food replacement, fuel delivery, baggage loading or unloading, and/or maintenance completion. A pilot may therefore advise the crew and/or passengers as to the status of a craft to assist in departure. In addition, a LED light communication system in association with an aircraft

876 may expedite communication that the aircraft 876, is ready and available to receive food, fuel, and/or baggage which in turn enables faster preparation for continued aircraft service.

The components, features, and applications as earlier described related to the LED pulsed light communication system are equally applicable for use in a marine application.

Figure 29:
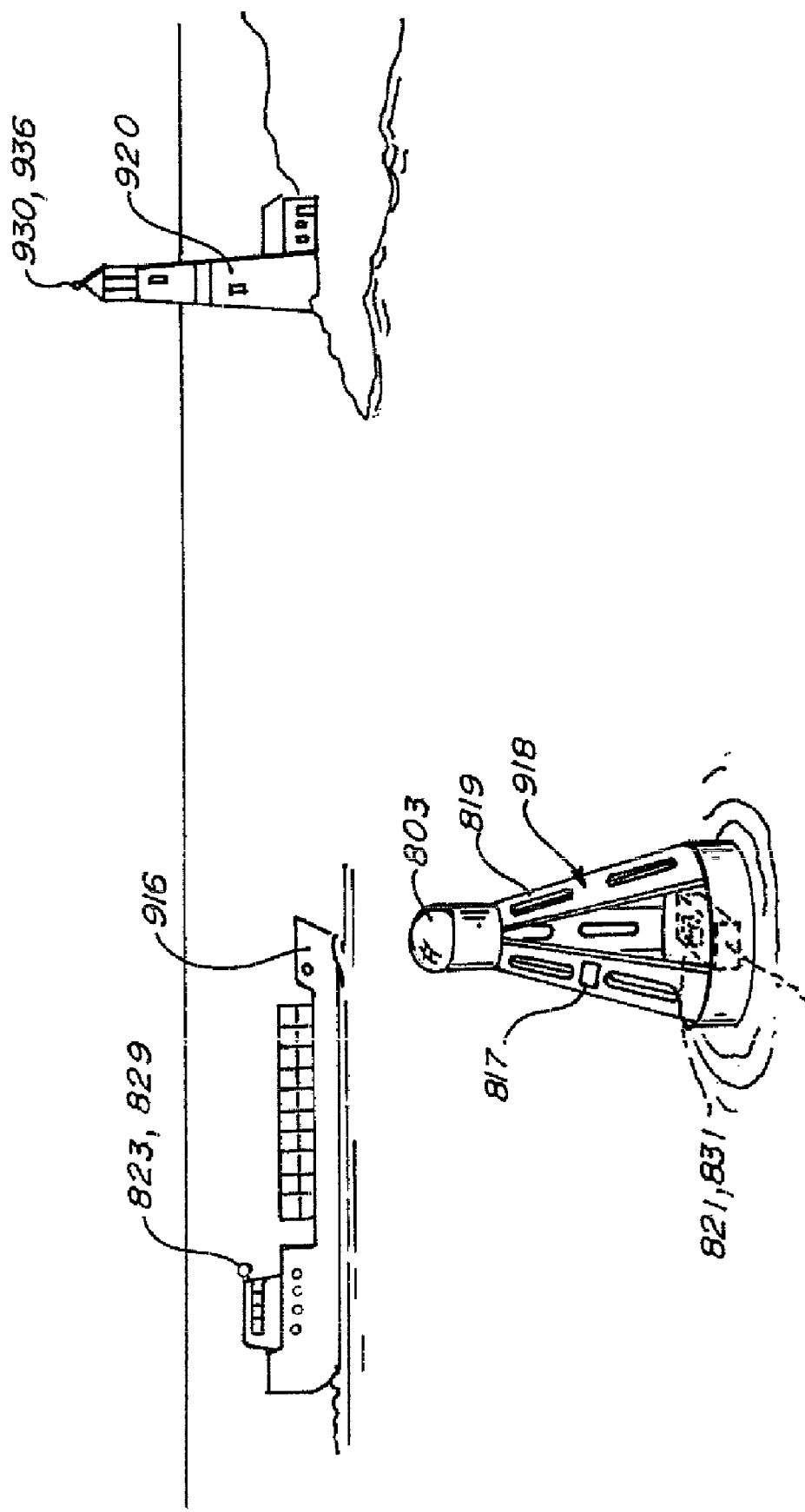
FIG. 29 is an environmental view of an LED pulsating light signal and marine environment.

In one embodiment an LED light support 801, having first LED illumination sources 803, may be placed at a suitable location aboard a first vessel 916. (FIG. 29.) The LED light support 801, may include a rotational device 805, collimator assembly 807, stationary and/or rotatable reflectors 809, and/or sectors 811, and/or different wavelengths of LED light sources as earlier described. The LED light support 801, may be coupled to a vessel power supply and/or may be battery operated having rechargeable solar cells or wave-action generators.

In one embodiment a second LED light support 801, having second LED illumination sources 829, second receiver 823, second converter 825, and second controller 827, may be integral to a marine buoy 918, lighthouse 920, and/or other vessel.

In one embodiment the communication system as used in association in association with a marine buoy 918, preferably enables enhanced visualization of the location of the buoy 918, while simultaneously transmitting an LED pulsed light communication signal to indicate pre-programmed and/or real-time information for transmission to a vessel 916. A second controller 827, as integral to the marine buoy 918, may transmit pre-stored information such as the identification number of the buoy, the fact that the buoy may be used as an east channel marker, and the depth of the water at the location of buoy 918. In addition, the second receivers 823, may be disposed about the buoy 918, at various locations, where an individual second receiver 823, will only detect a transmitted signal at such times as a first vessel 916, is outside of a marked channel. In this instance the selected second receiver 823, will generate a signal to the second controller 827, which will in turn generate a warning signal to the first vessel 916, that the first vessel 916, is outside of the marked main channel and may be on a course for running aground and/or striking underwater obstacles.

In one embodiment, the buoy 918, may receive information concerning a vessel 916, and then forward the identity of the vessel 916, to a second buoy 918, and/or a harbor control center through the use of LED pulsed communication signals. Any number of buoys 918, may be utilized to sequentially transmit pulsed LED communication signals to a harbor master concerning a vessel 916.

In one embodiment, the first controller 815, as integral to the vessel 916, and the second controller 827, as integral to the buoy 918, may also include a pre-stored and/or pre-programmed recognition protocol related to pulsed LED light communication signals as earlier described.

In at least one embodiment, the second LED illumination sources 829, as integral to the buoy 918, may be constructed and arranged to provide a visual LED signal within the red and/or green spectrums for use as navigation aids.

In some embodiments, a harbor master may also utilize a series of buoys 918, to sequentially transmit a communication to a first vessel 916, for regulation of marine traffic through a channel. In addition, the buoy 918 may be used as a position identification and/or obstacle marker.

In at least one embodiment, the buoy 918 may communicate information such as longitude and latitude coordinates for the buoy 918. In addition, a buoy 918, may become activated and transmit signals at such time as the second receiver 823, receives a triggering signal from a first set of LED illumination sources 803, integral to a first vessel 916. Each buoy 918, may also transmit real-time information such as water temperature, barometric pressure, changes in barometric pressure, temperature, and/or wind speed and direction through the use of communication signals.

In at least one embodiment, buoy's 918 utilizing communication signals may also track marine traffic. In the event that a vessel 916 becomes overdue, then a retrieval craft such as an airplane or helicopter may be dispatched by an entity such as the Coast Guard having interrogation capabilities. An investigating vessel or aircraft may then fly within range of a buoy 918, and transmit an interrogation signal which will trigger the second controller 827, to dump all pre-stored marine traffic data for transmission to the interrogation vessel or aircraft via a responsive communication signal. A searching vessel may thereby identify time and direction of travel for a lost vessel to narrow a search area, thereby improving the probability of survivor retrieval.

In at least one embodiment, a vehicle such as an aircraft 876, may fly within the proximity of a buoy 918, for transmission of a first signal to be received by the second receiver 823, to modify future communications generated by the buoy 918.

In one embodiment, communication signals may also be transmitted between a first vessel 916, and a lighthouse 920, in a manner as earlier described. Communications being generated by a lighthouse 920, are anticipated to be prominently pre-recorded and/or pre-stored communication. It is anticipated that the communication signals as generated by a lighthouse 920, will transmit information such as longitude and/or latitude or other coordinates, and navigation information which will assist a first vessel 916, from approaching a marine hazard.

Figure 30:
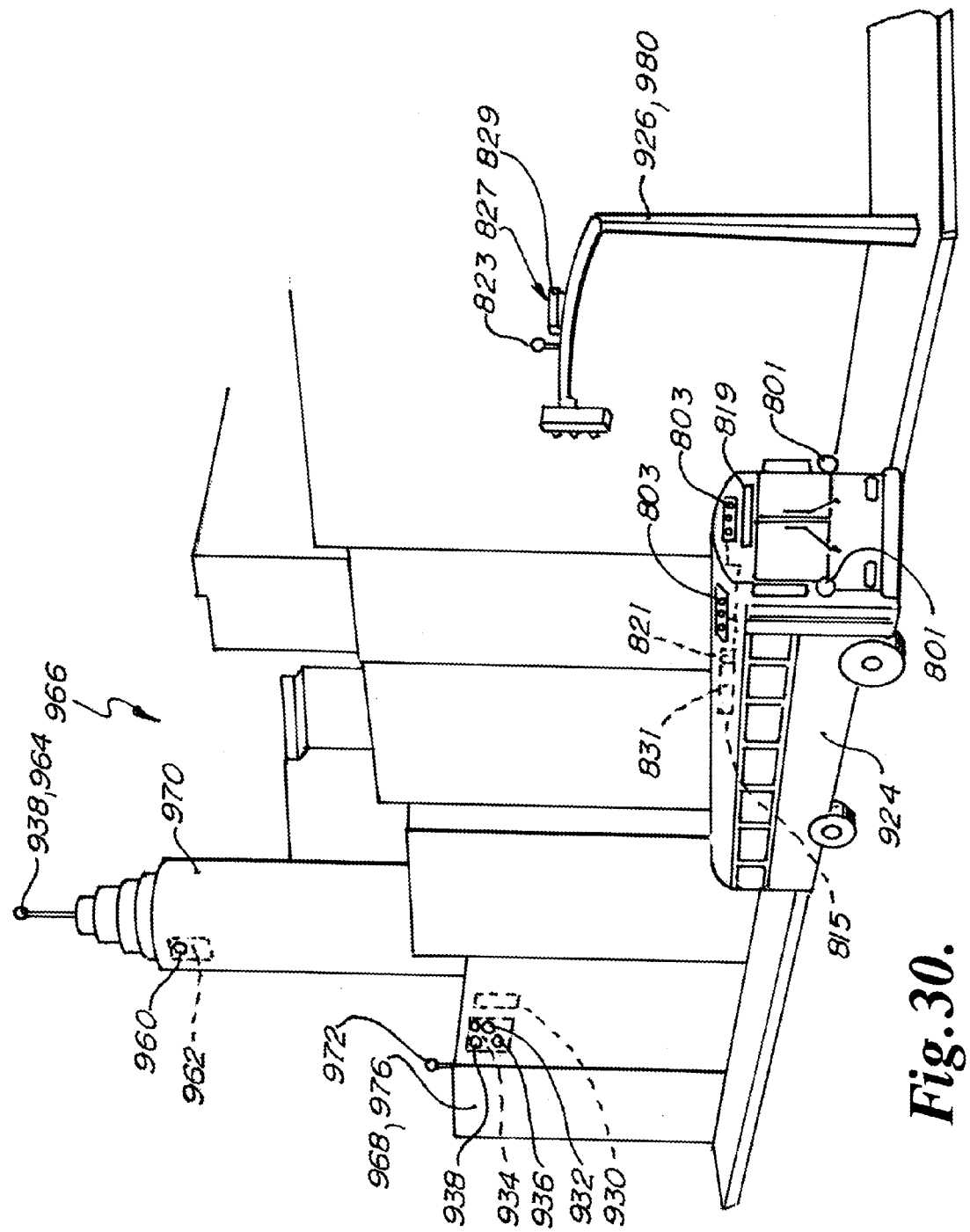
FIG. 30 is an environmental view of an LED pulsating light signal and urban environment.
Figure 33:
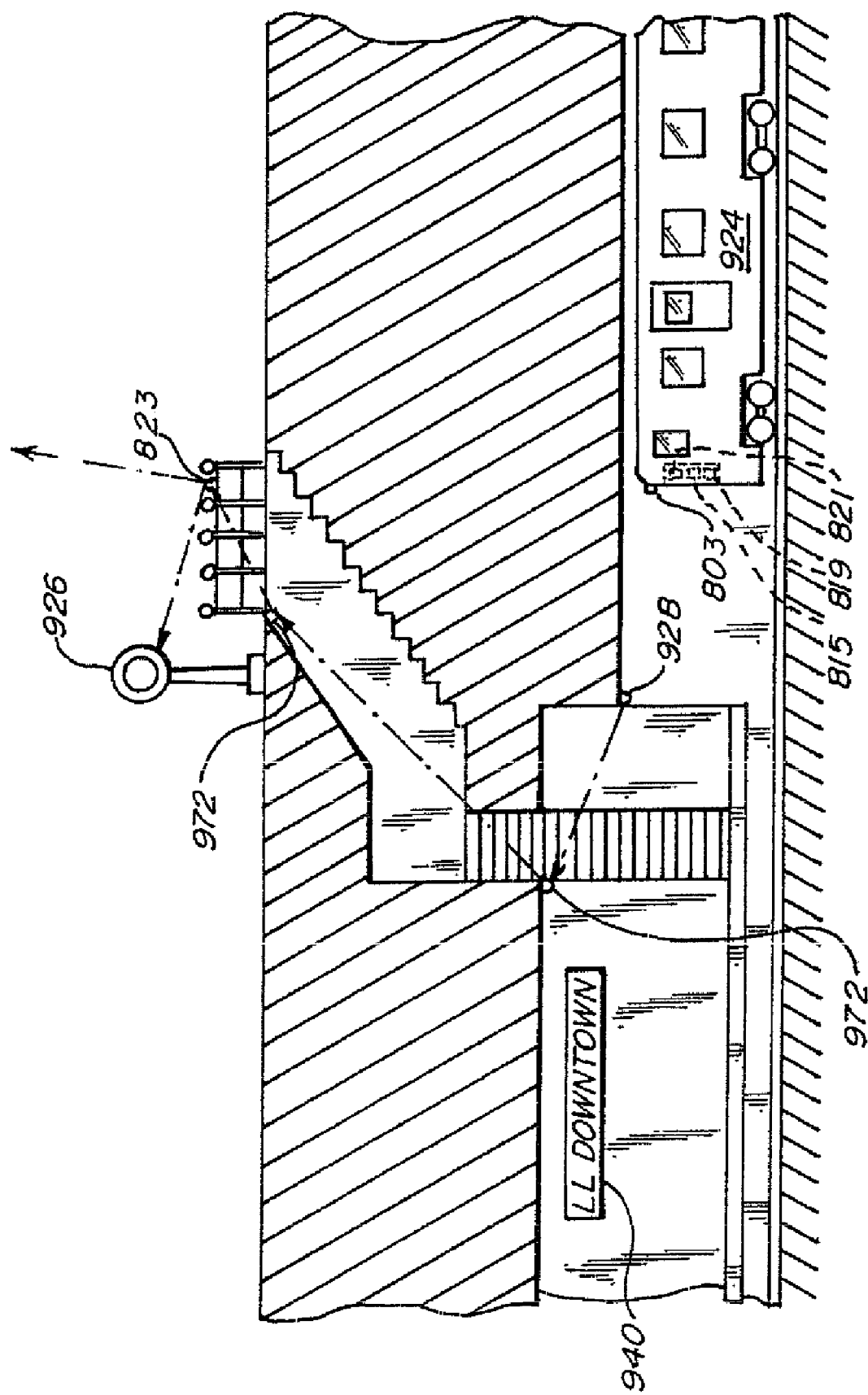
FIG. 33 is an environmental partial cross-sectional side view of an LED SIT-TEL pulsating light signal and subway environment.
Figures 34, 35:
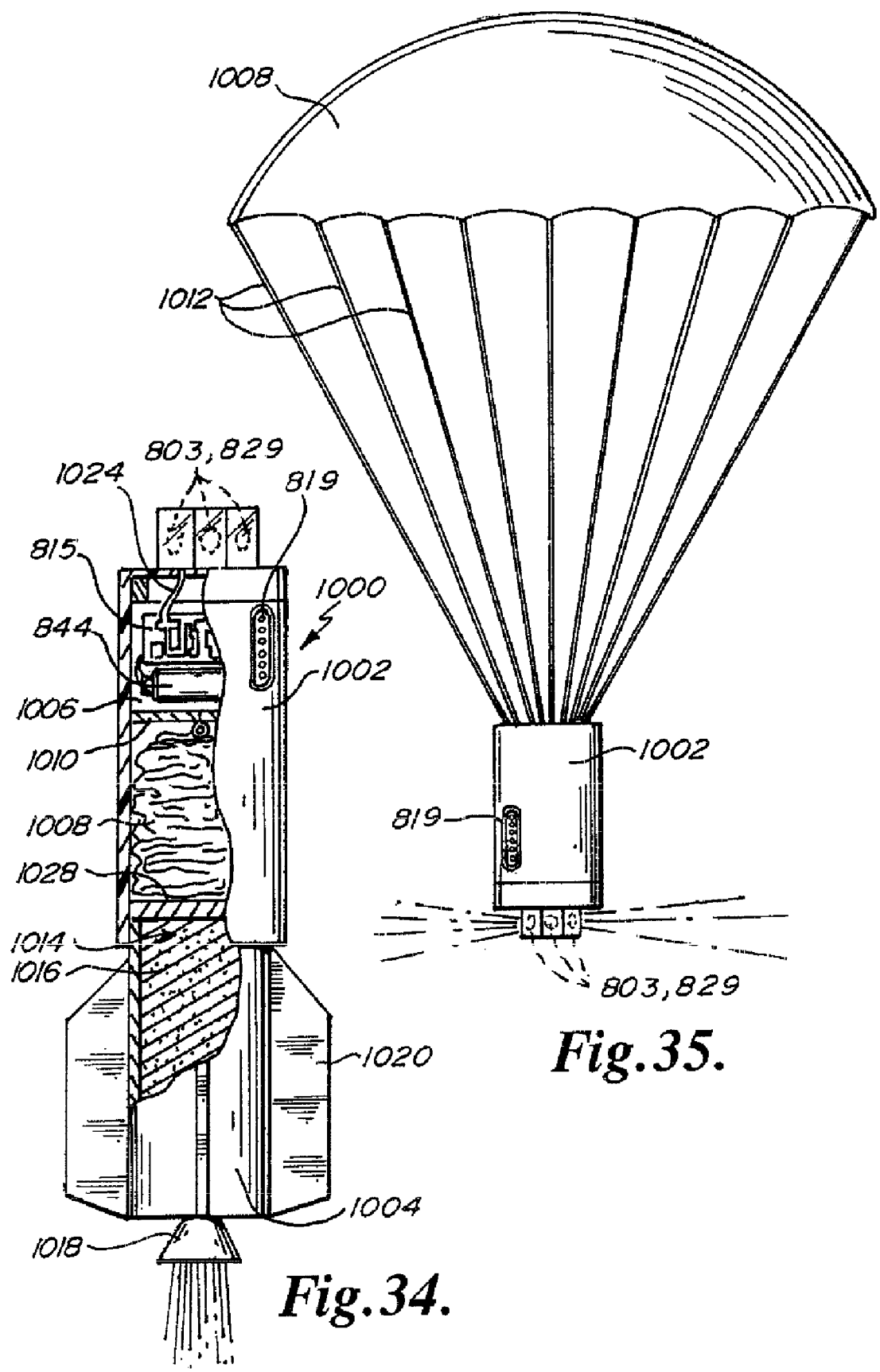
FIG. 34 is a partial cut away view of a flare having an LED communication system.
FIG. 35 is a perspective view of a flare having an LED communication system.
Figure 36:
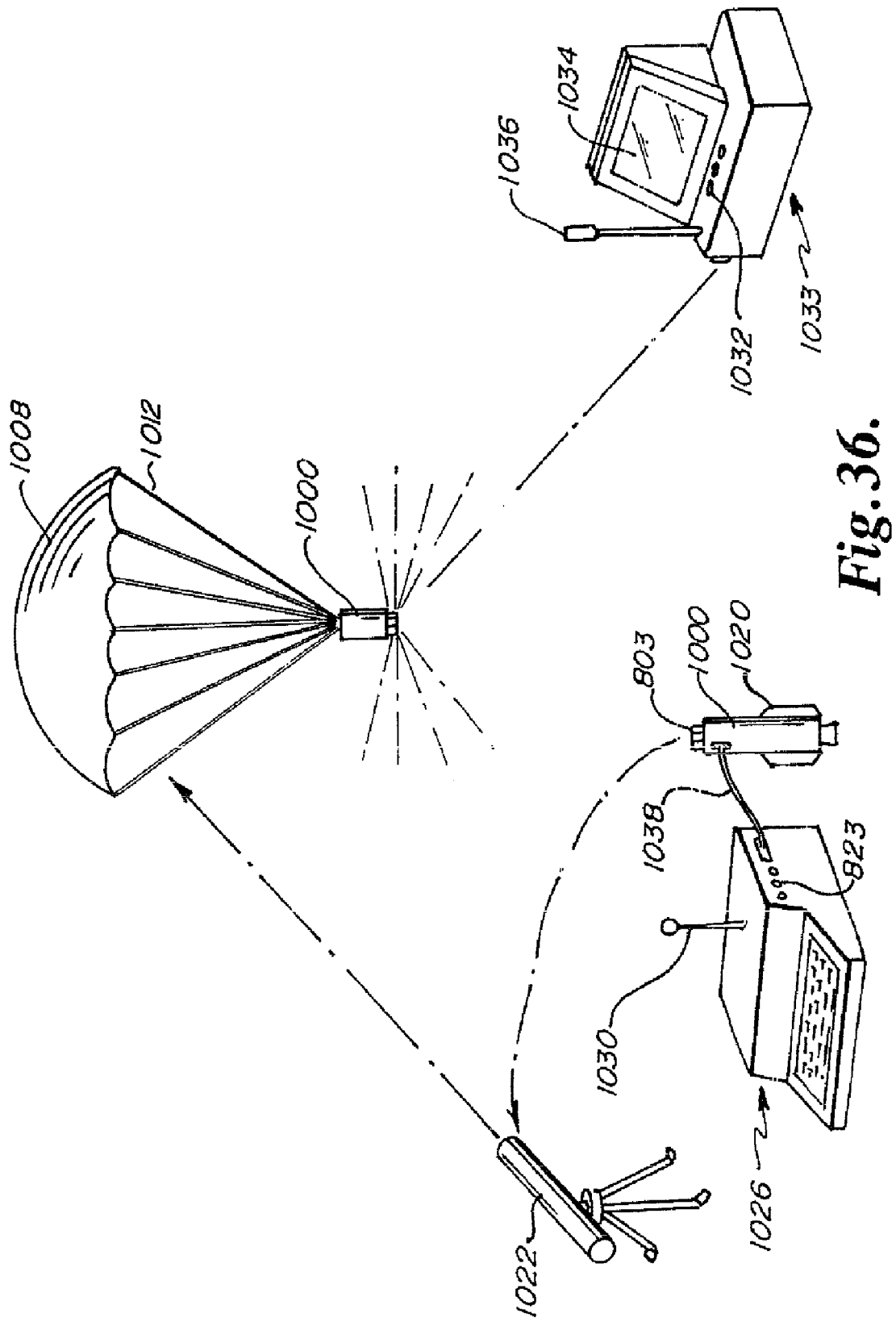
FIG. 36 is an environmental view of a flare having an LED communication system.

In one embodiment, the components, features, and applications as earlier described related to the LED pulsed light communication system are equally applicable for use in a subway, bus, and/or mass transit application. (FIGS. 30 and 33.) For convenience, the subway, bus, and/or mass transit vehicle will be identified by the numeral 924. The subway/bus 924, preferably includes the elements as earlier identified and described related to the LED light support 801, first LED illumination sources 803, collimator assembly 807, sectors 811, power source 813, first controller 815, first receiver 819, and converter 821.

In one embodiment, a second receiver 823, second converter 825, second controller 827, and second LED illumination sources 829, as earlier described are preferably constructed and arranged for attachment to a street sign, building, structure and/or traffic light 926.

In one embodiment, for the mass transit application, the first controller 815, as integral to the bus and/or subway 924, includes pre-stored information as to the vehicle identification number, schedule, and vehicle route. The second controller 827, as integral to the street sign, building, structure and/or traffic light 926, includes pre-stored identification information such as a position location relative to a map. Within the subway mass transit application position identifiers 928, may be regularly spaced along a route in substitution for the street sign/traffic lights 926.

In one embodiment, the first controller 815, will signal initiation of a first pulsed light communication signal to be transmitted for detection by the second receivers 823, and/or position identifier 928. The second controller 827, or position identifier 928, will process the received signal for generation of a second LED pulsed light signal for transfer to a centrally located third receiver 930, as connected to a third converter 932, third controller 934, and third LED illumination device 936. The third receiver 930, third controller 934, and/or third LED illumination device 936, are preferably elevated with respect to the street signs 926, and/or position identifiers 928, in order to receive pulsed LED communication signals from a plurality of street signs 926, and/or position identifiers 928. The third controller 934 may be electrically coupled to a traffic processor 938, which functions as a central processing and tracking location related to signals received from the third controllers 934.

In one embodiment, the second controller 827, and/or position identifier 928, may record the first signal received from the first controller 815. The second controller 827 may then relay the first signal, including vehicle identification, along with additional information such as an identification signal corresponding to a street sign 926, and/or position identifier 928, and a signal corresponding to the time of the transmission to a third controller 934 for communication to a traffic processor 938.

In one embodiment, the traffic processor 938, may compare the information to a preset map and/or schedule for transmission of signals back to the street signs 926, and/or position identifiers 928. The street signs 926, and position identifiers 928, as receiving a signal from the traffic processor 938, may initiate the transmission of additional signals for receipt by a plurality of displays 940, which may be used to communicate the status, tracking and/or location of a bus/subway 924 proceeding along a pre-selected route. Potential passengers waiting for a bus/subway 924, may therefore track in real-time the location of the bus/subway 924. Additionally, bus stop and/or subway connection information may also be transmitted by pulsed LED communication signals for receipt by and placement upon the displays 940, to assist passengers during travel activities.

In one embodiment, each subway/bus 924, may also include a display 940, which is adapted to receive a second pulsed light communication signals as generated by a street sign 926, and/or position identifier 928, for processing by a first controller 815. The location identifiers from the street signs/traffic light 926, and/or position identifiers 928, may assist passengers to identify the real-time location of the vehicle with respect to a pre-selected route.

In one embodiment, the first receiver 819, second receiver 823, and/or third receivers 930, may be adapted to receive any wavelength of generated LED pulsed light signal. In addition, each of the first controllers 815, second controllers 827, and/or third controllers 934, may be coupled to a scanner 831, which searches to identify transmitted signals used to communicate tracking and/or other information within a mass transit application.

In one embodiment, a plurality of third controllers 934 may be disposed in any desired pattern as elevated with respect to an urban environment for relay of communications to assist in the tracking, regulation, and control of mass transit.

Figure 24B:
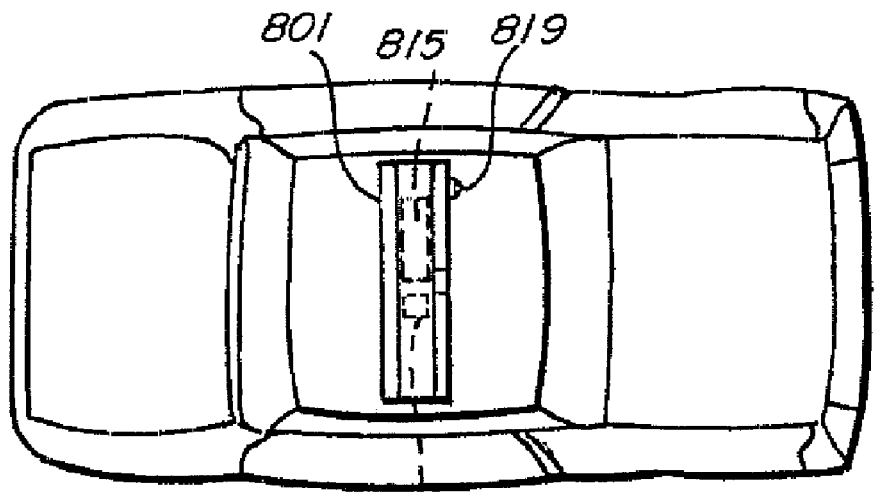
FIG. 24B is an alternative top environmental view of an emergency vehicle and pulsed light system.

In one embodiment the components, features, and applications as earlier described related to the LED pulsed light communication system are equally applicable for use in an OPTICOM intersection clearing application. The OPTICOM intersection clearing device is generally referred herein as the OPTICOM device identified by the numeral 942. (FIG. 24.) The OPTICOM device 942, includes a second receiver 823, second converter 825, second controller 827, and second LED illumination sources 829 as earlier described. In addition, the OPTICOM device 942, includes an LED support 801, having sectors 811. The OPTICOM device 942, may be electrically coupled to a main power supply for a traffic signal 926, and may be constructed to have a backup power supply such as a battery which is rechargeable through the use of a solar cell.

In one embodiment the OPTICOM device 942, and second controller 827, are connected to an override switch which is integral to the traffic light 926. A police, ambulance, fire, or other emergency vehicle during an emergency situation frequently requires the immediate transposition of a semaphore to a green traffic condition signal, to facilitate speed of arrival at an emergency situation. In addition, the first system as integral to an emergency vehicle may also include a first receiver 819. During use of the OPTICOM device 942, an officer or emergency personnel will activate a switch to initiate the first controller 815, to generate a first communication signal for transmission from the first LED illumination sources 803. The first pulsed light signal will be received by the second receiver 823, integral to the OPTICOM device 942. The second controller 827, of the OPTICOM device 942, will then trigger the override switch to instantaneously transition the semaphore from either a red or amber signal to a green light signal to permit passage of an emergency vehicle through an intersection.

In one embodiment at such time as the second receiver 823, terminates detection of the signal as generated by the first LED illumination sources 803, a pre-programmed timing delay may be initiated for deactivation of the override switch to return the traffic light 926, and/or semaphore to a normal operational condition. Alternatively, the emergency vehicle may transmit a communication signal indicating that a vehicle has completed the passage through the intersection for deactivation of the override switch to return the semaphore/traffic light 926, to a standard operational condition. A recognition protocol as earlier described may be used in association with the OPTICOM device 942.

In one embodiment the components, features, and applications as earlier described related to the LED pulsed light communication system are equally applicable for use within a railroad crossing application. (FIGS. 31 and 32.) Generally, black and white railroad crossing signs having no alarm and/or gate are utilized in most rural environments due to the low level of traffic, and cost of additional warning indicators.

In one embodiment a railroad crossing signal 946 is formed of an LED support 801, having first LED illumination sources 803, which may be organized into sectors 811. In addition, the railroad crossing signal 946 may include a collimator assembly 807, a power source 813, a first controller 815, a solar energy cell 817, a first receiver 819, and a converter 821 as earlier described. The elements of the railroad crossing signal 946 are preferably directly attached to a railroad crossing sign pole as placed adjacent to rural railroad crossings.

In one embodiment the LED light support 801 is adapted for illumination of the LED light sources as a warning signal. The railroad crossing signal 946 may also include an audible alarm 948, which may be used to generate a buzzing, bell, and/or siren signal which is used to warn motor vehicles as to the existence of a train 950.

In one embodiment, a second LED light support 801, having second LED illumination devices 829 as earlier described, is positioned proximate to the front 952 of the train 950. In addition, a third LED light support 801, including a third receiver, third converter 932, third controller 934, and third LED illumination sources 936 as earlier described, may be positioned proximate to the back 954 of the train 950.

In one embodiment, the second controller 827, and second LED illumination sources 829, are continuously flashing a visible light signal which may include a modulated duty cycle as earlier described. The second controller 827, and second LED illumination sources 829, are also constructed and arranged to continuously emit communication signals as earlier described. The communication signals may transmit a recognition protocol as earlier described and are adapted for detection by the first receivers 819, as integral to the railroad crossing sign 956. The first controller 815, interprets the first communication signal for activation of the first LED illumination sources 803, for the provision of a warning light signal and simultaneously may activate the audible alarm 948.

In one embodiment, the railroad crossing signal 946 may include first receivers 819 as earlier described, positioned on opposite sides of the railroad crossing sign 956, along an axis parallel to the direction of the travel of the train 950.

In one embodiment, the end and/or caboose of the train 950, includes a the third set of LED illumination devices 936 for generation of a second communication signal. Once a train 950, has passed a railroad crossing, the transmission of the second communication signal may be detected by the first receiver 819, located on the opposite side of the sign 956, which deactivates the audible alarm 948, and/or the warning signal light as generated by the first controller 815. Alternatively, the first controller 815 may include a timer for deactivation of the visible light signal and audible alarm 948 following passage of a pre-selected period of time. The first communication signal and the second communication signal may be formed of different patterns or wavelengths of pulsated light signals.

In one embodiment, a motor vehicle 835 may include a fourth receiver, fourth converter, a fourth controller, a fourth LED illumination device, and an override switch as earlier described. The fourth receiver is adapted to receive the first communication signal from train in a manner similar to the railroad crossing signal. The receipt of the initial communication signal may be processed by the fourth controller for activation of an override switch, which may be electrically coupled to the radio of the motor vehicle 835. In addition, the fourth controller may be coupled to the fourth LED illumination devices, which may be positioned to the interior proximate to the dashboard of the motor vehicle 835. The receipt by the fourth receiver, of the first communication signal as generated by the train 950, causes the controller to initiate the illumination of the fourth LED illumination sources, for observation by an individual, as a visual indicator as to the existence and proximity of a train 950. Alternatively, an audible warning signal may be generated.

In one embodiment, the components, features, and applications as earlier described related to the LED pulsed light communication system are equally applicable for use in an urban suburban communication system 966. (FIGS. 30 and 33.)

In one embodiment, the urban suburban communication system 966, is generally formed of an LED light support 801, having first LED illumination sources 803, formed into sectors 811 as earlier described. The urban suburban communication system 966, also includes a main power source 813, as earlier described along with a battery backup power source which may be formed of a rechargeable solar cell 817. The urban suburban communication system 966, further includes at least one first controller 815, at least one first receiver 819, and at least one first converter 821 as earlier described. The urban suburban communication system 966, is positioned to the top of a central building 968, or tower 970, as related to a geographic area.

In one embodiment, the urban suburban communication system 966, may also be formed of a plurality of relay sites 972, which include at least one second receiver 823, at least one second converter 825, at least one second controller 827, and at least one set of second LED illumination sources 829 as earlier described. The relay sites 972 may be secured to street and/or traffic signals 926, and/or street lamps. Alternatively, the relay sites 972 may be placed at any desired location within an urban/suburban environment. Any number of relay sites 972, may be used for detection of initial communication signals.

In one embodiment, the relay sites 972, transmit and/or receive communication signals to and/or from a user site which may be external and/or electrically connected to the interior of a dwelling, building, and/or other structure 976. The user sites may include at least one third receiver 930, at least one third converter 932, at least one third controller 934, and at least one set of third LED illumination sources 936 as earlier described. The user site is electrically coupled to a visual display 940, audible alarm, and/or LED light support 801, having LED illumination sources. Each communication signal may therefore be passed from the first LED light sources 803, to a second receiver 823, integral to an initial relay site 972, for successive transmission to additional second receivers 823, of relay sites 972, for final transmission to a third receptor 930, integral to a user site. The third controller 934, may then process the final signal at the dwelling, building, and/or structure 976, for issuance of a signal on the display 940, activation of an LED light on a light support 801, and/or activation of an audible alarm. Communication signals may therefore be processed sequentially from the urban suburban communication system 966, through successive relay sites 972, to a user site. Types of signals may include but are not necessarily limited to mail messages, pictures, photographs, advertisements, communications, news, real-time entertainment, pre-programmed entertainment, civil defense, and/or any other type or form of communication which may be reduce to pulsed and/or encrypted LED communication signals. It is anticipated that communication signals may be used as a supplement or replacement to modes of communication such as mail, e-mail, advertising, billboards, cell phones, telephones, radio, and/or television.

In one embodiment, the third controller 934, and the third LED illumination sources 936, at the user site may be constructed and arranged to emit responsive communications signals upstream through the second receivers 823, of the relay sites 972, for further communication to the first receivers 819, of the urban suburban communication system 966, for processing within the first controller 815. The first controller 815 may identify a designated recipient of the communication for generation of a responsive signal downstream, back through a series of second receivers 823, for ultimate transition to a particular third receiver 930, at the previously or newly identified or designated user site.

In one embodiment, each intermediate relay site 972, and user site, is required to have a stored identification combination of pulsed LED communication signals to identify an individual address, location number, or global positioning system coordinates. The addresses for each and every site 972, and/or user site, may be stored within each respective second controller 827, and third controller 934, respectively. The first controller 815, second controller 827, and third controller 934, are preferably computers having microprocessors which include stored translation software to recognize and interpret received communication signals.

In one embodiment, one set of first controllers 815, second controllers 827, and third controllers 934, may exclusively communicate signals related to mail and/or e-mail. Another set of first controllers 815, second controllers 827, and/or third controllers 934, may exclusively communicate signals related to cellular and/or telephone signals. Any number of sets of controllers may be utilized as a portion of the urban suburban communication system 966 to communicate a specific desired type of information.

In one embodiment, a specific type of communication signal may be assigned exclusively to a particular wavelength of pulsed LED light communication signals. For example, cellular telephones and/or telephone communications may be assigned to a specific wavelength associated with an amber color. Radio communications may be assigned to a wavelength associated with a blue color. Any desired type of communication may be assigned a specific common wavelength for transmission and receipt of communication signals. The communication signals are not required to be exclusively in the visible spectrum but may also be generated in the non-visible spectrum.

In one embodiment, the third controller 934 may permit a user to select a type of display 940 for communication of received pulsed light signals. For example, an individual may manipulate the third controller 934 for generation of a processed and interpreted communication signal for display upon a screen, television, stereo, speaker, alarm, and/or flashing or other light. Additionally, the communications as processed by the third controller 934 may not be accessible to a end user without entry of security measures to facilitate retrieval such as the use of passwords and/or other encryption means.

In one embodiment, the urban suburban communication system 966, relay sites 972, and/or user sites 974, may each include scanners 831 and/or dials as earlier described for detection of transmitted communication signals.

In one embodiment, the third controller 934, as integral to a user site, may be utilized to transmit encrypted light signals and/or messages on an emergency basis to a police or fire station. In addition, the third controller 934 may receive civil defense signals such as severe weather through communication signals.

In one embodiment, the components, features, and applications as earlier described related to the LED pulsed light communication system are equally applicable for use in a vehicle to vehicle application.

In one embodiment, an emergency vehicle 978, may also transmit a communication signal to a street sign/lamp 926, a building, structure, and/or dwelling 976, a user site, or to a relay site 972, of a urban suburban communication system 966, to track the location of the emergency vehicle 978, and/or to communicate messages and instructions through the use of pulsed LED communication signals. An emergency vehicle 978, may emit pre-stored and/or real-time communication signals to another motor vehicle, aircraft 876, road sign, OPTICOM 942, urban suburban communication system 966, railroad crossing sign 946, and/or any other application as identified herein. Real-time communications may be issued through a keyboard, key pad, and/or voice recognition software integral to the emergency vehicle 978.

Figure 37:
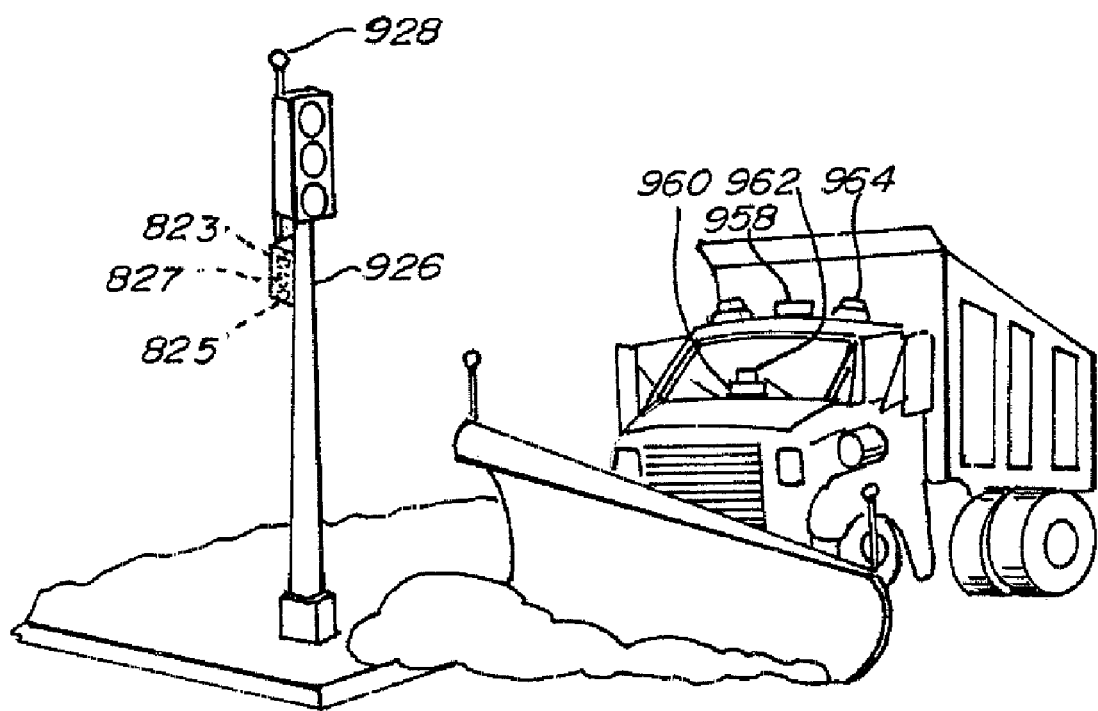
FIG. 37 is an environmental view of an LED pulsating light signal and snowplow.

In one embodiment, the communication system may be incorporated into other types of vehicles including, but not necessarily limited to, snowplows, roadway construction vehicles, ambulances, and/or fire trucks which utilize visual lights. (FIG. 37.) In these vehicles a visual signal light may be generated simultaneously with the emission of a pulsed LED light signal.

In one embodiment, communications may be accomplished between a standard motor vehicle and an emergency vehicle 978, through the emission of a pulsed LED communication signal as earlier described. An audible alarm may be generated requiring an acknowledgment signal by a driver or passenger in order to terminate the emission of the audible alarm, which would trigger issuance of an acknowledgment signal to the emergency vehicle.

In one embodiment the optical XCVRs of a communication system security badge or name tag may be used as an integral portion of an intelligent or artificially intelligent security and identification database system as utilized within a particular defined security zone or zones. In this embodiment the security badge or name tag may be used to track the entry, exit and location of individuals, and to identify acceptable profile parameters for individuals within the security zone.

In one embodiment the optical XCVRs of a user's security badge or name tag communicate with the optical XCVRs. The optical XCVRs may be placed in numerous locations as lighting sources. As shown in FIG. 9, a user is shown with a name tag that is broadcasting and receiving data over an optical link using the XCVR described in FIG. 1 to a ceiling mounted fixture. The XCVR as integral to a ceiling mounted or other type of light fixture may in turn be in direct communication with a computer, processor, microprocessor, mainframe computer or server, and/or other computing device as earlier described through the use of wire, cable, optically via pulsed light communication, over a Broad Band Power Line system or over any other type of communication system.

In one embodiment the intelligent security and database system may be utilized to flag discrepancies related to information accessible and processed from a stored and accumulated continuously evolving database of information, in order to centrally warn security, surveillance, and/or law enforcement officers as to the existence of a condition warranting further investigation.

In one embodiment the intelligent security and identification database system will search and/or screen all security badges or name tags for individuals entering into a security zone to identify information such as the name, employment position, employment location, expected hours of employment, security clearance for the employee, and expected paths of travel of the employee within a facility.

In one embodiment the intelligent security and identification database system will record the time, date, and place of entry of an individual having a security badge or name tag into, and out of, a secured zone. In this embodiment, the recorded information may be compared in real time to previously recorded conduct or parameters for the individual security badge or name tag, to automatically identify discrepancies. Discrepancies which exceed a pre-programmed threshold may be brought to the attention of security personnel.

In one embodiment the accumulation and storage of information of the type identified above, will occur within continuously updated and evolving files, to create a database for future reference, to enable law enforcement, surveillance, and/or security officers to implement profile searches to identify classes of individuals warranting further investigation.

In one embodiment a law enforcement, surveillance, and/or security officer, desiring to identify individuals within a security zone having inadequate clearance, would access the accumulated database to inquire as to the identity and location of all individuals within a security zone. Upon receipt of this inquiry the processor, mainframe computer or server, associated with the intelligent security and identification database system may then compare the identified individuals present within the applicable security zone, to the security clearance assigned to each individual, to identify the presence of an individual having inadequate security clearance.

In one embodiment this process is accomplished by the individual security badge or name tag optical XCVR continuously transmitting a pulsed light communication signal for receipt by a series of optical XCVRs integral to a series of lighting sources, or ceiling mounted light fixtures, within a building structure. The individual security badge or name tag would transmit through pulsed light communication information as previously identified as related to an individual's identity, employment occupation, security clearance, and/or primary employment location. In this embodiment, the pulsed light communication signal could be sequentially detected, received, and tracked by a plurality of XCVRs which are in continuous communication with the system processor.

In one embodiment a series of XCVRs are in communication with the system processor, mainframe computer or server, through sequential transmission and receipt of pulsed light communication signals.

In one embodiment the series of XCVRs are in communication with the system processor, mainframe computer or server, through the Broad Band Over Power Line Communication System as previously described herein.

In one embodiment the series of XCVRs are in communication with the system processor, mainframe computer or server through the use of cable, wire, or other communication media.

In one embodiment, an individual security badge or name tag may be assigned a number which is transmitted within the communication signal to the system processor, mainframe computer or server.

In one embodiment the system processor will continuously record and store in real time the received pulsed light communication signals for individual security badges or name tags in one or more system databases, one or more subsystem databases, or individuals specific databases, in order to establish normal routine parameters for designated locations or areas within a facility. The system processor may be programmed to compare previously stored data representative of normal routine parameters for a designated location within a facility, to the real time observed data for the designated location. The system processor preferably includes threshold software which may be used to identify any standard deviations from normal activity occurring within the designated location.

In one embodiment the system processor, mainframe computer or server may compare individual specific information with information concerning a designated location, as well as information about employees and/or supervisors in order to assist in a threshold analysis for indication of a warning or investigation signal or flag. For example, if an employee is tracked as accompanying a supervisor into an area where clearance is required, and the supervisor is identified as having the appropriate clearance, and the supervisor is identified as having authority to escort an employee not having a designated level of clearance within a particular zone, then a threshold for identification of required investigative action may not be met.

In one embodiment the system processor, mainframe computer or server may identify individual specific pulsed light communication signals received from a location outside of an established or normal routine, and outside of a set level of deviation, for triggering of a investigation advisory. An investigation advisory would issue for a specific location and individual within a zone or facility.

In one embodiment the communication system may also be used at a check point. Information transmitted from a security badge at a checkpoint could also include motor vehicle information, make, model, and/or license plate information for the particular employee. At a facility check point retrieved information could be displayed on a monitor. The database may also include a photo of the individual associated with the security badge, where all available information could be reviewed by a security office prior to entry by into a security zone.

In one embodiment each evolving database and/or mainframe database may be capable of being continuously updated to include data saved by the communication system. Software is preferably loaded onto the computer for creation of files representative of individuals. Access software may be used to communicate with internal databases or external or remote databases, and comparison software may be used to review data as related to the external and/or internal databases.

In one embodiment, sensitivity software is also used to establish thresholds and to issue/trigger investigation signals, which may be displayed on the output device or monitor, and category software may be used to divide data within individual files. In addition, any other software as desired by security and/or law enforcement personnel may be utilized.

In one embodiment, the computer may implement either standard or customized queries or searches for defined profiles related to individuals within the accumulated database for the security zone. Upon identification of individuals which satisfy the profile criteria, a communication signal will be generated to advise law enforcement, surveillance, or security zone officers as to the status and location of the individuals under investigation. The relative location of targeted individuals may be identified by proximity to one or more XCVRs as integral to lighting structures. It is anticipated that each XCVR will have a coded or digitized identification number which corresponds to a specific location within an overall communication/security plan for a facility. It is anticipated that each transmission of a communication pulsed light signal will include a code representative of the originating XCVR. Optionally additional intermediate XCVRs may add a communication pulsed light signal code representative of the transmitting XCVR.

In one embodiment, the computer may initiate an inquiry to locate the identification code corresponding to a particular individual. In this embodiment, the computer would transmit an signal outwardly through the optically connected XCVRs to request identification of a particular individual identification code. In one embodiment the inquiry may be global, or may be limited to specific periods of time or other specific conditions such as location. In one embodiment each individual XCVR upon receipt of the command inquiry may forward by pulsed light signals the individual identification codes of all individuals within a particular location, because individual identity codes are being continuously transmitted by each individual security badge. In one embodiment the individual security badge under investigation may beep or generate another signal to advise the individual that he or she needs to contact a central switchboard for transfer to another individual or for receipt of a message.

In one embodiment the evolving database and/or mainframe database may be coupled to additional identification apparatus or systems including but not limited to facial recognition, fingerprint recognition, palm print recognition, voice print recognition, eye scan, and/or signature recognition devices/systems which may be coupled to the input devices for recording of data to be stored within the system for analysis and display of a monitor.

In one embodiment the communication system including the XCVR may be incorporated into a hand held or portable unit. In some embodiments the portable unit may be clipped onto a belt. In other embodiments the communication system may be incorporated into a device such as a cellular telephone. In this embodiment the communication system may be transported by a security officer or other designated employee within a facility.

In one embodiment the evolving database and/or mainframe database may include timing and other software which may be used to identify whether or not a security badge has been stationary for an excessive duration of time, which in turn would trigger an investigation signal or a communication signal to the stationary security badge to request an update for the status of the individual. The failure of a security badge to move relative to one or more XCVRs may indicate that a security badge has been removed by an individual and placed on a surface. Alternatively, the failure of a security badge to move relative to one or more XCVRs may indicate the existence of a medical problem requiring immediate attention.

In one embodiment the evolving database and/or mainframe database may illuminate a pathway on sequential XCVRs representative of the shortest route to a specific location to assist emergency personnel.

In one embodiment the evolving database and/or mainframe database may include probabilistic analysis software which may be used to assist in the establishment of threshold levels for issuing a warning or investigation signal. In addition the evolving database and/or mainframe database may include Principle Component Analysis (PCA) software and Eigenvector or Eigenspace decomposition analysis software to assist in the establishment of threshholds.

In one embodiment upon the detection of any threshold discrepancies related to an individual or security badge, the computer for the communication system may issue a flag to a security officer to investigate the individual or security badge. The communication system may thereby provide enhanced safety to the security zone functioning as a proactive automatic screening system.

In one embodiment the communication system may utilize security badges in areas such as airports, embassies, hospitals, schools, government buildings, commercial buildings, power plants, chemical plants, garages, and/or any other location for which the monitoring of an individual is desired.

In one embodiment the evolving database and/or mainframe database may learn the expected times for arrival and departure of particular individuals with respect to various zones. Each time an individual enters or exits a security zone, the evolving database and/or mainframe database may record in the database the time and location of the arrival or exit. Thus, over time, the communication system may learn the expected arrival and departure times based upon the average of a predetermined number of instances, or by the most common of a range of predetermined times, such as normal shift times. Thus, if an individual attempts to enter or exit a zone at a time other than the learned expected time of entry or exit, the evolving database and/or mainframe database may alert security personnel to initiate an investigation.

In one embodiment the evolving database and/or mainframe database may be programmed to assign a point system or flag upon the recognition of certain data and/or profile characteristics relative to an individual wearing a security badge. In one embodiment the computer will record and/or track the number of points or flags assigned to a particular individual. When a certain number of flags and/or points have been assigned, then the computer will emit or issue a signal to an officer, which may be ranked against other tasks in order of importance. The computer may store any information or data collected pertaining to the task, as well as the instruction for the task itself in the database.

Over time, in one embodiment the communication system may learn typical paths, times and areas where specific individuals spend their time. The communication system may then issue an alert when an individual deviates from an authorized area into an unauthorized zone. For example, if a person normally may be found on second floor, and the person occasionally passes through first floor, but have never gone to the fourth floor, then the communication system may alert security personnel if the person is identified as being present on fourth floor. The presence of the individual will be detected on the fourth floor due to the continuous emission of a signal as generated from the security badge, and as detected by an XCVR have a location address identified as being on the fourth floor. The XCVR detecting the pulsed light signal form the security badge issues a transmission for passage through a number of optically connected XCVRs for processing and storage at the evolving database and/or mainframe database of the processor.

In one embodiment, if a high level tracking priority is assigned to an individual, then continuous active tracking via software analysis of signals reveived by and as generated from a plurality of XCVRs is desirable. As such, the system may continually pinpoint the zone, and even the exact location of a person within the zone.

In one embodiment, the evolving database and/or mainframe database may learn and recognize repetitive patterns within the accumulated database. Therefore, the computer may assess a low query priority to repetitive and/or regular patterns, and implement a more expedited search related to non-regular pattern data as stored within the accumulated database. Any parameters may be selected for the recognition of patterns within a security zone dependent upon individual environmental conditions and customized needs at each independent security zone. For example, six days of repetitive actions may be required to establish a regular pattern of conduct within a first security zone where two months of repetitive conduct may be required to establish a regular pattern within a second security zone.

In one embodiment, during pattern learning, the computer sensitivity may be established by the initial creation of a file and/or data pertaining to an individual. Next, the input of a desired amount of data representative of repeated actions may be required. The number or amount of data may represent repetitive occurrences. The occurrences may be required to be within a certain classification, such as all within a certain zone, or all within a certain period of time during the day, such as between 3 and 4 o'clock p.m. The computer may then calculate a mean value based upon the recorded data. Alternatively, the recorded data may be divided into more than one segment and a mean may be calculated for each desired segment. The computer will generally continue to store data, and therefore update the pattern, as detected by the XCVRs. The computer is preferably designed to recalculate a mean for the data following each additional data entry. The computer may include sensitivity trigger software which as earlier described will identify a desired threshold deviation from the calculated mean, which may be more or less than one standard deviation from the calculated mean. Alternatively, the sensitivity trigger may be established at a certain percentage for deviation from the calculated mean. The computer continually compares the observed occurrence information to the calculated mean data to determine if investigation signals are required to be communicated to law enforcement and/or security officers. In this respect, the computer is engaged in updating activities becomes smarter and more efficient in analyzing risk situations over time.

In one embodiment the communication system is preferably proactive and is continuously screening and comparing data being input from the XCVRs for comparison to the previously stored records within the accumulated database.

An embodiment of a slave clock 3107 combined with optical transmitter 3102 and optical detector 3103 is illustrated in FIG. 45. Optical transmitter 3102 preferably comprises at least one optical LED, and most preferably comprises an RGB LED, designating that the LED includes Red, Green, and Blue which are the primary additive colors from which all other colors including white may be produced. For exemplary purposes only, optical transmitter 3102 may comprise discrete LEDs of each primary color, or may alternatively be a single RGB LED integrated onto a common die, taking the physical form of a single LED. Furthermore, more than one RGB LED may be integrated upon a single die or within a common package or optical transmitter 3102, as may be deemed most appropriate. In practice, there is no limit to the number of RGB LEDs that may be used, other than physical size and available space limitations, and thermal dissipation capacity and power requirement constraints.

By controlling the relative power applied to each one of the RGB LEDs, different colors may be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors. The display of different colors can be used as a part of a visual signaling system, using particular colors as indicators of particular information. As one example, though not limiting the present invention in any way, a flashing red optical transmitter 3102 might signal a fire drill, while a steady red optical transmitter 3102 might signal an actual fire. Any type of condition, such as a tornado, fire, lockdown, or movement may be signaled. With an RGB LED, all colors may be used and steady versus flashing illumination may be further combined, making the distinguishable set of optical indicators available to a system designer very large.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel is created using optical transmitter 3102, higher data transfer rates may be obtained with more rapid control of illumination levels. Consequently, if phosphors are used in the generation and/or conversion of light, and if faster data exchange rates through optical communications are desired, these phosphors will preferably be very fast lighting and extinguishing.

Optical detector 3103 may either be a broad spectrum detector or alternatively color-filtered or sensitive to only a single color. Detector 3103 will be any of the many known in the art, the particular selection which will be determined by well-known considerations such as sensitivity, reliability, availability, cost and other considerations.

FIG. 46 illustrates a second embodiment slave clock 3107' combined with optical receiver 3103 and a different optical transmitter 3104. Where an LED slave clock exists, one or more of the LED segments has the capability of serving as an optical transmitter 3104. In this embodiment, more segments are available, but in most cases these LED segments will emit only a single color, eliminating the ability to use colors as a part of visible signaling. Flashing may, however, still be used.

FIG. 47 illustrates by projected environmental view an embodiment of a communications network incorporating master and slave synchronized clocks. In accord with a preferred method of the invention, optical transmitter LEDs 3102, 3104 are used to transmit one or more kinds of data, including identity, location, audio and video information, and various data signals. The data signals may arise through communications within a Local Area Network (LAN), sometimes referred to as an Intranet, owing to the common use of such a network entirely within an office space, building, or business. The data may additionally or alternatively arise through communication with a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The data may further arise through communications with the Internet.

The data is introduced at a junction between master clock 3105 and slave clocks 3107 using a Broadband-over-Power-Line (BPL) transceiver 3106. BPL transceiver 3106 may use circuitry already known in the art, but may also further comprise a detector and control which disables data transfer during ordinary clock synchronization.

The use of an optical communications link provides large available bandwidth, which in turn permits multiple feeds of personal communication between slave clocks 3107 and other light communications enabled devices. Optical data is transferred at rates far in excess of those detectable by the human eye, and so in many cases a person may not be able to detect any visible changes as the data is being transferred. Additionally, a plurality of LEDs may be incorporated into an array, and may be used for a plurality of communications channels. In this case, the likelihood of the plurality all going dark, resulting in visible differences in room illumination is reduced. Software may further be incorporated to monitor and predict illumination, and control data transmissions from one or more streams accordingly to maintain desired illumination levels. In another embodiment, some of the plurality of LEDs may be maintained in an on state, while others of the array may be used for data transmission. In these cases, the minimum possible illumination is that of the on-state LEDs. As may be appreciated, a number of approaches are available or will be apparent from the foregoing discussion to maintain baseline illumination.

Because optical illumination is constrained by opaque objects such as walls, the location of an associated device or person can be discerned to a particular room, hallway or other similar space. In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. The large bandwidth permits video signals to be integrated, providing the opportunity to create audio-video records that are fixed in time and location.

Since location may be relatively precisely discerned, optical transmitter LEDs 3102, 3104 may in one embodiment be configured to change color, flash, or otherwise be visually changed or manipulated to assist with directional guidance, personnel or intruder identification, energy management, or even to facilitate the meeting and connection of individuals.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical, electro-mechanical or electrically controllable devices.

In the event of an unauthorized presence, and in accord with another embodiment of the invention, the present preferred apparatus may be used for detection and location. When a building is dark, in many cases an unauthorized person will rely upon a flashlight to move through the building. Most preferably, optical detector 3103 will detect this unidentified light source. In such case, since the location of optical detector 3103 is known precisely, the location of the unauthorized person is also known. Further, even as the unauthorized person moves about, so the unauthorized person will be tracked by virtue of the light emitting from the unauthorized person's flashlight. When emergency personnel are called to the building, LED optical transmitters 3102, 3104 may be used to guide the emergency personnel to the exact location of the unauthorized person. The emergency personnel may not be limited to police. As may by now be apparent, ambulance workers as well as police would appreciate flashing directional lights because quicker access to an emergency scene could potentially save lives. This custom guidance system can include red, white or other suitably colored or illuminated lights which may be steady or flashing for emergency situations.

FIG. 48 illustrates by front environmental view an embodiment of a building communication and management system within one room or space 3020, using a single slave clock 3107 to communicate with a variety of diverse devices through optical LED communication channels. In practice, in a schoolroom or other public building this clock 3107 could communicate with other light communication enabled devices. For exemplary purposes only, and not limiting thereto, other light communication enabled devices might include: public address system 3108; another clock 3107; a thermostat 3109; fire and smoke alarms 3110 and 3111; or a camera 3112. Since these devices are light communication enabled, they may be controlled and/or monitored. Thus information from any enabled device can be shared with all other devices on the same network as the clock. Slave clock 3107 communication can further be shared with optically-enabled name tags, telephones, TV and music, Internet, public address, computing devices of all sorts, ranging from hand-held devices such as Personal Digital Assistants (PDAs) to massive mainframe computers, and including Personal Computers (PCs), printers, network storage devices, other security and safety devices, appliances, HVAC systems, manufacturing machinery, and so forth. Essentially, any device which incorporates or can be made to incorporate sufficient electronic circuitry may communicate with slave clock 3107 to exchange information at any time.

A building's security may further be enhanced through the use of name tags, which a slave clock 3107 can read and communicate with. The appropriate command signaled from LED optical transmitters 3102, 3104 may additionally control door locks. Camera 3112 can broadcast video through the optical link, and anything on the clock network can receive the picture. This would be most useful for recording or broadcast.

Many different conditions or devices may be simultaneously monitored and/or controlled when they are broadcasting information through the preferred clock network, because they are operating on a wide-bandwidth optical link. This information can be used anywhere on the clock network, which includes the other rooms or a central server. Bandwidth may be limited by existing clock synchronization wiring, but should still be able to provide enough to additionally incorporate video signals from at least one user, such as a teacher in a classroom. Furthermore, where desired and suitably enabled, all types of data or information may be carried through the preferred communications systems illustrated in the Figures, including but not limited to telephone signals, television signals, Internet connections, building maintenance wiring such as thermostats, fire alarms, motion detectors, and any other electrical or electronic apparatus existing or appearing within the room or space. Thus, a building need to be wired only for power and synchronized clocks, saving a huge infrastructure of other wires and fixtures and in turn saving a great deal of money.

While bandwidth may be relatively limited in the case of open synchronization wiring interspersed with other wires or adjacent to other sources of EMI/RFI, several additional circumstances may pre-exist or may be provided to boost the bandwidth of a system designed in accord with the present invention. In one embodiment, all or many synchronization wires are shielded within a conduit or other suitable shielding, most preferably for the entire distance between BPL transceiver 3106 and each slave clock 3107. Such shielding results in the preferred S-BPL communications channel, which is anticipated to have higher bandwidth capability than provided with open and unshielded wires.

Relatively recently, artisans have also proposed using so-called E-lines for extremely high bandwidth, low attenuation transmission. Such transmission schemes are, for exemplary purposes, proposed in U.S. Pat. Nos. 6,104,107 and 7,009,471, the contents of each which are incorporated by reference for their teachings of high-speed transmissions over single conductors. While the present invention is fully operational using known or well-established transmission techniques and resulting bandwidths, and so is completely independent of the whether these E-line transmission techniques work and are applicable or not to the present invention, the present invention further contemplates improvements to bandwidth using useful and functional transmission techniques and the incorporation of the same where operationally suitable.

The usefulness of embodiments of the present invention is illustrated, for example, by smoke alarm 3110. Since it is optically enabled, it can broadcast to slave clock 3107 the existence of a fire. The location of slave clock 3107 will preferably be stored, so the location and existence are both immediately known. Since the whole network is aware of the site of the fire, the nearest personnel can implement evacuation plans. Likewise, public address system 3108 can immediately direct traffic in the event of an emergency.

Camera 3112 provides video feed of the activity in a given room, thus enhancing security. If audio and/or video is enabled, through one or more personal communications badges or separate wall-mounted cameras 3112, the video can be used to capture the last-known conditions of a user or an area. This can be important in the event a disaster strikes that results in significant destruction of property or life.

Monitoring of thermostat 3109 by the network allows the temperature of a room to be controlled according to various factors such as outdoor temperature, building temperature, and the number of occupants.

Thus communication, security, and energy/building management are vastly improved through the clock with optical transmitter and receiver.

Figure 49:
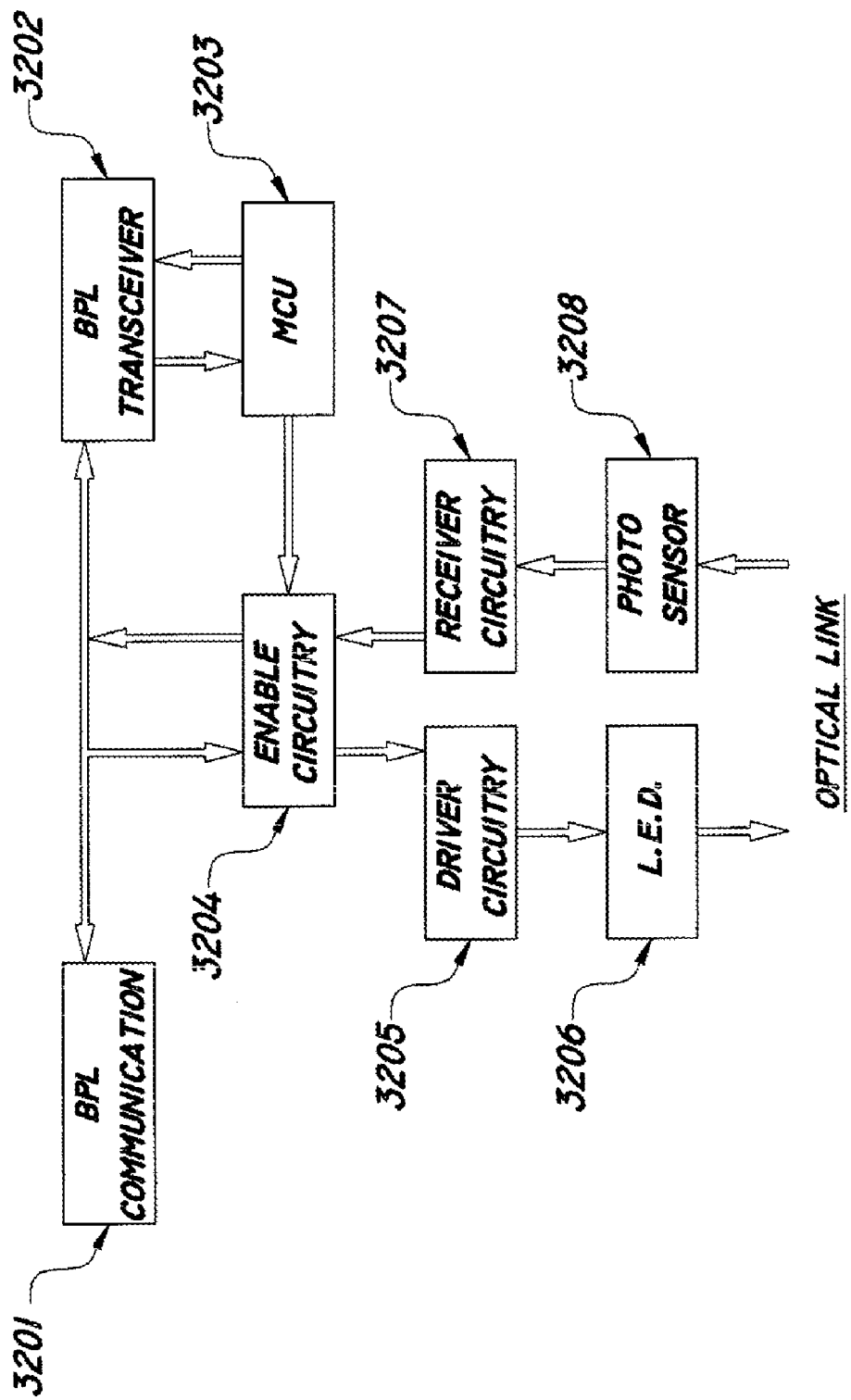
FIG. 49 illustrates by block diagram an electrical schematic of a communications network incorporating master and slave synchronized clocks such as illustrated by FIG. 47, but with only one slave clock illustrated therein.

FIG. 49 illustrates by block diagram an electrical schematic of a communications network incorporating master and slave synchronized clocks such as illustrated by FIG. 47, but with only one slave clock illustrated therein. Incoming/Outgoing BPL communication 3201 is provided through a clock synchronization wire, as shown in FIG. 47, from BPL transceiver 3106. This is the shared electrical circuit.

A BPL transceiver 3202 is provided at clock 3107 to receive and transmit data from/to the BPL enabled electrical circuit shared by the slave clocks. The particular interface implemented may vary. Currently a number of existing interfaces could be used, such as Universal Serial Bus (USB), Ethernet, Media Independent Interface (MII), etc, and the particular choice of interface could further depend on the BPL transceiver used, as will be apparent to those skilled in the art.

A micro-controller, microprocessor, ASIC or the like 3203 is provided for program control that can transmit/receive data to/from BPL communication network 3201 through BPL transceiver 3202. Microprocessor 3203 in an embodiment may respond to commands received on this network 3201 to manipulate enable circuitry 3204, and may also issue commands or send data to network 3201 if needed. If the transmit portion of enable circuitry 3204 is enabled, these commands/data will also be passed to the optical link.

Enable circuitry 3204, through driver circuitry 3205, may in one embodiment be enabled to turn on or off the LED optical transmitters 3102, 3104, as well as change the characteristics of the light, such as brightness and even color mix when multicolor LEDs are used. This is useful for things such as an annunciator light or emergency light, which may provide a visual indicator for things such as tornado, lock-down, fire, movement, etc. Enable circuitry 3204 may also manipulate the ability for BPL communication network 3201 to send and/or receive data at this clock to or from the optical link.

Driver circuitry 3205 and LED(s) 3206 will pass any signals to the optical link for other devices designed to communicate with clock 3107. Driver circuitry 3205 may, in the preferred embodiment, simply be appropriate buffering, isolation, modulation or amplification circuitry which will provide appropriate voltage and power to adequately drive LED emitter 3206 into producing a visible light transmission. Exemplary of common driver circuits are operational amplifiers (Op-amps) and transistor amplifiers, though those skilled in the art of signal conditioning will recognize many optional circuits and components which might optionally be used in conjunction with the present invention. Also, it may be desirable to use a modulation scheme with the signal. The transmit circuitry may have to provide a means of modulation in this case, also preferably incorporated into driver circuitry 3205. The type of modulation will be decided using known considerations at the time of design, selected for exemplary purposes from FM, AM, PPM, PDM, PWM, OFDM, and QAM.

Similar to but preferably complementary with the transmission circuitry, receiver circuitry 3207 receives data from the optical link detected by photo sensor 3208. Receiver circuitry 3207 will appropriately condition, and may further convert a data-bearing electrical signal. As but one example of such conversion, receiver circuitry 3207 may additionally demodulate a data-bearing electrical signal, if the data stream has been modulated by an optical host. Suitable buffering, amplification and other conditioning may be provided to yield a received data signal.

In one embodiment, LED 3206 may be illuminated as a night light at low power. Where properly enabled with battery back-up or the like, the preferred embodiment communications such as illustrated in the Figures may further provide communications and emergency lighting in the event of a power failure.

In an embodiment of the invention, an intelligent audio/visual observation and identification database system may also be coupled to sensors as disposed about a building, relying upon the present communications system transmitting over the synchronization wire of a clock system. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the prestored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED optical transmitters 3102, 3104 and optical detectors 3103, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof, and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

What is claimed is:

1. An LED light and communication system comprising:
    at least one optical transceiver, the at least one optical transceiver comprising:
        a light support having a plurality of light emitting diodes and at least one photodetector attached thereto, the light emitting diodes receiving power from a power source;
        a processor in communication with the light emitting diodes and the at least one photodetector, the processor being constructed and arranged to illuminate the light emitting diodes to simultaneously provide illumination observable to the unaided eyes of an individual, and at least one light signal non-observable to the unaided eyes of an individual, the at least one non-observable light signal comprising at least one data packet,
        the at least one data packet comprising global positioning system (GPS) location information.

2. The system of claim 1, wherein the at least one data packet includes the GPS location information of the at least one data packet's destination address.

3. The system of claim 2, wherein the at least one data packet includes the GPS location information of the at least one data packet's origin address.

4. The system of claim 3, wherein the at least one data packet includes the GPS location information of one of the at least one optical transceivers between said at least one data packet destination address and said at least one data packet origin address.

5. In combination, the system of claim 1 and a broadband over power line communications system.

6. The combination of claim 5, comprising a power line bridge.

7. The combination of claim 6, wherein the power line bridge comprises an optical transceiver.

8. The combination of claim 6, wherein the power line bridge is in operative communication with the at least one optical transceiver.

9. The combination of claim 5, further comprising an ID badge.

10. The combination of claim 9, wherein the ID badge includes a unique identifier.

11. The combination of claim 10, wherein the unique identifier is stored in non-volatile memory.

12. An LED light and communication system comprising:
    at least one optical transceiver, the optical transceiver comprising:
        a light support having a plurality of light emitting diodes and at least one photodetector attached thereto, the light emitting diodes receiving power from a power source;
        a processor in communication with the light emitting diodes and the at least one photodetector, the processor being constructed and arranged to illuminate the light emitting diodes to simultaneously create illumination observable to the unaided eyes of an individual, and at least one light signal non-observable to the unaided eyes of an individual, said light signal comprising at least one data packet
        comprising global positioning routing information.

13. The system of claim 12, wherein each of the plurality of light emitting diodes acts as a separate transmission channel.

14. An LED light and communication system comprising:
    at least one optical transceiver, the optical transceiver comprising:
        a light support having a plurality of light emitting diodes and at least one photodetector attached thereto, the light emitting diodes receiving power from a power source;
        a processor in communication with the light emitting diodes and the at least one photodetector, the processor being constructed and arranged to illuminate the light emitting diodes to simultaneously create illumination observable to the unaided eyes of an individual and at least one light signal non-observable to the unaided eyes of an individual; and
    at least one power line bridge, the at least one bridge being in electrical communication with a building's electrical wiring, the at least one bridge constructed and arranged to demodulate modulated Internet signals from the electrical wiring, the at least one power line bridge being in operative communication with the at least one optical transceiver,
        wherein the at least one non-observable light signal comprises at least one data packet.

* * * * *